United States Patent
Chen et al.

(10) Patent No.: US 12,137,399 B2
(45) Date of Patent: Nov. 5, 2024

(54) SHORT-DISTANCE INFORMATION TRANSMISSION METHOD AND ELECTRONIC DEVICE

(71) Applicant: Huawei Technologies Co., Ltd., Shenzhen (CN)

(72) Inventors: Yong Chen, Wuhan (CN); Jinming Zhang, Wuhan (CN); Peng Zhu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/684,839

(22) Filed: Mar. 2, 2022

(65) Prior Publication Data
US 2022/0191668 A1 Jun. 16, 2022

Related U.S. Application Data

(63) Continuation of application No. PCT/CN2020/110194, filed on Aug. 20, 2020.

(30) Foreign Application Priority Data

Sep. 2, 2019 (CN) .......................... 201910824358.9

(51) Int. Cl.
*H04W 4/80* (2018.01)
*G06F 3/04883* (2022.01)
*H04L 67/06* (2022.01)
*H04W 76/14* (2018.01)

(52) U.S. Cl.
CPC .......... *H04W 4/80* (2018.02); *G06F 3/04883* (2013.01); *H04L 67/06* (2013.01); *H04W 76/14* (2018.02)

(58) Field of Classification Search
CPC ..... H04W 4/80; H04W 76/14; G06F 3/04883; G06F 3/0488; H04L 67/06
See application file for complete search history.

(56) References Cited

U.S. PATENT DOCUMENTS

| | | | |
|---|---|---|---|
| 9,338,606 B2 * | 5/2016 | Moshfeghi | H04W 4/80 |
| 10,379,719 B2 | 8/2019 | Scapel et al. | |
| 2008/0297401 A1 * | 12/2008 | Nishida | G01S 3/18 |
| | | | 342/147 |

(Continued)

FOREIGN PATENT DOCUMENTS

| | | |
|---|---|---|
| CN | 101489197 A | 7/2009 |
| CN | 102646012 A | 8/2012 |

(Continued)

OTHER PUBLICATIONS

Ke-Yu Chen, Daniel Ashbrook, Mayank Goel, Sung-Hyuck Lee, Shwetak Patel, "AirLink: Sharing Files Between Multiple Devices Using In-Air Gestures", Sep. 13, 2014, UBICOMP '14. (Year: 2014).*

(Continued)

*Primary Examiner* — Nam T Tran
(74) *Attorney, Agent, or Firm* — Conley Rose, P.C.

(57) ABSTRACT

A mobile phone transfers a picture to the tablet. After the mobile phone detects a sliding operation of a finger of a user, the tablet displays, on a screen, an animation in which the picture is transferred in a sliding direction of the finger of the user.

20 Claims, 35 Drawing Sheets

(56) References Cited

U.S. PATENT DOCUMENTS

| | | | |
|---|---|---|---|
| 2010/0165965 A1* | 7/2010 | Carlton | H04W 4/80 370/338 |
| 2011/0065459 A1* | 3/2011 | Cheng | G06F 3/0488 455/457 |
| 2011/0083111 A1* | 4/2011 | Forutanpour | H04W 4/21 715/863 |
| 2011/0119640 A1 | 5/2011 | Berkes et al. | |
| 2011/0163944 A1* | 7/2011 | Bilbrey | G06F 3/04883 715/863 |
| 2011/0289147 A1 | 11/2011 | Styles et al. | |
| 2012/0216153 A1* | 8/2012 | Sip | G06F 3/04883 715/863 |
| 2013/0249822 A1* | 9/2013 | Dai | G06F 3/04883 345/173 |
| 2014/0068469 A1 | 3/2014 | Lee | |
| 2015/0128067 A1* | 5/2015 | Wong | G06F 3/04883 709/217 |
| 2015/0133162 A1* | 5/2015 | Meredith | H04W 4/029 455/456.3 |
| 2015/0188988 A1* | 7/2015 | Mei | H04W 4/80 709/204 |
| 2015/0381798 A1 | 12/2015 | Yoon et al. | |
| 2016/0069978 A1* | 3/2016 | Rangarajan | H04W 4/029 455/456.1 |
| 2016/0127871 A1* | 5/2016 | Smith | H04W 4/80 455/456.6 |
| 2017/0068501 A1 | 3/2017 | Choe et al. | |
| 2017/0164140 A1 | 6/2017 | Li et al. | |
| 2019/0043038 A1 | 2/2019 | Jang et al. | |
| 2020/0015030 A1* | 1/2020 | Hashisho | H04W 4/80 |

FOREIGN PATENT DOCUMENTS

| | | |
|---|---|---|
| CN | 103003810 A | 3/2013 |
| CN | 103188368 A | 7/2013 |
| CN | 103200697 A | 7/2013 |
| CN | 103428371 A | 12/2013 |
| CN | 104750410 A | 7/2015 |
| CN | 105320448 A | 2/2016 |
| CN | 105549855 A | 5/2016 |
| CN | 106817396 A | 6/2017 |
| CN | 107422956 A | 12/2017 |
| CN | 107636485 A | 1/2018 |
| CN | 110719584 A | 1/2020 |
| EP | 2852135 A1 | 3/2015 |
| EP | 3901736 A1 | 10/2021 |
| WO | 2017131261 A1 | 8/2017 |

OTHER PUBLICATIONS

Satish Anamalamudi, "Common Control Channel Based MAC and Routing Protocol Design for Cognitive Radio Ad Hoc Networks," 2017, 3 pages (abstract).

Dave Hollander, "How AoA & AoD Changed the Direction of Bluetooth Location Services," Mar. 27, 2019, 4 pages.

* cited by examiner

CONT.
FROM
FIG. 4D
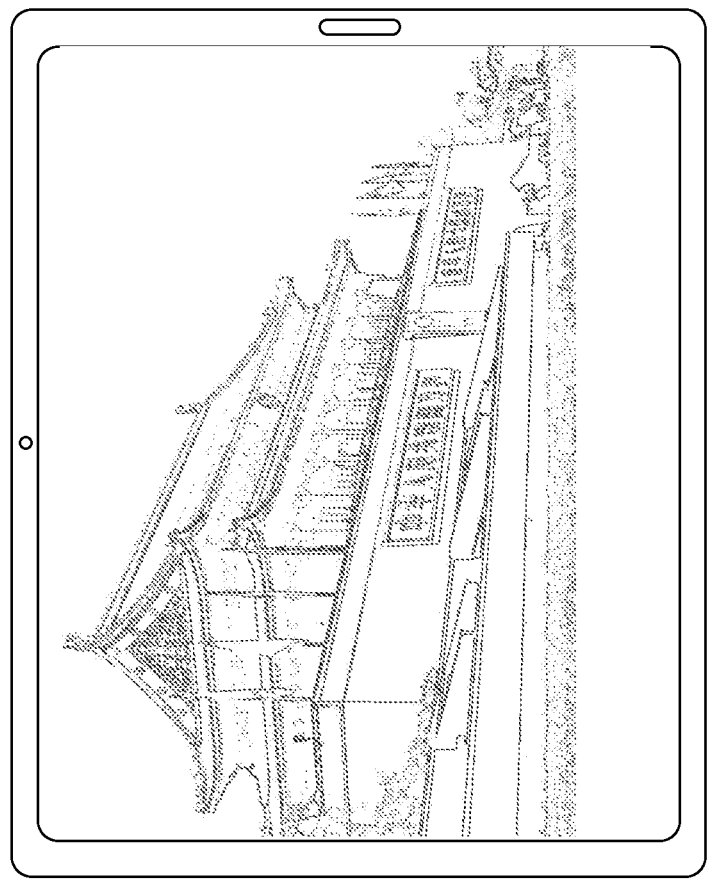
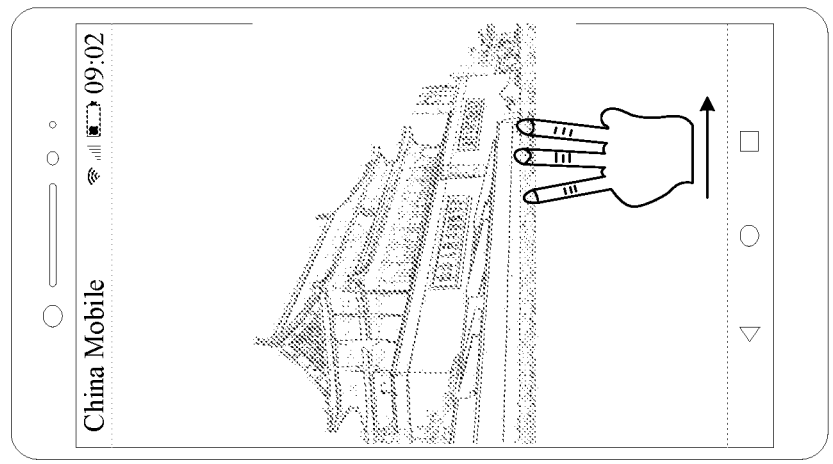
FIG. 4E

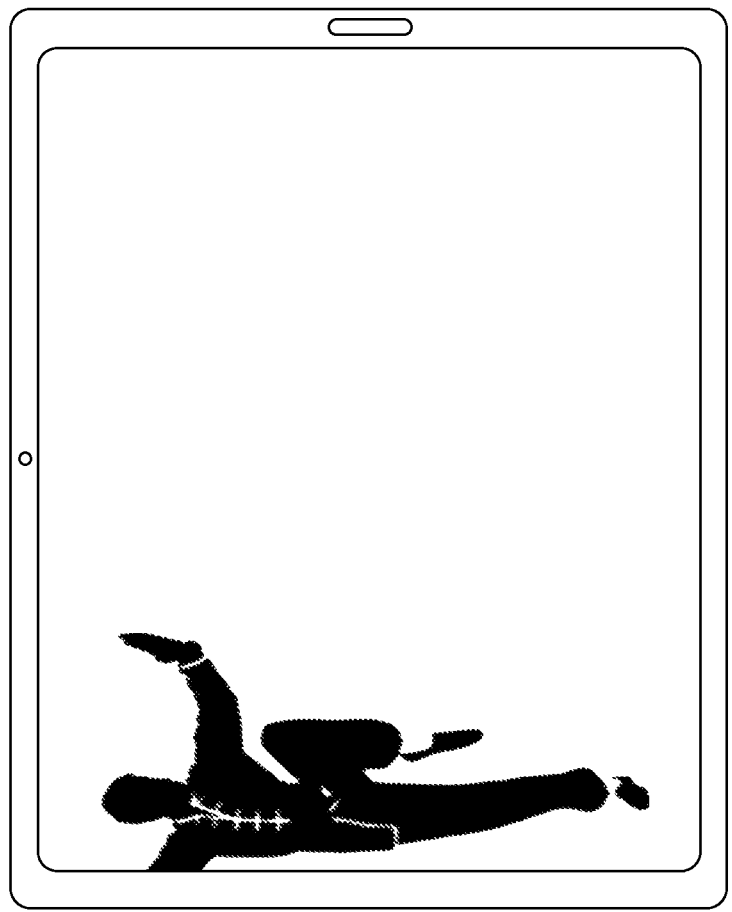
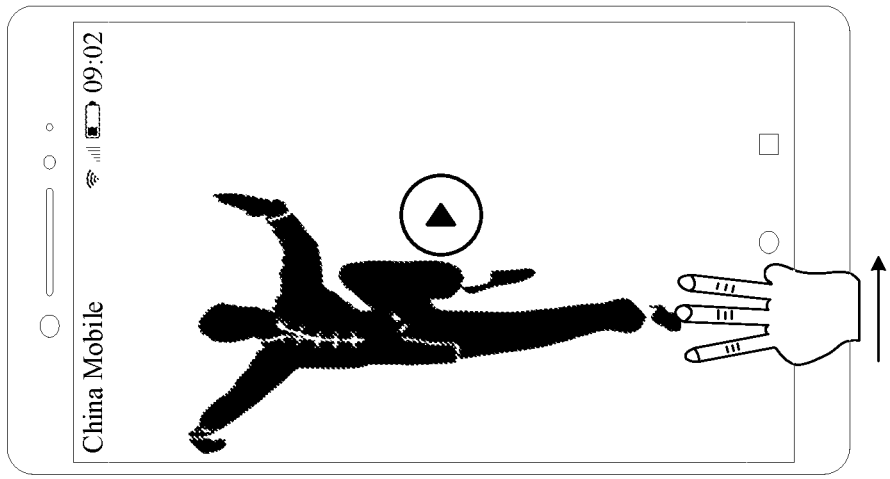
FIG. 5C
TO
FIG. 5D

CONT FROM FIG. 5C

TO

CONT.
FROM

TO

TO

CONT.
FROM
FIG. 8A
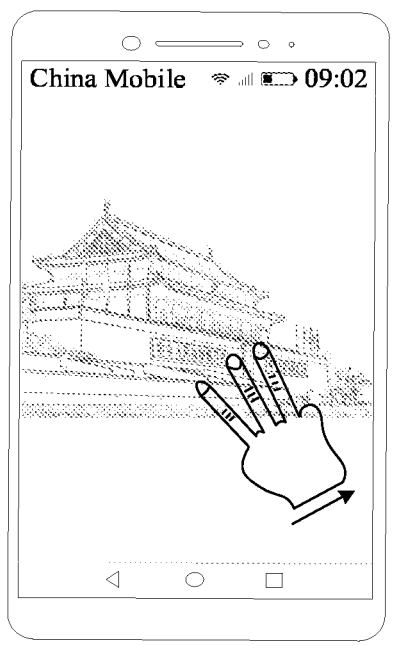
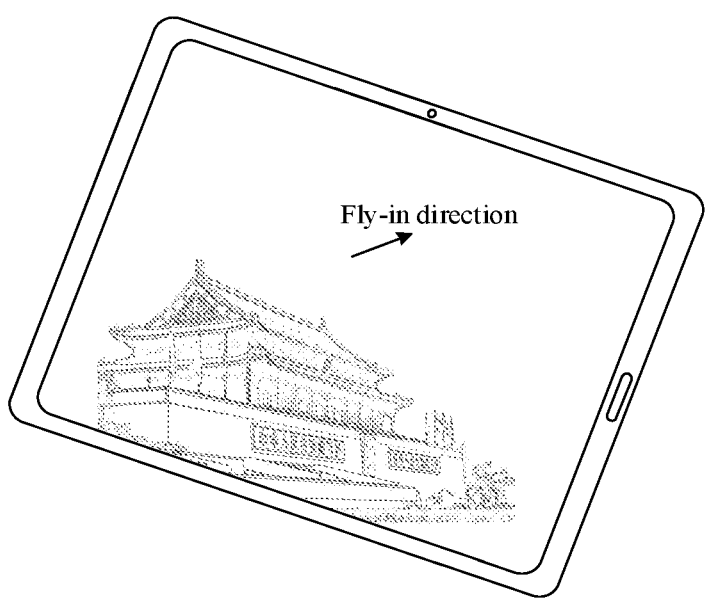
TO
FIG. 8C
FIG. 8B

CONT. FROM FIG. 18A

TO FIG. 18C

CONT. FROM FIG. 18B

SHORT-DISTANCE INFORMATION TRANSMISSION METHOD AND ELECTRONIC DEVICE

CROSS-REFERENCE TO RELATED APPLICATIONS

This is a continuation of International Patent Application No. PCT/CN2020/110194 filed on Aug. 20, 2020, which claims priority to Chinese Patent Application No. 201910824358.9 filed on Sep. 2, 2019. The disclosures of the aforementioned applications are hereby incorporated by reference in their entireties.

TECHNICAL FIELD

This disclosure relates to the field of electronic devices, and in particular, to a short-distance information transmission method and an electronic device.

BACKGROUND

When a file (for example, a photo or a video) is transferred between electronic devices, a user generally needs to first use one electronic device to search for the other electronic device, and the user needs to perform confirmation after the other electronic device is found. Information can be transmitted between the electronic devices only after the user performs confirmation.

Such a file transfer process is relatively complex, and learning costs of the user are relatively high. Consequently, efficiency of file transfer between the two electronic devices is relatively low.

SUMMARY

This disclosure provides a short-distance information transmission method and an electronic device, to improve efficiency of information transmission between electronic devices.

According to a first aspect, a short-distance information transmission method is provided. The method is applied to a first electronic device, the first electronic device communicates with a second electronic device through a short-distance wireless connection, and the method includes that the first electronic device receives a first indication message sent by the second electronic device. The first indication message is used to indicate a first angle, and the first angle is an included angle between a sliding direction of a finger of a user detected on a screen of the second electronic device and a preset geographic direction. The first electronic device determines a second angle. The second angle is an included angle between the preset geographic direction and a connection line between an antenna location of the first electronic device and an antenna location of the second electronic device. When the first electronic device determines that the first angle and the second angle meet a preset condition, the first electronic device displays, on a screen of the first electronic device, an animation in which to-be-transmitted information is transmitted according to the sliding direction of the finger of the user.

In this embodiment of this disclosure, after determining the included angle between the sliding direction of the finger of the user on the second electronic device and the preset geographic direction, the first electronic device may determine that the first electronic device is a device for receiving the to-be-transmitted information on the second electronic device, and may also determine a fly-in effect of the to-be-transmitted information. In this way, when the to-be-transmitted information is received, it can be ensured that the sliding direction of the finger of the user on the second electronic device is consistent with an incoming direction of the to-be-transmitted information on the first electronic device. This improves visual experience of the user, and provides a realistic effect for the user.

In some possible implementations, that the first electronic device receives a first indication message sent by the second electronic device includes that the first electronic device receives a third angle and a fourth angle that are sent by the second electronic device. The third angle is an included angle between the preset geographic direction and a connection line between a location of a first preset part and a location of a second preset part on the second electronic device, and the fourth angle is an included angle between the sliding direction of the finger of the user and the connection line between the location of the first preset part and the location of the second preset part. The method further includes that the first electronic device determines the first angle based on the third angle and the fourth angle.

In this embodiment of this disclosure, after detecting the third angle and the fourth angle, the second electronic device may send the third angle and the fourth angle to the first electronic device, and the first electronic device calculates the first angle. In this way, calculation processing of the second electronic device can be reduced.

For example, the location of the first preset part may be a central location of the second electronic device, and the location of the second preset part may be a location of a camera of the second electronic device.

In some possible implementations, the third angle may be an angle detected by a compass of the second electronic device.

In some possible implementations, the first indication message includes information about the first angle, and the first angle may be obtained by the second electronic device based on the third angle and the fourth angle.

In this embodiment of this disclosure, after detecting the third angle and the fourth angle, the second electronic device may determine the first angle based on the third angle and the fourth angle, and use the first indication message to carry the first angle. In this way, the second electronic device may determine the first angle at a moment at which the second electronic device detects sliding of the finger of the user, and send the first angle to the first electronic device. This can reduce a delay in an information transmission process.

With reference to the first aspect, in some possible implementations of the first aspect, the first electronic device includes a BLUETOOTH/WI-FI antenna array. That the first electronic device determines a second angle includes that the first electronic device determines the second angle based on a radio signal that is sent by the second electronic device and received by the BLUETOOTH/WI-FI antenna array.

In this embodiment of this disclosure, the first electronic device may include the BLUETOOTH/WI-FI antenna array, and the first electronic device may calculate an angle of arrival (AOA) by using the BLUETOOTH/WI-FI antenna array, to ensure that the first electronic device can obtain the second angle through calculation.

With reference to the first aspect, in some possible implementations of the first aspect, before that the first electronic device displays, on a screen of the first electronic device, an animation in which to-be-transmitted information is transmitted according to the sliding direction of the finger of the user, the method further includes that the first electronic device determines that a distance between the first electronic device and the second electronic device is less than or equal to a preset distance.

In this embodiment of this disclosure, the first electronic device may determine a distance between the first electronic device and the second electronic device, and may indicate the second electronic device to transmit the to-be-transmitted information when the distance meets a preset condition. This helps ensure information transmission security.

In some possible implementations, the to-be-transmitted information may include information such as a photo, a video, a text, a document, a web page link, and the like.

According to a second aspect, a short-distance information transmission method is provided. The method is applied to a first electronic device, the first electronic device communicates with a second electronic device through a short-distance wireless connection, and the method includes that the first electronic device receives a first indication message sent by the second electronic device. The first indication message is used to indicate a first angle, and the first angle is an included angle between a sliding direction of a finger of a user detected on a screen of the second electronic device and a preset geographic direction. The first electronic device determines a second angle. The second angle is an included angle between the preset geographic direction and a connection line between an antenna location of the first electronic device and an antenna location of the second electronic device. When the first electronic device determines that the first angle and the second angle meet a preset condition, the first electronic device displays to-be-transmitted information sent by the second electronic device.

In this embodiment of this disclosure, when the second electronic device does not have a computing capability of a relative location between the first electronic device and the second electronic device, the second electronic device may send, to the first electronic device, the first indication message indicating the first angle, and the first electronic device determines, based on the first angle and the second angle, whether the first electronic device is a proper receiver device, so as to indicate the second electronic device to perform information transmission. This helps improve efficiency of information transmission between electronic devices.

In some possible implementations, that the first electronic device receives a first indication message sent by the second electronic device includes that the first electronic device receives a third angle and a fourth angle that are sent by the second electronic device. The third angle is an included angle between the preset geographic direction and a connection line between a location of a first preset part and a location of a second preset part on the second electronic device, and the fourth angle is an included angle between the sliding direction of the finger of the user and the connection line between the location of the first preset part and the location of the second preset part. The method further includes that the first electronic device determines the first angle based on the third angle and the fourth angle.

In this embodiment of this disclosure, after detecting the third angle and the fourth angle, the second electronic device may send the third angle and the fourth angle to the first electronic device, and the first electronic device calculates the first angle. In this way, calculation processing of the second electronic device can be reduced.

For example, the location of the first preset part may be a central location of the second electronic device, and the location of the second preset part may be a location of a camera of the second electronic device.

In some possible implementations, the third angle may be an angle detected by a compass of the second electronic device.

In some possible implementations, the first indication message includes information about the first angle, and the first angle may be obtained by the second electronic device based on the third angle and the fourth angle.

In this embodiment of this disclosure, after detecting the third angle and the fourth angle, the second electronic device may determine the first angle based on the third angle and the fourth angle, and use the first indication message to carry the first angle. In this way, the second electronic device may determine the first angle at a moment at which the second electronic device detects sliding of the finger of the user, and send the first angle to the first electronic device. This can reduce a delay in an information transmission process.

With reference to the second aspect, in some possible implementations of the second aspect, the first electronic device includes a BLUETOOTH/WI-FI antenna array. That the first electronic device determines a second angle includes that the first electronic device determines the second angle based on a radio signal that is sent by the second electronic device and received by the BLUETOOTH/WI-FI antenna array.

In this embodiment of this disclosure, the first electronic device may include the BLUETOOTH/WI-FI antenna array, and the first electronic device may calculate an AOA by using the BLUETOOTH/WI-FI antenna array, to ensure that the first electronic device can obtain the second angle through calculation.

With reference to the second aspect, in some possible implementations of the second aspect, before that the first electronic device displays, on a screen of the first electronic device, an animation in which to-be-transmitted information is transmitted according to the sliding direction of the finger of the user, the method further includes that the first electronic device determines that a distance between the first electronic device and the second electronic device is less than or equal to a preset distance.

In this embodiment of this disclosure, the first electronic device may determine a distance between the first electronic device and the second electronic device, and may indicate the second electronic device to transmit the to-be-transmitted information when the distance meets a preset condition. This helps ensure information transmission security.

In some possible implementations, the to-be-transmitted information may include information such as a photo, a video, a text, a document, a web page link, and the like.

According to a third aspect, a short-distance information transmission method is provided. The method may be applied to a second electronic device, and the method includes that the second electronic device determines a third angle and a fourth angle. The third angle is an included angle between a preset geographic direction and a connection line between a location of a first preset part and a location of a second preset part on the second electronic device, and the fourth angle is an included angle between a sliding direction of a finger of a user and the connection line between the location of the first preset part and the location of the second preset part. The second electronic device sends the third angle and the fourth angle to the first electronic device, or after the second electronic device determines a first angle based on the third angle and the fourth angle, where the first angle is an included angle between the sliding direction of the finger of the user detected on a screen of the second electronic device and the preset geographic direction, the second electronic device sends the first angle to the first electronic device. The second electronic device sends to-be-transmitted information to the first electronic device.

In this embodiment of this disclosure, when the second electronic device does not have a computing capability of a relative location between the first electronic device and the second electronic device, the second electronic device may indicate the third angle and the fourth angle to the first electronic device, or may indicate the first angle to the first electronic device, and the first electronic device determines whether the first electronic device is a proper receiver device, so as to indicate the second electronic device to perform information transmission. This helps improve efficiency of information transmission between electronic devices.

With reference to the third aspect, in some possible implementations of the third aspect, before that the second electronic device sends to-be-transmitted information to the first electronic device, the method further includes that the second electronic device receives response information sent by the first electronic device. The response information is used to indicate the second electronic device to send the to-be-transmitted information to the first electronic device.

With reference to the third aspect, in some possible implementations of the third aspect, before that the second electronic device sends to-be-transmitted information to the first electronic device, the method further includes that the second electronic device determines that a distance between the second electronic device and the first electronic device is less than or equal to a preset distance.

In some possible implementations, the to-be-transmitted information may include information such as a photo, a video, a text, a document, a web page link, and the like.

According to a fourth aspect, a short-distance information transmission method is provided. The method is applied to a first electronic device, the first electronic device communicates with a second electronic device through a short-distance wireless connection, and the method includes that the first electronic device receives a first indication message sent by the second electronic device. The first indication message is used to indicate a first angle, and the first angle is an included angle between a preset geographic direction and a connection line between a location of a first preset part and a location of a second preset part on the second electronic device. The first electronic device determines a second angle. The second angle is an included angle between the preset geographic direction and a connection line between an antenna location of the first electronic device and an antenna location of the second electronic device. When the first electronic device determines that the first angle and the second angle meet a preset condition, the first electronic device displays to-be-transmitted information sent by the second electronic device.

In this embodiment of this disclosure, when the second electronic device does not have a computing capability of a relative location between the first electronic device and the second electronic device, the second electronic device may indicate the first angle to the first electronic device, and the first electronic device determines whether the first electronic device is a proper receiver device, so as to indicate the second electronic device to perform information transmission. This helps improve efficiency of information transmission between electronic devices.

For example, the location of the first preset part may be a central location of the second electronic device, and the location of the second preset part may be a location of a camera of the second electronic device.

In some possible implementations, the first angle may be an angle detected by a compass of the second electronic device.

With reference to the fourth aspect, in some possible implementations of the fourth aspect, the first electronic device includes a BLUETOOTH/WI-FI antenna array. That the first electronic device determines a second angle includes that the first electronic device determines the second angle based on a radio signal that is sent by the second electronic device and received by the BLUETOOTH/WI-FI antenna array.

In this embodiment of this disclosure, the first electronic device may include the BLUETOOTH/WI-FI antenna array, and the first electronic device may calculate an AOA by using the BLUETOOTH/WI-FI antenna array, to ensure that the first electronic device can obtain the second angle through calculation.

With reference to the fourth aspect, in some possible implementations of the fourth aspect, before that the first electronic device displays, on a screen of the first electronic device, an animation in which to-be-transmitted information is transmitted according to a sliding direction of a finger of a user, the method further includes that the first electronic device determines that a distance between the first electronic device and the second electronic device is less than or equal to a preset distance.

In this embodiment of this disclosure, the first electronic device may determine a distance between the first electronic device and the second electronic device, and may indicate the second electronic device to transmit the to-be-transmitted information when the distance meets a preset condition. This helps ensure information transmission security.

In some possible implementations, the to-be-transmitted information may include information such as a photo, a video, a text, a document, a web page link, and the like.

According to a fifth aspect, a short-distance information transmission method is provided. The method may be applied to a second electronic device, and the method includes that the second electronic device determines a first angle. The first angle is an included angle between a preset geographic direction and a connection line between a location of a first preset part and a location of a second preset part on the second electronic device. The second electronic device sends a first indication message to a first electronic device. The first indication message includes information about the first angle. The second electronic device receives response information sent by the first electronic device. The response information is used to indicate the second electronic device to transmit to-be-transmitted information to the first electronic device. The second electronic device sends the to-be-transmitted information to the first electronic device.

With reference to the fifth aspect, in some possible implementations of the fifth aspect, before that the second electronic device sends the to-be-transmitted information to the first electronic device, the method further includes that the second electronic device determines that a distance between the second electronic device and the first electronic device is less than or equal to a preset distance.

In this embodiment of this disclosure, when the second electronic device does not have a computing capability of a relative location between the first electronic device and the second electronic device, the second electronic device may indicate the first angle to the second electronic device, and the first electronic device determines whether the first electronic device is a proper receiver device, so as to indicate the second electronic device to perform information transmission. This helps improve efficiency of information transmission between electronic devices.

According to a sixth aspect, a chip system is provided. The chip system includes a system on a chip (SOC). The SOC is configured to control a wireless communications module to receive a first indication message sent by a first electronic device. The first indication message is used to indicate a first angle, and the first angle is an included angle between a sliding direction of a finger of a user detected on a screen of the first electronic device and a preset geographic direction. The SOC is further configured to determine a second angle. The second angle is an included angle between the preset geographic direction and a connection line between the wireless communications module and an antenna location of the first electronic device. The SOC is further configured to when it is determined that the first angle and the second angle meet a preset condition, control a display to display to-be-transmitted information transmitted from the first electronic device according to the sliding direction of the finger of the user.

In some possible implementations, the wireless communications module includes a BLUETOOTH/WI-FI antenna array. The SOC is further configured to control the BLUETOOTH/WI-FI antenna array to receive a radio signal sent by the first electronic device, and determine the second angle based on the radio signal.

In some possible implementations, the SOC is further configured to determine that a distance between the wireless communications module and a second electronic device is less than or equal to a preset distance.

According to a seventh aspect, a chip system is provided. The chip system includes a SOC. The SOC is configured to control a wireless communications module to receive a first indication message sent by a first electronic device. The first indication message is used to indicate a first angle, and the first angle is an included angle between a preset geographic direction and a connection line between a location of a first preset part and a location of a second preset part on the first electronic device. The SOC is further configured to determine a second angle. The second angle is an included angle between the preset geographic direction and a connection line between the wireless communications module and an antenna location of the first electronic device. The SOC is further configured to when it is determined that the first angle and the second angle meet a preset condition, control a display to display to-be-transmitted information sent by the first electronic device.

In some possible implementations, the wireless communications module includes a BLUETOOTH/WI-FI antenna array. The SOC is further configured to control the BLUETOOTH/WI-FI antenna array to receive a radio signal sent by the first electronic device, and determine the second angle based on the radio signal.

In some possible implementations, the SOC is further configured to determine that a distance between the wireless communications module and a second electronic device is less than or equal to a preset distance.

According to an eighth aspect, a chip system is provided. The chip system includes a SOC. The SOC is configured to control a wireless communications module to receive a first indication message sent by a first electronic device. The first indication message is used to indicate a first angle, and the first angle is an included angle between a sliding direction of a finger of a user detected on a screen of the first electronic device and a preset geographic direction. The SOC is further configured to determine a second angle. The second angle is an included angle between the preset geographic direction and a connection line between the wireless communications module and an antenna location of the first electronic device. The SOC is further configured to when it is determined that the first angle and the second angle meet a preset condition, control a display to display to-be-transmitted information sent by the first electronic device.

In some possible implementations, the wireless communications module includes a BLUETOOTH/WI-FI antenna array. The SOC is further configured to control the BLUETOOTH/WI-FI antenna array to receive a radio signal sent by the first electronic device, and determine the second angle based on the radio signal.

In some possible implementations, the SOC is further configured to determine that a distance between the wireless communications module and a second electronic device is less than or equal to a preset distance.

According to a ninth aspect, an electronic device is provided, including one or more processors, a memory, a display, a wireless communications module, and one or more computer programs. The one or more computer programs are stored in the memory. The one or more computer programs include instructions. When the instructions are executed by the electronic device, the electronic device is enabled to perform the short-distance information transmission method in the possible implementations of the first aspect or the second aspect.

According to a tenth aspect, an electronic device is provided, including one or more processors, a memory, a display, a wireless communications module, and one or more computer programs. The one or more computer programs are stored in the memory. The one or more computer programs include instructions. When the instructions are executed by the electronic device, the electronic device is enabled to perform the short-distance information transmission method in the possible implementations of the fourth aspect.

According to an eleventh aspect, an electronic device is provided, including one or more processors, a memory, a display, a wireless communications module, and one or more computer programs. The one or more computer programs are stored in the memory. The one or more computer programs include instructions. When the instructions are executed by the electronic device, the electronic device is enabled to perform the short-distance information transmission method in the possible implementations of the third aspect.

According to a twelfth aspect, an electronic device is provided, including one or more processors, a memory, a display, a wireless communications module, and one or more computer programs. The one or more computer programs are stored in the memory. The one or more computer programs include instructions. When the instructions are executed by the electronic device, the electronic device is enabled to perform the short-distance information transmission method in the possible implementations of the fifth aspect.

According to a thirteenth aspect, this technical solution provides a system. The system includes a first electronic device and a second electronic device. The first electronic device may be the first electronic device in the first aspect, and the second electronic device may be the second electronic device in the third aspect. Alternatively, the first electronic device may be the first electronic device in the second aspect, and the second electronic device may be the second electronic device in the third aspect. Alternatively, the first electronic device may be the first electronic device in the fourth aspect, and the second electronic device may be the second electronic device in the fifth aspect.

According to a fourteenth aspect, this technical solution provides a computer-readable storage medium, including computer instructions. When the computer instructions are run on an electronic device, the electronic device is enabled to perform the short-distance information transmission method in the possible implementations of the first aspect or the second aspect.

According to a fifteenth aspect, this technical solution provides a computer-readable storage medium, including computer instructions. When the computer instructions are run on an electronic device, the electronic device is enabled to perform the short-distance information transmission method in the possible implementations of the fourth aspect.

According to a sixteenth aspect, this technical solution provides a computer-readable storage medium, including computer instructions. When the computer instructions are run on an electronic device, the electronic device is enabled to perform the short-distance information transmission method in the possible implementations of the third aspect.

According to a seventeenth aspect, this technical solution provides a computer-readable storage medium, including computer instructions. When the computer instructions are run on an electronic device, the electronic device is enabled to perform the short-distance information transmission method in the possible implementations of the fifth aspect.

BRIEF DESCRIPTION OF DRAWINGS

FIG. 5A, FIG. 5B, FIG. 5C, and FIG. 5D show another group of GUIs according to an embodiment of this disclosure;

DESCRIPTION OF EMBODIMENTS

Terms used in the following embodiments are merely intended to describe particular embodiments, but are not intended to limit this disclosure. As used in the specification and appended claims of this disclosure, words "a", "an", "the", "above", "this", and "this one" of singular forms are intended to also include plural forms, for example, "one or more", unless otherwise clearly specified in the context. It should be further understood that, in the following embodiments of this disclosure, "at least one" or "one or more" means one, two, or more. The term "and/or" is used to describe an association between associated objects and represents that three relationships may exist. For example, A and/or B may represent the following three cases: only A exists, both A and B exist, and only B exists, where A and B may be singular or plural. The character "/" generally indicates an "or" relationship between associated objects.

Reference to "an embodiment", "some embodiments", or the like described in this specification means that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise emphasized. The terms "include", "contain", "have", and their variants all mean "include but are not limited to", unless otherwise emphasized.

The following describes an electronic device, a user interface used for the electronic device, and embodiments used for using the electronic device. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, such as a laptop. It should be further understood that, in some other embodiments, the foregoing electronic device may not be the portable electronic device but a desktop computer.

Figure 1:
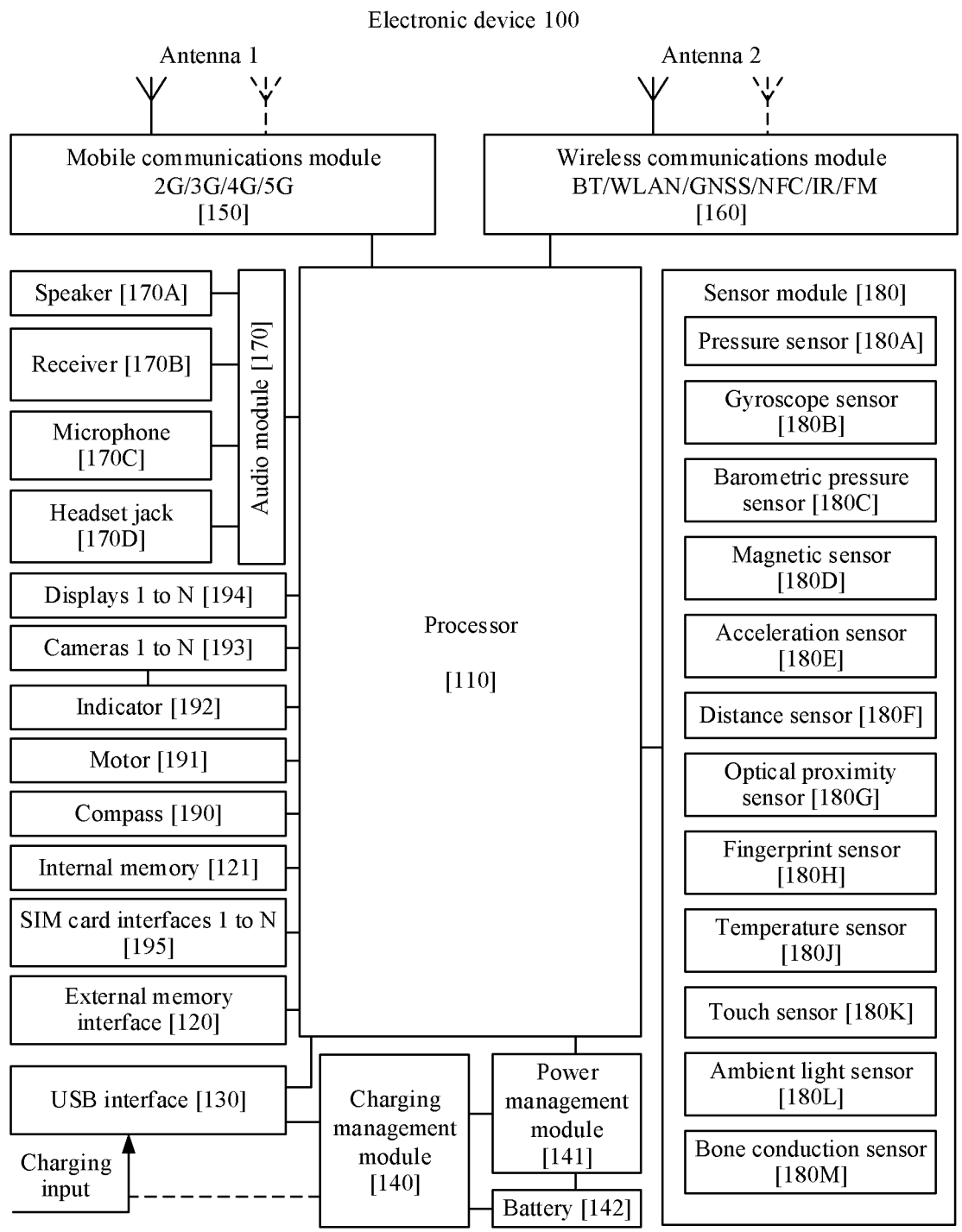
FIG. 1 is a schematic diagram of a hardware structure of an electronic device according to an embodiment of this disclosure.

For example, FIG. 1 is a schematic diagram of a structure of an electronic device 100. The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a compass 190, a motor 191, an indicator 192, a camera 193, a display 194, a subscriber identification module (SIM) card interface 195, and the like.

It may be understood that the structure shown in this embodiment of this disclosure does not constitute a specific limitation on the electronic device 100. In some other embodiments of this disclosure, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the electronic device 100 may alternatively include one or more processors 110. The controller may generate an operation control signal based on instruction operation code and a time sequence signal, to complete control of instruction reading and instruction execution. In some other embodiments, a memory may further be disposed in the processor 110, to store instructions and data. For example, the memory in the processor 110 may be a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving data processing or instruction execution efficiency of the electronic device 101.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 130 is an interface that conforms to a USB standard specification, and may be a mini USB interface, a micro USB interface, a USB Type-C interface, or the like. The USB interface 130 may be configured to connect to a charger to charge the electronic device 101, or may be configured to transmit data between the electronic device 101 and a peripheral device. The USB interface 130 may alternatively be configured to connect to a headset, and play audio by using the headset.

It may be understood that an interface connection relationship between modules illustrated in this embodiment of this disclosure is merely an example for description, and does not constitute a limitation on the structure of the electronic device 100. In some other embodiments of this disclosure, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the electronic device 100 and that includes wireless communication such as second generation (2G)/third generation (3G)/fourth generation (4G)/fifth generation (5G). The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal to an electromagnetic wave for radiation through the antenna 1. In some embodiments, at least some function modules of the mobile communications module 150 may be disposed in the processor 110. In some embodiments, at least some function modules in the mobile communications module 150 may be disposed in a same device as at least some modules in the processor 110.

The wireless communications module 160 may provide a wireless communication solution that is applied to the electronic device 100 and that includes a wireless local area network (WLAN) (for example, a WI-FI network), BLUETOOTH (BT), a global navigation satellite system (GNSS), frequency modulation (FM), a near-field communication (NFC) technology, and an infrared (IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In this embodiment of this disclosure, the electronic device may receive, through the wireless communications module, a radio signal sent by another electronic device, so as to determine a distance between the electronic device and the other electronic device and a position of the other electronic device relative to the electronic device according to the radio signal.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or more displays 194.

In some embodiments of this disclosure, when the display panel is made of a material such as an OLED, an AMOLED, or an FLED, the display 194 in FIG. 1 may be bent. Herein, that the display 194 may be bent means that the display may be bent to any angle at any part, and may be held at the angle. For example, the display 194 may be folded left and right from the middle. Alternatively, the display 194 may be folded up and down from the middle.

The display 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device configured with the foldable display.

The display 194 in this embodiment of this disclosure may be configured to display to-be-transmitted information. For example, the electronic device may display a picture to be sent to another electronic device. Alternatively, the display 194 may be configured to display to-be-transmitted information sent by another electronic device, for example, a picture or a video. When displaying the to-be-transmitted information sent by the other electronic device, the electronic device displays, on the display, an animation in which the to-be-transmitted information is transmitted according to a sliding direction of a finger of the user. The sliding direction of the finger of the user is a sliding direction of the finger of the user that is detected on the other electronic device.

The electronic device 100 may implement a shooting function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a red, green, and blue (RGB) format, a luma, blue projection, and red projection (YUV) format, or the like. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of coding formats, for example, Moving Picture Experts Group (MPEG)-1, MPEG-2, MPEG-3, and MPEG-4.

The NPU is a neural-network (NN) computing processor that rapidly processes input information by referring to a structure of a biological neural network, for example, by referring to a transfer mode between human brain neurons, and can further perform self-learning continuously. Applications such as intelligent cognition of the electronic device 100, for example, image recognition, facial recognition, speech recognition, and text understanding, may be implemented through the NPU.

The external memory interface 120 may be configured to connect to an external memory card, for example, a micro Secure Digital (SD) card, to extend a storage capability of the electronic device 100. The external memory card communicates with the processor 110 through the external memory interface 120, to implement a data storage function. For example, files such as music and videos are stored in the external memory card.

The internal memory 121 may be configured to store one or more computer programs, and the one or more computer programs include instructions. The processor 110 may run the instructions stored in the internal memory 121, so that the electronic device 101 performs a short-distance information transmission method provided in some embodiments of this disclosure, various applications, data processing, and the like. The internal memory 121 may include a program storage area and a data storage area. The program storage area may store an operating system. The program storage area may further store one or more applications (such as gallery and contacts), and the like. The data storage area may store data (for example, a photo or a contact) created in a process of using the electronic device 101, and the like. In addition, the internal memory 121 may include a high-speed random-access memory (RAM), or may include a non-volatile memory, for example, one or more magnetic disk storage devices, a flash memory device, or Universal Flash Storage (UFS). In some embodiments, the processor 110 may run the instructions stored in the internal memory 121 and/or the instructions stored in the memory that is disposed in the processor 110, so that the electronic device 101 performs the short-distance information transmission method provided in embodiments of this disclosure, other applications, and data processing. The electronic device 100 may implement audio functions such as music playing and recording functions by using the audio module 170, the speaker 170A, the receiver 170B, the microphone 170C, the headset jack 170D, the application processor, and the like.

In this embodiment of this disclosure, the electronic device may further send an ultrasonic sequence signal to another electronic device through the speaker 170A, and the other electronic device may determine a distance to the electronic device based on the received ultrasonic sequence. The electronic device may further receive, through the microphone 170C, an ultrasonic sequence sent by the other electronic device, so as to determine the distance to the other electronic device.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials.

When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation strength is less than a first pressure threshold is performed on an icon of Messages, an instruction for viewing a Short Message Service (SMS) message is executed. When a touch operation whose touch operation intensity is greater than or equal to the first pressure threshold is performed on the icon of Messages, an instruction for creating an SMS message is executed.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

In this embodiment of this disclosure, the gyroscope sensor 180 may calculate a posture of the electronic device 100. The posture of the electronic device 100 may be represented by an included angle between a preset geographic direction and a connection line between any two preset parts of the electronic device.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The ambient light sensor 180L is configured to sense ambient light luminance. The electronic device 100 may adaptively adjust brightness of the display 194 based on the sensed ambient light luminance. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

In this embodiment of this disclosure, after detecting a preset gesture of the user, the touch sensor 180K of the electronic device may determine that the electronic device enters an information transmission state, and the touch sensor 180K may further continue to detect the sliding direction of the finger of the user.

Figure 11:
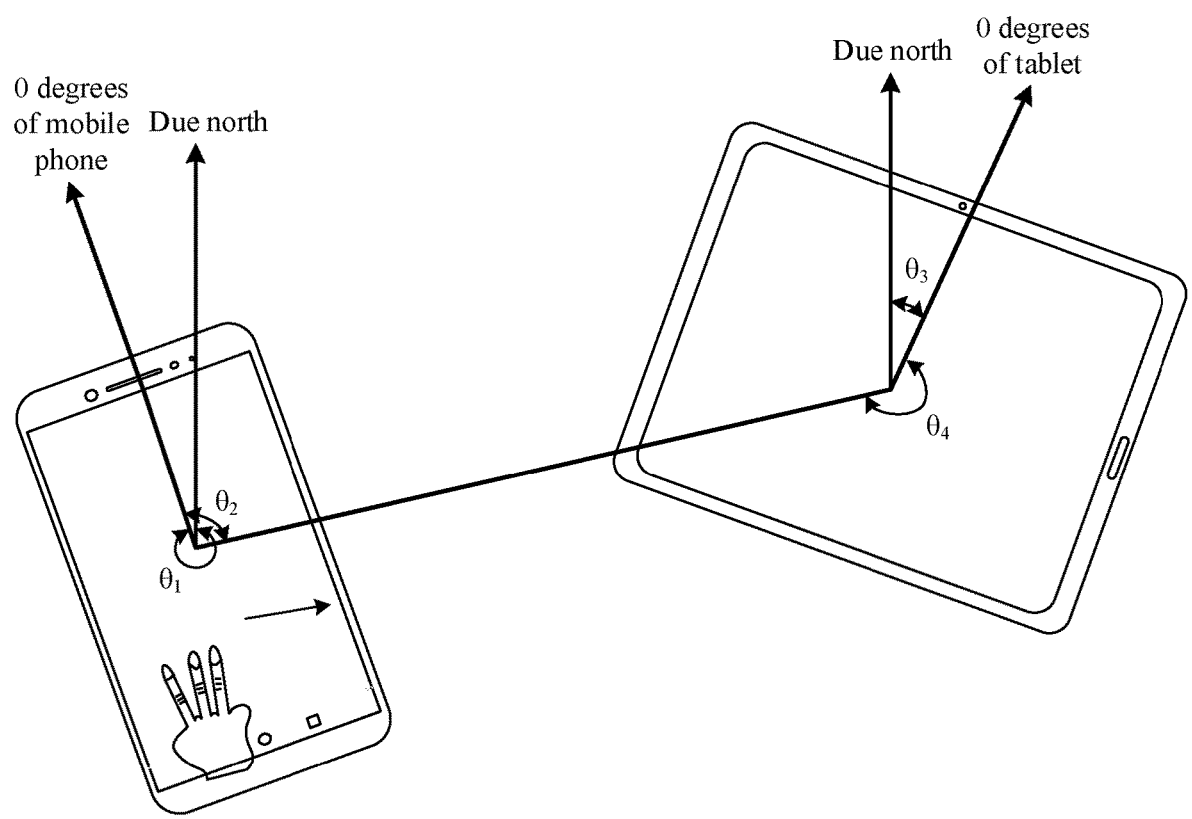
FIG. 11 is a schematic diagram of calculating relative location information of a mobile phone by a tablet according to an embodiment of this disclosure.

The compass 190 is configured to detect an angle at which a preset direction of the electronic device deviates from a due north direction. As shown in FIG. 11, a compass of a mobile phone may calculate that an included angle of 0 degrees of the mobile phone (a preset direction of the mobile phone) relative to due north is $\theta_1$, and a compass of a tablet may calculate that an included angle of 0 degrees of the tablet (the preset direction of the mobile phone) relative to due north is $\theta$.

In the embodiments of this disclosure, electronic devices may be classified into an electronic device having an AOA computing capability and an electronic device having no AOA computing capability. Hardware on which the electronic device having the AOA computing capability depends may include a compass, a BLUETOOTH/WI-FI antenna array, and the like. The BLUETOOTH/WI-FI antenna array includes at least three antennas. For example, a BLUETOOTH/WI-FI antenna array of a device 1 includes an antenna 1, an antenna 2, and an antenna 3 (not shown in the figure). Hardware on which the electronic device having no AOA computing capability depends may include a BLUETOOTH/WI-FI antenna, a compass, and the like.

It should be understood that an electronic device usually has a BLUETOOTH/WI-FI antenna. In this embodiment of this disclosure, the electronic device may support a BLUETOOTH protocol 5.1 and a later version.

Figure 2:
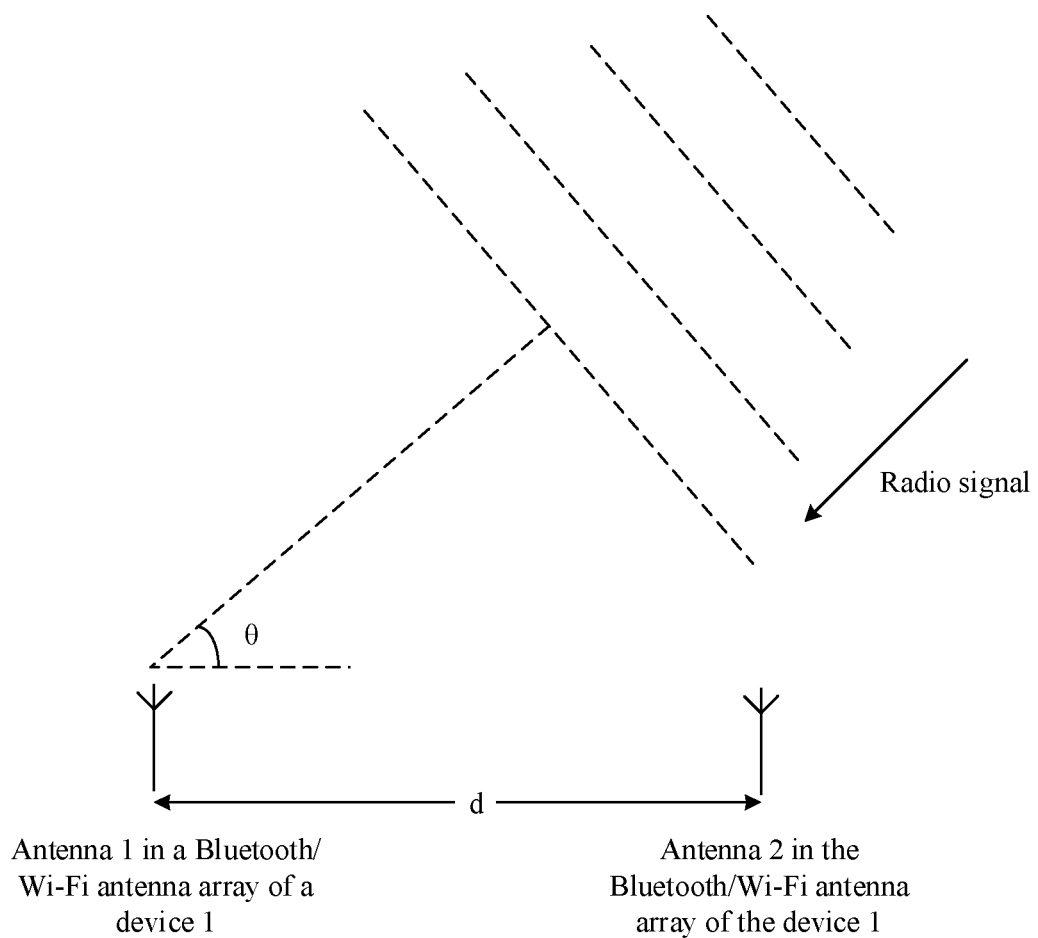
FIG. 2 is a schematic diagram of identifying an orientation of a device according to an embodiment of this disclosure.
Figure 3:
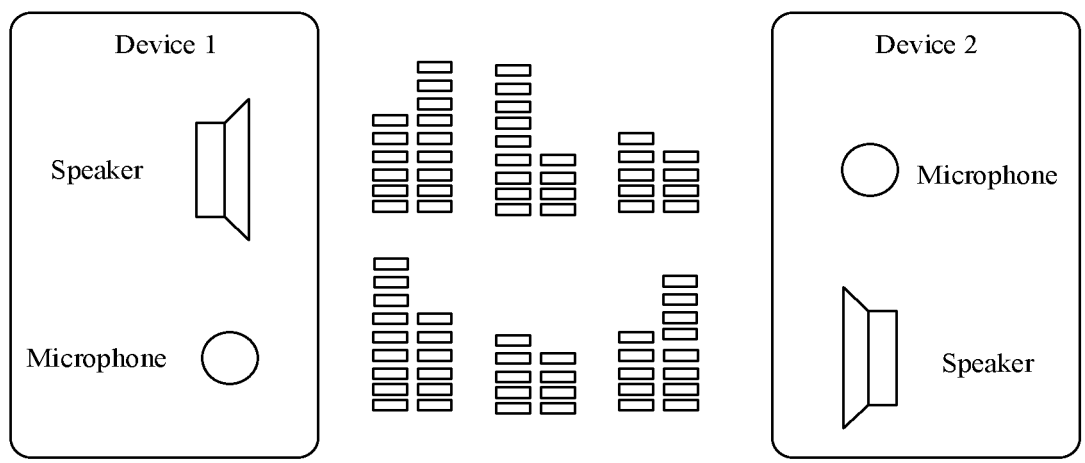
FIG. 3 is a schematic diagram of detecting a distance between two devices by using an ultrasonic wave according to an embodiment of this disclosure.

With reference to FIG. 2 and FIG. 3, the following describes schematic diagrams of identifying a position of a device and measuring a distance between devices according to an embodiment of this disclosure.

FIG. 2 is a schematic diagram of identifying an orientation of a device according to an embodiment of this disclosure. As shown in FIG. 2, a device 1 has a BLUETOOTH/WI-FI antenna array (or the device 1 has an AOA computing capability), and a device 2 does not have a BLUETOOTH/WI-FI antenna array (or the device 2 does not have an AOA computing capability). The device 1 may calculate an orientation of the device 2. The BLUETOOTH/WI-FI antenna array of the device 1 may receive a radio signal of the device 2, and calculate the orientation of the device 2 according to a formula (2):

$$\varphi = (2\pi d \cos(\theta))/\lambda \quad (1)$$

$$\theta = \cos^{-1}((\varphi\lambda)/(2\pi d)) \quad (2)$$

Herein, d is a distance between the BLUETOOTH/WI-FI antenna array of the device 1 and the BLUETOOTH/WI-FI antenna of the device 2, $\varphi$ is a phase difference between the BLUETOOTH/WI-FI antenna array of the device 1 and the BLUETOOTH/WI-FI antenna of the device 2, $\lambda$, is a wavelength of a BLUETOOTH signal sent by the device 2, and $\theta$ is an AoA. It should be understood that, in this embodiment of this disclosure, that the device 1 calculates the orientation of the device 2 may also be understood as that the device 1 may calculate an orientation of a connection line between the BLUETOOTH/WI-FI antenna array of the device 1 and the BLUETOOTH/WI-FI antenna of the device 2.

FIG. 3 is a schematic diagram of detecting a distance between two devices by using an ultrasonic wave according to an embodiment of this disclosure. As shown in FIG. 3, both a device 1 and a device 2 may include a speaker and a microphone, and may receive and send different ultrasonic sequence signals at the same time. The device 1 and the device 2 may calculate a distance between the device 1 and the device 2 based on the received ultrasonic sequence signal.

In this embodiment of this disclosure, in addition to detecting the distance between the device 1 and the device 2 based on an ultrasonic sequence, a BLUETOOTH/WI-FI antenna array may also be used to detect the distance between the device 1 and the device 2. For example, as shown in FIG. 2, the device 2 may send a radio signal to the device 1, and a BLUETOOTH/WI-FI antenna array of the device 1 may measure the distance between the device 1 and the device 2 based on signal strength or signal quality of the received radio signal.

The device 1 may perform distance measurement based on signal strength or signal quality of a radio signal received by one antenna in the BLUETOOTH/WI-FI antenna array. Alternatively, the device 1 may perform distance measurement based on signal strength or signal quality of radio signals received by two antennas in the BLUETOOTH/WI-FI antenna array, and finally may process (for example, average) measurement results of the two antennas to obtain a final distance detection result. Alternatively, the device 1 may perform distance measurement based on signal strength or signal quality of radio signals received by all three antennas in the BLUETOOTH/WI-FI antenna array, and finally may process (for example, average) measurement results of the three antennas to obtain a final distance detection result.

The signal strength and the signal quality (the following uses a Long-Term Evolution (LTE) system as an example for description) in this embodiment of this disclosure may include one or more of the following parameters:

(1) reference signal received power (RSRP);
(2) received signal strength indicator (RSSI);
(3) reference signal received quality (RSRQ); and
(4) signal to interference plus noise ratio (SINR).

FIG. 4A to FIG. 4E show a group of GUIs according to an embodiment of this disclosure.

Figures 4A, 4B, 4C:
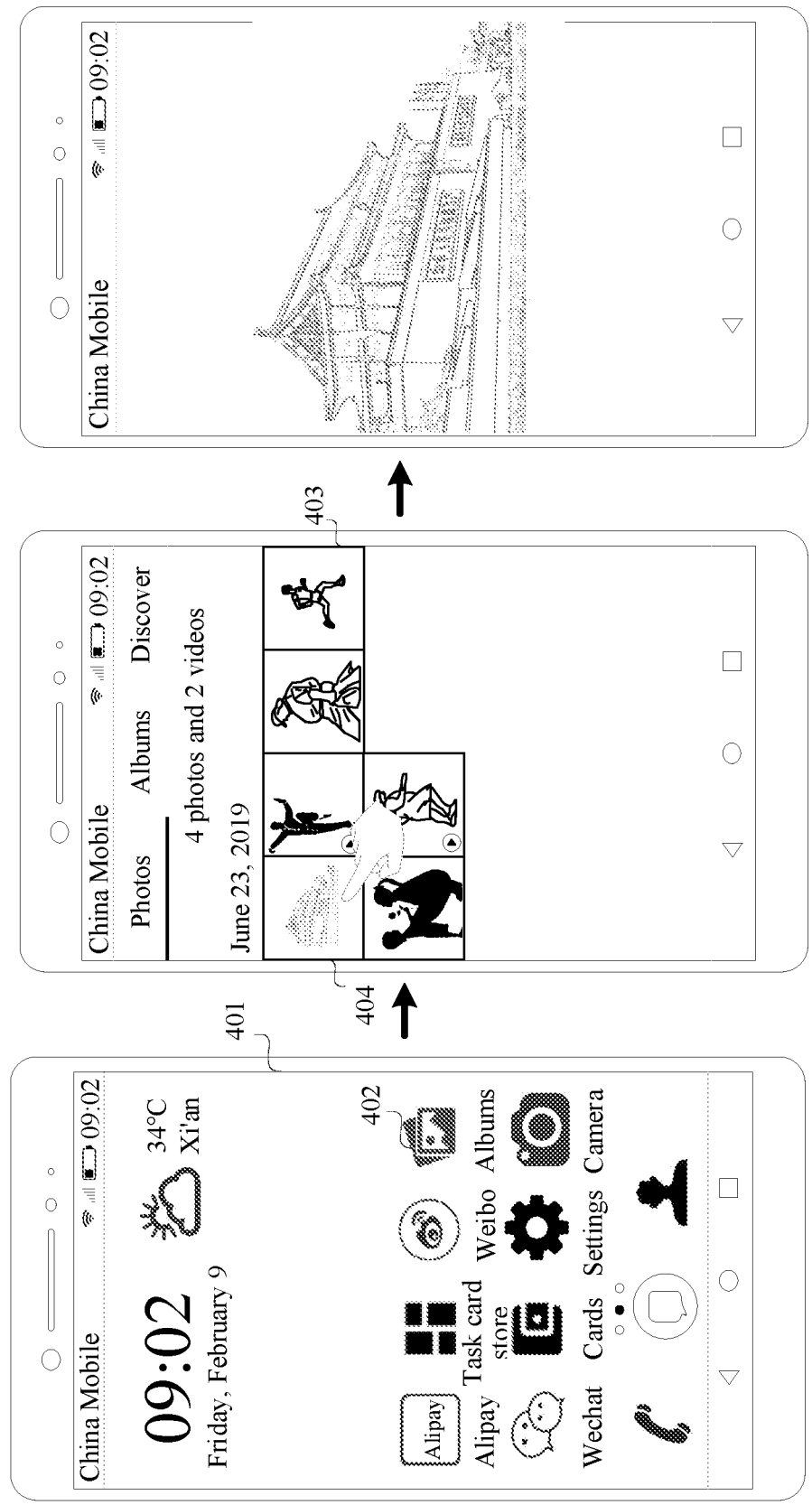
FIG. 4A, FIG. 4B, FIG. 4C, FIG. 4D, and FIG. 4E show a group of graphical user interfaces (GUIs) according to an embodiment of this disclosure.

Refer to FIG. 4A. The GUI is a home screen 401 of a mobile phone. After detecting an operation that a user taps an icon 402 of an album application (APP) on the home screen 401, the mobile phone may start the album application, and display a GUI shown in FIG. 4B. The GUI may be referred to as an album interface 403.

Refer to FIG. 4B. An album of the mobile phone may include four photos and two videos. After detecting an operation that the user taps a photo 404, the mobile phone displays a GUI shown in FIG. 4C. The GUI may be referred to as a display interface of the photo 404.

Refer to FIG. 4C. The photo 404 may be displayed on the GUI interface.

Figures 4D, 4E:
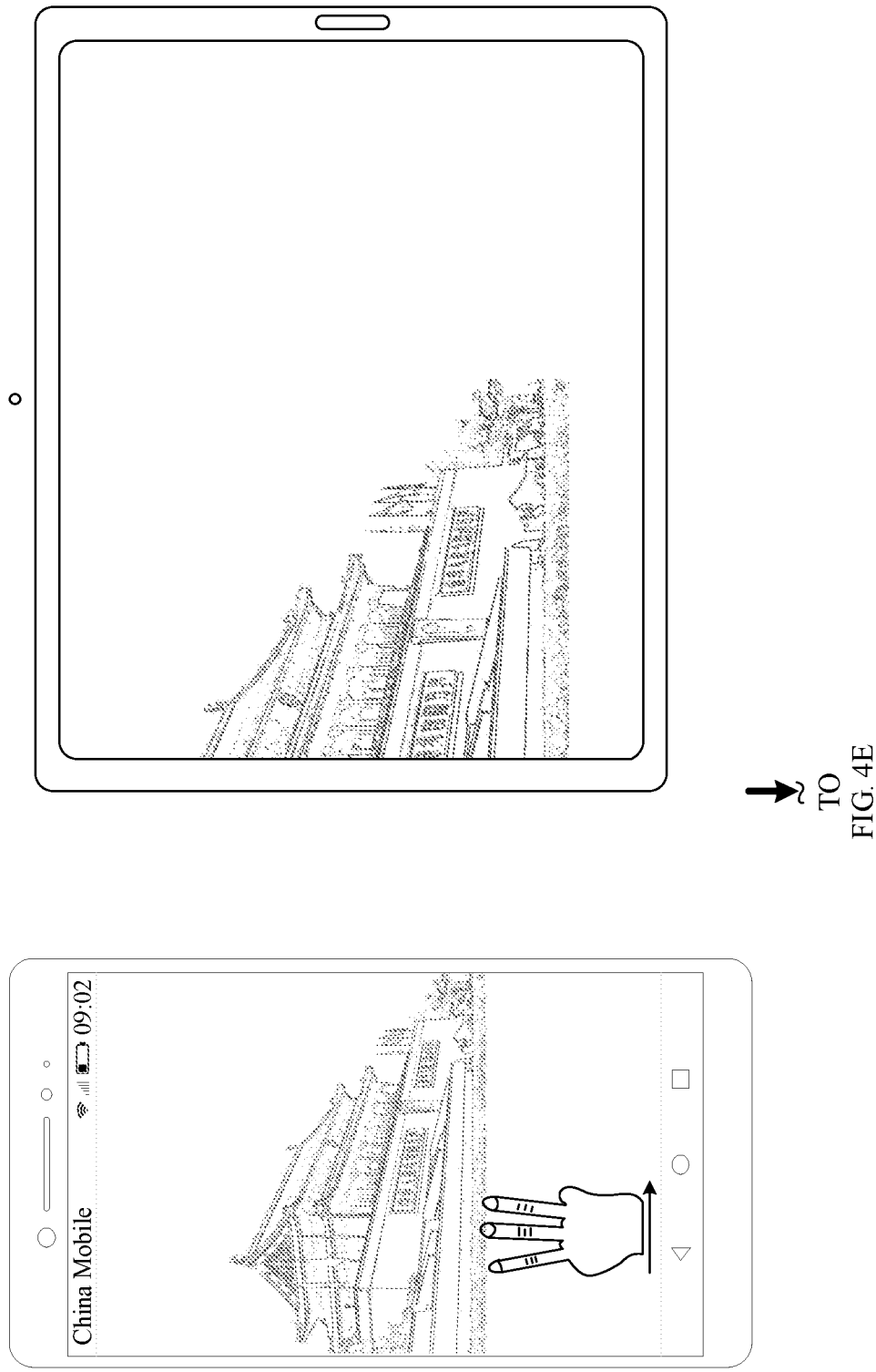

Refer to FIG. 4D and FIG. 4E. After the mobile phone detects a preset gesture of the user, the mobile phone may send the photo 404 to a tablet in a sliding direction of fingers.

For example, after the mobile phone detects the preset gesture of the user on the photo 404, the mobile phone may determine to enter an information transmission state, and then may send the photo 404 to the tablet in the sliding direction of the fingers.

For example, refer to FIG. 4D and FIG. 4E. After the mobile phone detects that the user performs an operation of sliding rightwards by using a plurality of fingers (three fingers in the figure) on the photo 404, the mobile phone may send the photo 404 to the tablet.

For another example, after the mobile phone detects that the user performs a touch and hold operation (for example, pressing time exceeds 1 s) by using a single finger or a plurality of fingers on the photo 404, the mobile phone enters the information transmission state.

For another example, after the mobile phone detects that the user performs a force touch operation (a pressing force is greater than or equal to a preset value) on the photo 404, the mobile phone enters the information transmission state.

For another example, the preset gesture may be an air gesture.

It should be understood that the air gesture is a gesture, a movement change of a hand, or the like that is made by the user when the hand does not touch a screen of an electronic device, but is at a specific distance from the screen of the electronic device. The specific distance between the hand of the user and the screen of the electronic device herein may be a preset distance, and the distance is determined based on a camera, a sensor, or the like that collects the air gesture.

It should be understood that at least one device between the mobile phone and the tablet needs to have an AOA computing capability, that is, at least one device between the mobile phone and the tablet has a BLUETOOTH/WI-FI antenna array, and both devices may support a BLUETOOTH protocol above BT5.1.

It should be further understood that, before information is transmitted between the mobile phone and the tablet, both the mobile phone and the tablet may enable a BLUETOOTH function. To transfer files between the mobile phone and the tablet more quickly, both the mobile phone and the tablet may enable BLUETOOTH and WI-FI functions. If the mobile phone does not enable the BLUETOOTH function, after the user executes the preset gesture on the mobile phone, the mobile phone may remind the user to enable BLUETOOTH (or enable the BLUETOOTH and WI-FI functions), so as to transmit information. If the mobile phone enables the BLUETOOTH or WI-FI function, but the tablet does not enable BLUETOOTH, the tablet cannot be scanned by the mobile phone. If the mobile phone enables the BLUETOOTH function (or the BLUETOOTH and WI-FI functions), and the tablet enables the BLUETOOTH function but not the WI-FI function, the tablet can be scanned by the mobile phone. Therefore, the tablet can also prompt the user to "enable the WI-FI function to improve a transmission speed". In this embodiment of this disclosure, after detecting the preset gesture of the user on to-be-transmitted information, the mobile phone may transmit the information in the mobile phone to the tablet in the preset gesture sliding direction, so that efficiency of sharing a file between a plurality of devices by the user can be improved.

FIG. 5A to FIG. 5D show another group of GUIs according to an embodiment of this disclosure.

Figure 5B:
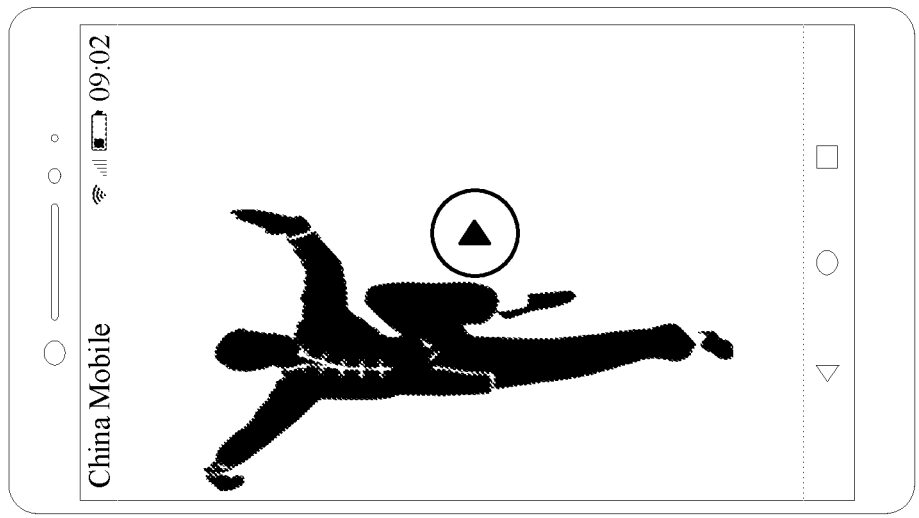
Figure 5A:
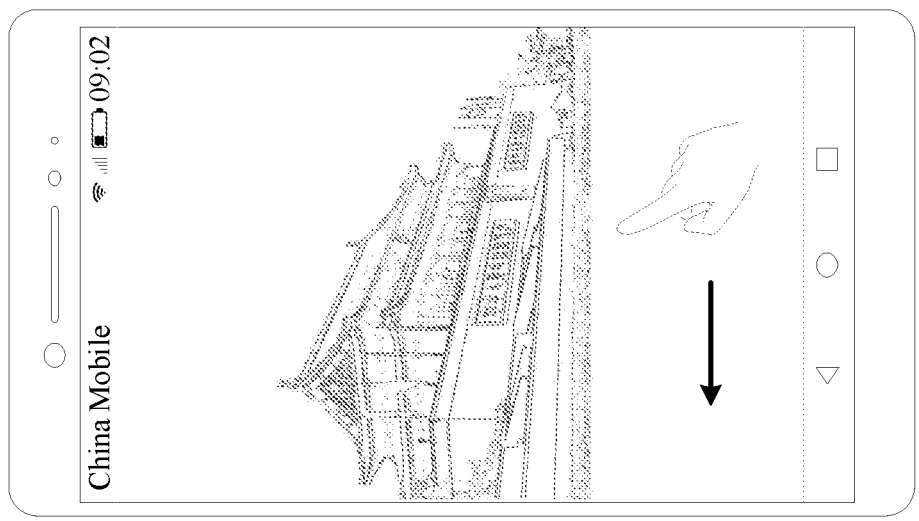

Refer to FIG. 5A. After the mobile phone transmits the photo 404 to the tablet, the user may continue to slide the picture to transmit a next photo. After detecting an operation of sliding the photo 404 by using a single finger of the user, the mobile phone may display a GUI shown in FIG. 5B. The GUI is a display interface of a video 501.

Refer to FIG. 5B. A video 502 may be displayed on the GUI interface.

Figure 5D:
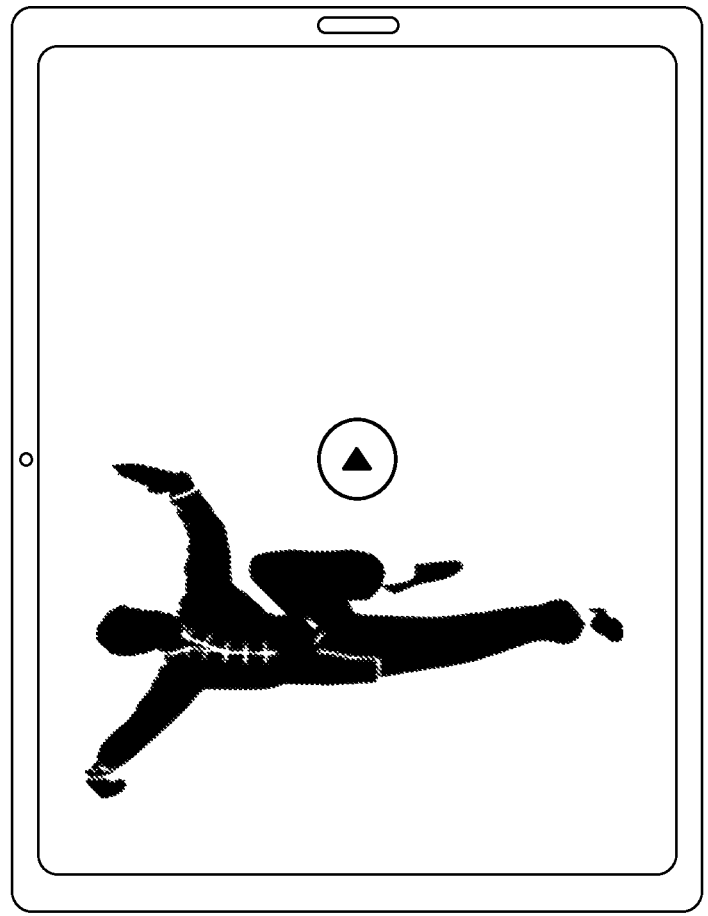
Figure 5D:
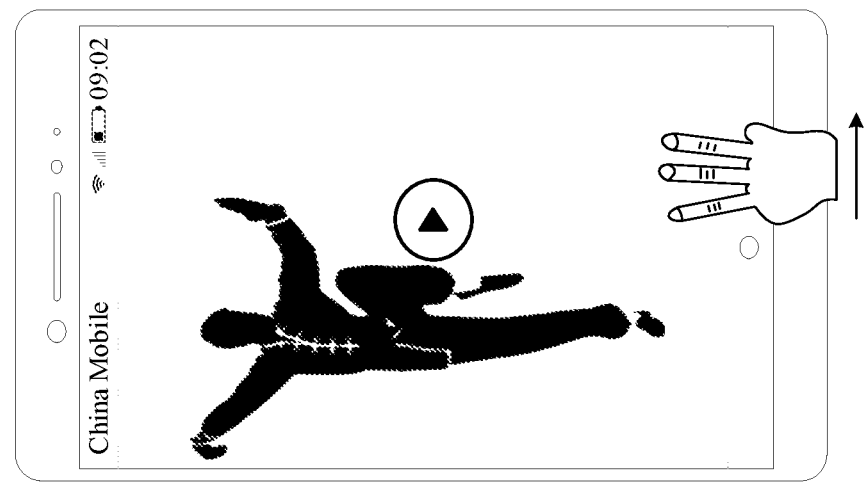

Refer to FIG. 5C and FIG. 5D. After the mobile phone detects the preset gesture of the user, the mobile phone may send the video 502 to the tablet in the preset gesture sliding direction.

In this embodiment of this disclosure, after transferring a photo to the tablet, the mobile phone may continue to transfer a video in the album to the tablet in the preset gesture sliding direction, so that efficiency of sharing a plurality of files between a plurality of devices by the user can be improved.

Figures 6A, 6B:
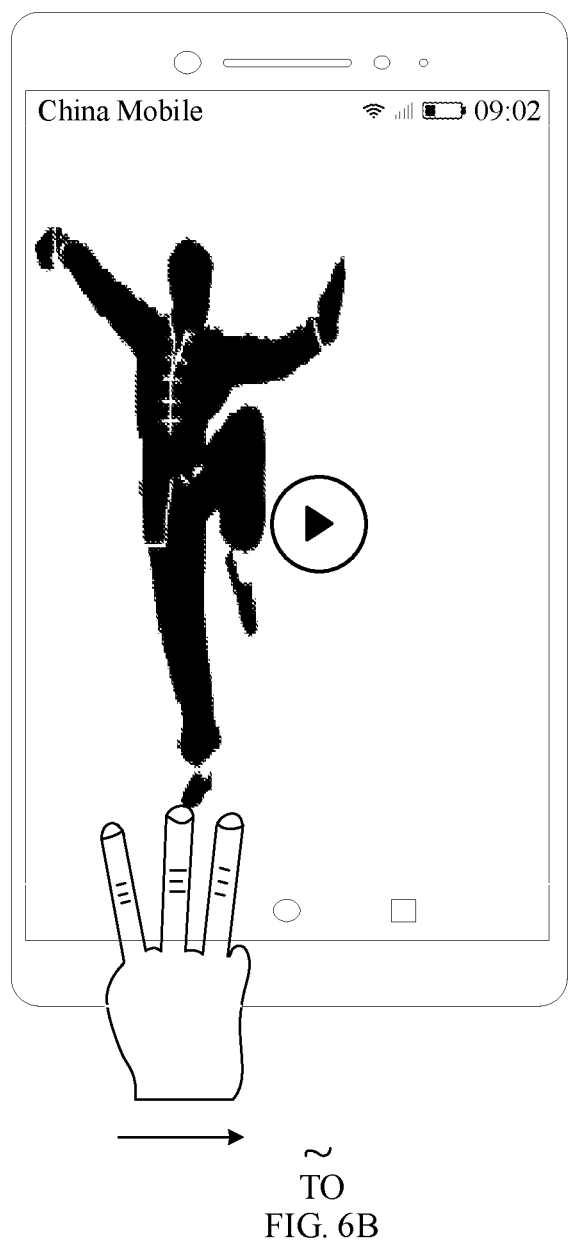
FIG. 6A, FIG. 6B, and FIG. 6C show another group of GUIs according to an embodiment of this disclosure.
Figures 6A, 6B, 6C:
Figure 6C:

FIG. 6A to FIG. 6C show another group of GUIs according to an embodiment of this disclosure. As shown in FIG. 6A to FIG. 6C, if a plurality of electronic devices is included in the preset gesture sliding direction, the mobile phone may transfer a photo 601 to both the tablet and a notebook computer.

In an embodiment, a distance between the tablet and the mobile phone, and a distance between the notebook computer and the mobile phone are all less than a preset distance threshold (for example, 30 centimeters (cm)).

In this embodiment of this disclosure, the mobile phone may transmit the to-be-transmitted information to the plurality of devices in the preset gesture sliding direction, to help improve efficiency of sharing a plurality of files between the plurality of devices by the user.

Figure 7A:
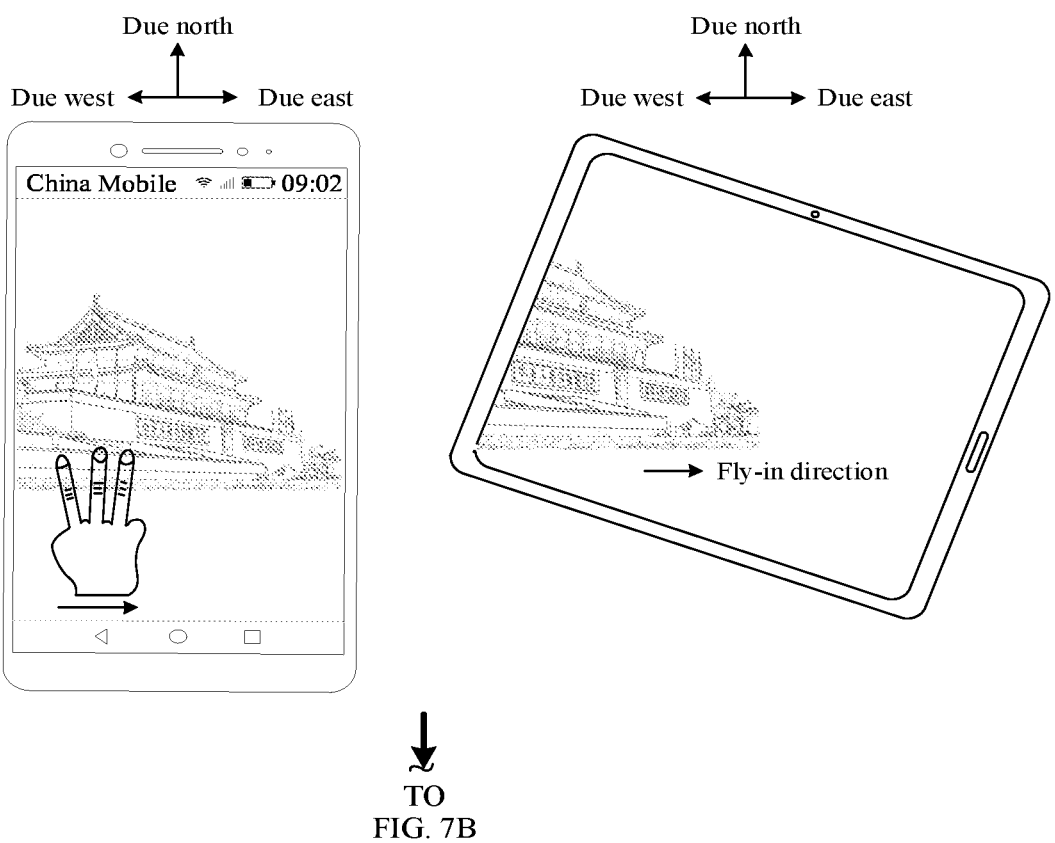
FIG. 7A, FIG. 7B, and FIG. 7C show another group of GUIs according to an embodiment of this disclosure.
Figure 7B:
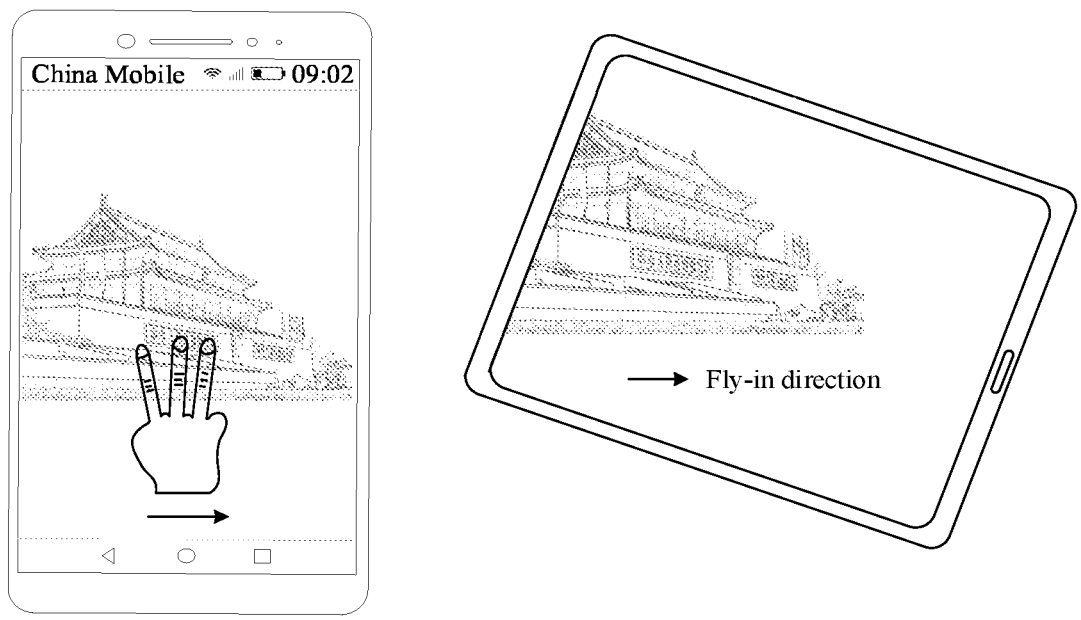
Figure 7C:
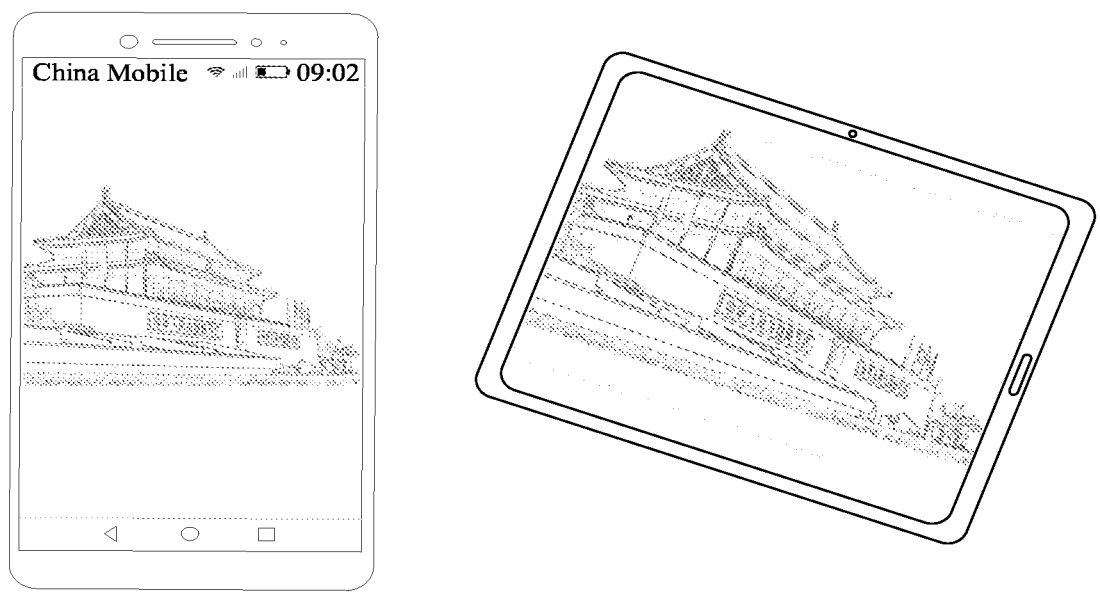

FIG. 7A to FIG. 7C show another group of GUIs according to an embodiment of this disclosure.

Refer to FIG. 7A to FIG. 7C. The mobile phone detects that a sliding direction of three fingers of the user is from due west to due east. When receiving a photo, the tablet may also receive the photo in a direction from due west to due east. In other words, a fly-in direction of the photo displayed on the tablet is from due west to due east.

It should be understood that a direction in which the photo displayed on the tablet gradually flies into the tablet may be from due west to due east, and the photo finally displayed on the tablet may be a complete photo, that is, a sideline of the photo is parallel to a sideline of the tablet.

Figures 8A, 8B:
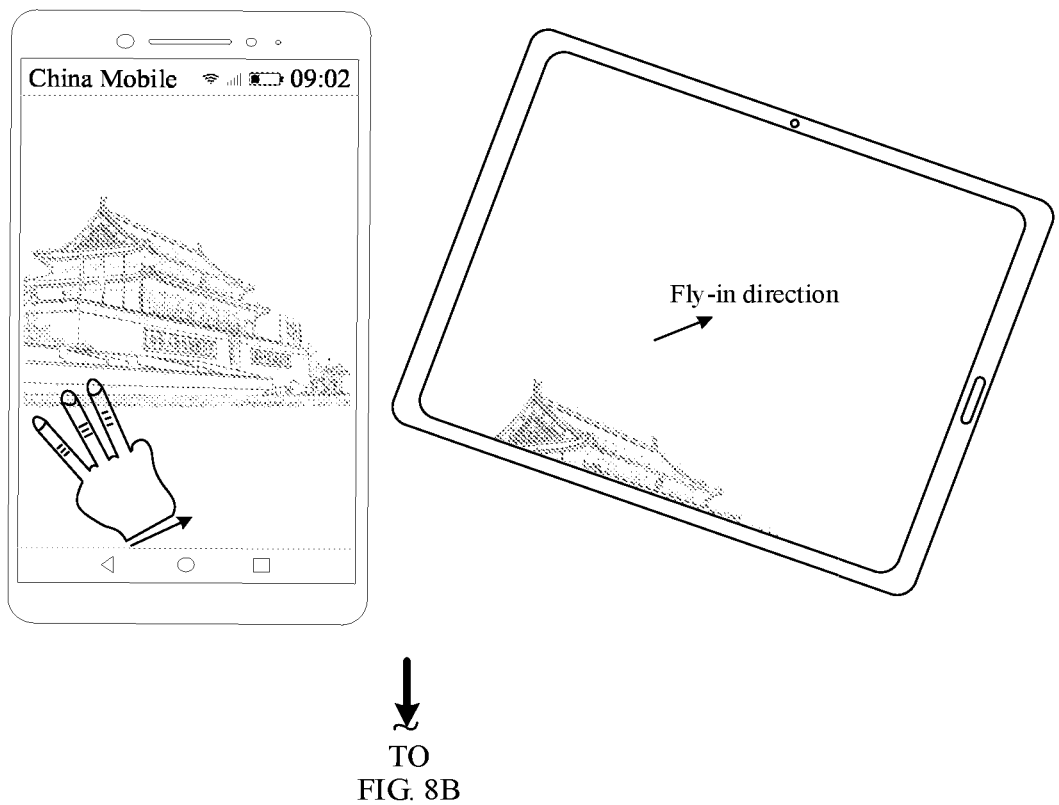
FIG. 8A, FIG. 8B, and FIG. 8C show another group of GUIs according to an embodiment of this disclosure.
Figure 8C:
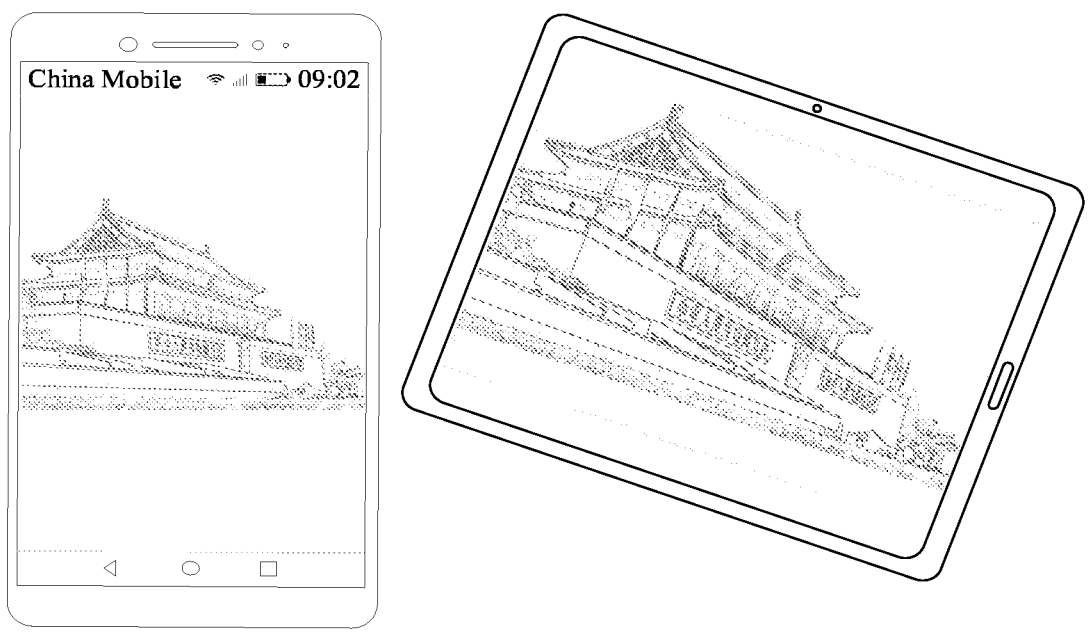

FIG. 8A to FIG. 8C show another group of GUIs according to an embodiment of this disclosure.

Refer to FIG. 8A to FIG. 8C. The mobile phone detects that a sliding direction of three fingers of the user is 60 degrees (°) east of due north. When receiving a photo, the tablet may also receive the photo in a direction of 60° east of due north. In other words, a fly-in direction of the photo displayed on the tablet is 60° east of due north.

It should be understood that a direction in which the photo displayed on the tablet gradually flies into the tablet may be 60° east of due north, and the photo finally displayed on the tablet may be a complete photo, that is, a sideline of the photo is parallel to a sideline of the tablet.

It should be further understood that due north, due east, or due west described in this embodiment of this disclosure is an absolute location.

In this embodiment of this disclosure, the tablet may receive, according to the preset gesture sliding direction, the file sent by the mobile phone. This helps improve user experience during file transfer.

Figure 9:
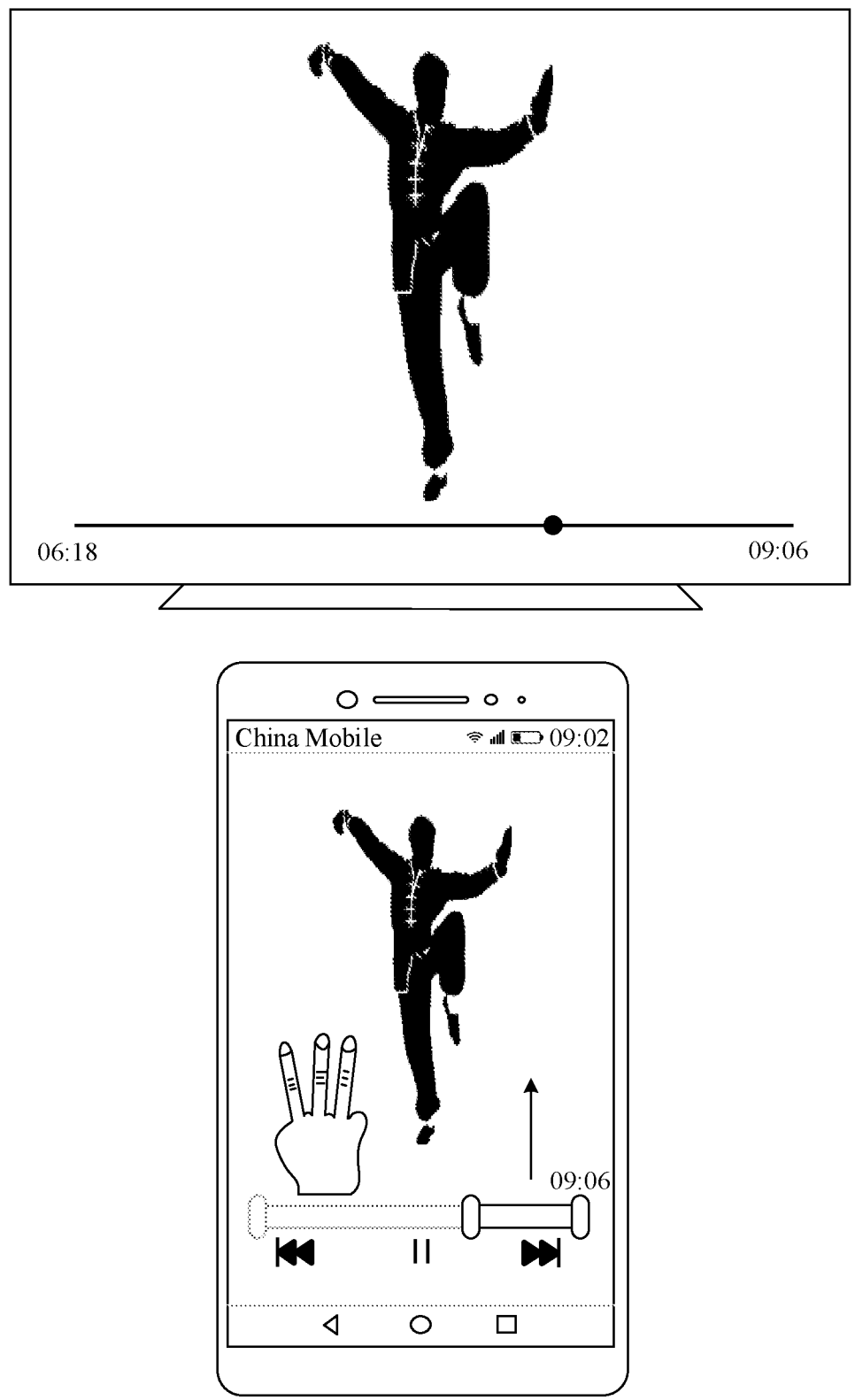
FIG. 9 shows another group of GUIs according to an embodiment of this disclosure.

FIG. 9 shows another group of GUIs according to an embodiment of this disclosure. As shown in FIG. 9, if the electronic device in the preset gesture sliding direction is a smart television (TV), the mobile phone may transfer the photo 601 to the smart TV for projection display.

In this embodiment of this disclosure, cumbersome operations of the mobile phone staying on a scanning interface to scan a Miracast device and waiting to connect to and project the scanned Miracast device selected by the user can be omitted, thereby helping improve user experience.

It should be understood that Miracast is a wireless display standard based on WI-FI Direct. A device that supports this standard may share a video image in a wireless manner. For example, the mobile phone may directly play a photo or a video on a television or another device by using Miracast without any connection cable or a wireless access point (AP).

It should be understood that, in this embodiment of this disclosure, the to-be-transmitted information may be a file such as a picture or a video, or may be a link of content such as a picture, a video, or a web page, text information (for example, a memo), a document (for example, a word document or a POWERPOINT (PPT)), or the like. Information content of the to-be-transmitted information is not limited in this embodiment of this disclosure.

Figure 10:
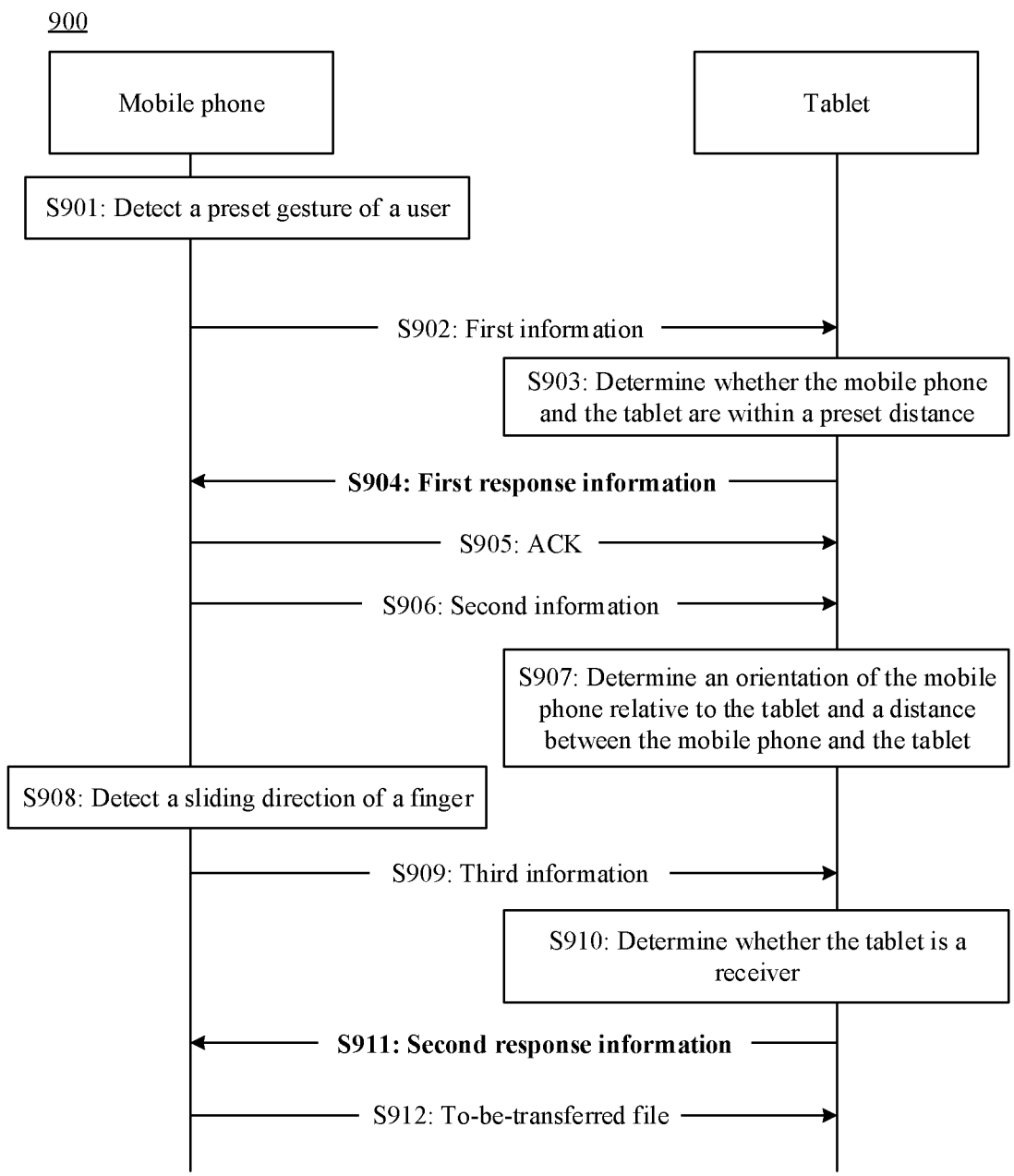
FIG. 10 is a schematic flowchart of a short-distance information transmission method according to an embodiment of this disclosure.

FIG. 10 is a schematic flowchart of a short-distance information transmission method 900 according to an embodiment of this disclosure. The method 900 is described by using an example in which a mobile phone transfers a file to a tablet. The mobile phone may not have an AOA computing capability, and the tablet has an AOA computing capability. As shown in FIG. 10, the method 900 includes the following steps.

S901: The mobile phone detects a preset gesture of a user.

For example, as shown in FIG. 4A to FIG. 4E, the preset gesture may be pressing a screen of the mobile phone by using three fingers of the user.

S902: The mobile phone broadcasts first information to a surrounding device in response to the preset gesture of the user, where the first information is used to indicate that the mobile phone has information to be transmitted.

After the mobile phone detects the preset gesture of the user, the mobile phone may first determine to enter an information transmission state, that is, the mobile phone may determine that there is to-be-transmitted information in the mobile phone that needs to be sent to another device.

It should be understood that, in this embodiment of this disclosure, a manner of broadcasting the first information by the mobile phone to the surrounding device is not limited. For example, the mobile phone may send the first information to a surrounding device in a BLUETOOTH low energy (BLE) broadcast manner.

It should be further understood that there may be one or more devices around the mobile phone, and the method 900 is described by using an example in which the surrounding device includes the tablet.

S903: The tablet (one of the devices around the mobile phone) determines, based on signal strength or signal quality of the first information, whether the tablet and the mobile phone are within a preset distance.

For example, the preset distance is 1 m.

An RSSI is used as an example. When the tablet detects that an RSSI of the first information is less than or equal to −60 decibels (dB), the tablet may determine that the tablet is located beyond the preset distance from the mobile phone. When the tablet detects that the RSSI of the first signal is greater than −60 dB (for example, −63 dB), the tablet may determine that the tablet is located within the preset distance from the mobile phone.

It should be understood that, to reduce a delay in distance detection performed by the tablet, the tablet may perform distance detection by using an antenna in a BLUETOOTH/WI-FI antenna array, and determine a distance between the tablet and the mobile phone based on signal strength or signal quality of the first information that is sent by the mobile phone and received by the antenna, to determine whether the distance is less than the preset distance.

S904: If the tablet determines that the tablet and the mobile phone are within the preset distance, the tablet sends first response information to the mobile phone, where the first response information is used to indicate that the distance between the tablet and the mobile phone is less than the preset distance.

S905: The mobile phone receives the first response information, and sends acknowledgment (ACK) information to the tablet, where the acknowledgment information is a response to the first response information.

S906: The mobile phone sends second information to the tablet, and the tablet receives the second information sent by the mobile phone, where the second information is used to indicate the tablet to perform AOA computing.

For example, the second information may be sent to the tablet in an AOA transmit (TX) broadcast manner, and the second information may be an AOA TX data packet.

S907: The tablet determines an orientation of the mobile phone relative to the tablet and the distance between the mobile phone and the tablet.

In an embodiment, the orientation of the mobile phone relative to the tablet may be represented by a first angle. The first angle may be an included angle between a preset geographic direction and a connection line between a location of an antenna on the tablet and a location of an antenna on the mobile phone.

In this embodiment of this disclosure, the preset geographic direction may be a direction such as due north, due east, due west, or due south. This is not limited in this embodiment of this disclosure.

FIG. 11 is a schematic diagram in which a tablet calculates relative location information of a mobile phone. As shown in FIG. 11, an included angle of the mobile phone relative to due north is $\theta_1$, and an included angle of the tablet relative to due north is $\theta_3$. The tablet may calculate the location of the mobile phone relative to the tablet according to the foregoing formula (2) and by using the BLUETOOTH/WI-FI antenna array. If a connection line between a camera of the tablet and the center of the tablet is 0 degrees of the tablet, the mobile phone is located in a direction that deviates $\theta_4$ from 0 degrees of the tablet (clockwise). In this case, the first angle may be $\theta_3+\theta_4$.

It should be understood that, in FIG. 11, for ease of understanding, it is assumed that the location of the antenna on the mobile phone is in the center of the mobile phone, and the location of the antenna on the tablet is in the center of the tablet. In an actual case, the location of the antenna on the mobile phone and the location of the antenna on the tablet may be other locations.

The tablet may further determine the distance between the tablet and the mobile phone based on signal strength or signal quality of the second information sent by the mobile phone, to determine whether the distance is less than the preset distance.

It should be further understood that, performing distance calculation by using the signal quality or the signal strength of the first information in S903 is screening a device within the preset distance for the first time. In S907, when the orientation of the mobile phone relative to the tablet is detected by using the BLUETOOTH/WI-FI antenna array of the tablet, the signal strength and the signal quality of the second information may be detected by using all antennas in the BLUETOOTH/WI-FI antenna array, to determine a plurality of distance detection results. The tablet may process (for example, average) the plurality of distance detection results, to obtain a final distance detection result.

It should be further understood that, in S903, to reduce a delay of distance detection, the tablet may perform distance detection by using only one antenna in the BLUETOOTH/WI-FI antenna array. However, in S907, because the tablet needs to use three or more antennas in the BLUETOOTH/WI-FI antenna array when detecting the orientation of the mobile phone relative to the tablet, the three or more antennas may also measure the signal strength or the signal quality of the received second information, to determine a plurality of distance measurement results. The tablet may determine a final distance detection result based on the plurality of distance measurement results. This helps improve accuracy of distance detection between devices.

S908: The mobile phone detects a sliding direction of a finger of the user on the to-be-transmitted information displayed on the screen of the mobile phone.

It should be understood that, that the mobile phone detects the sliding direction of the finger of the user on the to-be-transmitted information may also be understood as that the mobile phone detects a second angle. The second angle is an included angle between the sliding direction of the finger of the user detected on the screen of the mobile phone and a connection line between a location of a first preset part and a location of a second preset part of the mobile phone.

In this embodiment of this disclosure, the connection line between the location of the first preset part and the location of the second preset part on the mobile phone may also be understood as a direction of 0 degrees of the mobile phone. The location of the first preset part may be a central location of the mobile phone, and the location of the second preset part may be a location of a camera of the mobile phone. Alternatively, the location of the first preset part may be a central location of the mobile phone, and the location of the second preset part may be a location of a home button of the mobile phone. Alternatively, the location of the first preset part may be a location of a power button of the mobile phone, and the location of the second preset part may be a location of a speaker of the mobile phone, or the like. The location of the first preset part and the location of the second preset part of the mobile phone are not limited in this embodiment of this disclosure.

In the method 900, because the mobile phone does not have an AOA computing function, the mobile phone may calculate an absolute position by using a compass. As shown in FIG. 11, an included angle between the mobile phone and due north is $\theta_1$, and the mobile phone detects that the sliding direction of the finger of the user deviates $\theta_2$ from 0 degrees of the mobile phone (clockwise). $\theta_2$ may be the second angle.

It should be understood that the finger of the user may not slide along a straight line, and an actual sliding track may include a curve. When calculating the sliding direction of the finger, the mobile phone may determine the sliding direction of the finger based on a connection line between a start point and an end point of finger sliding.

It should be further understood that the included angle between the mobile phone and due north may also be understood as an included angle between the preset geographic direction and the connection line between the location of the first preset part and the location of the second preset part on the mobile phone.

S909: The mobile phone sends third information to the tablet, and the tablet receives the third information sent by the mobile phone, where the third information is used to indicate a third angle, and the third angle is an included angle between the preset geographic direction and the sliding direction of the finger of the user detected on the screen of the mobile phone.

In an embodiment, the third information may carry the third angle, that is, the third angle may be determined by the mobile phone and then sent to the tablet.

For example, the mobile phone may determine the third angle by using $\theta_1$ and $\theta_2$. $\theta_1$ is the included angle between the preset geographic direction and the connection line between the location of the first preset part and the location of the second preset part on the mobile phone.

$\theta_2$ is the second angle. The screen of the mobile phone may not have a compass function. In this case, the mobile phone may separately detect $\theta_1$ and $\theta_2$, and then determine the third angle. The screen of the mobile phone may alternatively have a compass function. In this case, the mobile phone may directly determine the third angle.

In an embodiment, the third information carries information about $\theta_1$ and $\theta_2$. After receiving $\theta_1$ and $\theta_2$, the tablet may obtain the third angle through calculation based on $\theta_1$ and $\theta_2$.

It should be understood that in this embodiment of this disclosure, steps S906 and S907 may be completed before S908 because the tablet may obtain the relative orientation (for example, the first angle) of the mobile phone through calculation before obtaining the third angle. In this case, after obtaining the third information (indicating the third angle), the tablet may determine, based on the first angle and the third angle, whether the tablet is a receiver. This can help reduce a delay in an information transmission process.

It should be further understood that, in this embodiment of this disclosure, the mobile phone may alternatively use the second information to carry information about the included angle of the mobile phone relative to due north, and use the third information to carry information about the sliding direction of the finger of the user.

In an embodiment, after receiving the third information sent by the mobile phone, the tablet may first calculate the relative orientation of the mobile phone relative to the tablet, and then determine, by using the relative orientation and the sliding direction of the finger of the user, whether the tablet is the receiver.

S910: The tablet determines, based on the sliding direction of the finger of the user and the relative orientation of the mobile phone relative to the tablet, whether the tablet is the receiver.

In an embodiment, that the tablet determines whether the tablet is the receiver may also be understood as that the tablet determines, based on the first angle and the third angle, whether the tablet is a proper receiver.

After receiving the third information, the tablet may determine that the included angle between the preset geographic direction and the connection line between the location of the first preset part and the location of the second preset part on the mobile phone is $\theta_1$, and the included angle between the sliding direction of the finger of the user and the connection line between the location of the first preset part and the location of the second preset part on the mobile phone is $\theta_2$. Alternatively, the third information may carry information about the third angle. For example, the tablet may directly determine the included angle between the preset geographic direction and the sliding direction of the finger of the user detected on the screen of the mobile phone.

In S907, the tablet may further determine that an included angle between the preset geographic direction and a connection line between a location of a third preset part and a location of a fourth preset part on the tablet is $\theta_3$, and an included angle between the connection line between the location of the antenna on the tablet and the location of the antenna on the mobile phone and the connection line between the location of the third preset part and the location of the fourth preset part on the tablet is $\theta_4$.

It should be understood that the connection line between the third preset part and the fourth preset part on the tablet may be a direction of 0 degrees of the tablet. The location of the third preset part may be a central location of the tablet, and the location of the fourth preset part may be a location of the camera of the tablet. Alternatively, the location of the third preset part may be a central location of the tablet, and the location of the fourth preset part may be a location of a home button of the tablet. Alternatively, the location of the third preset part may be a location of a power button of the tablet, and the location of the fourth preset part may be a location of a speaker of the tablet, or the like. The location of the third preset part and the location of the fourth preset part of the tablet are not limited in this embodiment of this disclosure.

Both $\theta_2$ and $\theta_4$ are relative angles, and $\theta_2$ and $\theta_4$ need to be matched to a geomagnetic coordinate system, to check, by using an absolute orientation, whether the tablet is a proper receiver.

In an embodiment, when determining whether the tablet is the receiver, the tablet may perform determining according to the following steps (1) to (3):

(1) Determine absolute geomagnetic orientations of $\theta_2$ and $\theta_4$, where the absolute geomagnetic orientation of $\theta_2$ is $\alpha$, and the absolute geomagnetic orientation of $\theta_4$ is $\beta$.

$\alpha$ may be determined based on the following conditions:

if $\theta_1+\theta_2 \geq 360°$, $\alpha=\theta_1+\theta_2-360$; or if $\theta_1+\theta_2 < 360°$, $\alpha=\theta_1+\theta_2$.

$\beta$ may be determined based on the following conditions:

if $\theta_3+\theta_4 \geq 360°$, $\alpha=\theta_3+\theta_4-360$; or if $\theta_3+\theta_4 < 360°$, $\alpha=\theta_3+\theta_4$.

(2) Determine whether $|\alpha+180°-\beta| \leq 45°$ is true.

If $|\alpha+180°-\beta| \leq 45°$ is true, the tablet determines that the tablet is the receiver, or if $|\alpha+180°-\beta| \leq 45°$ is false, the tablet performs determining in step (3).

(3) Determine whether $\||\alpha+180°-\beta|-360°| \leq 45°$ is true.

If $\||\alpha+180°-\beta|-360°| \leq 45°$ is true, the tablet may determine that the tablet is the receiver, or if $\||\alpha+180°-\beta|-360°| \leq 45°$ is false, the tablet may finally determine that the tablet is not the receiver.

It should be understood that, whether $\||\alpha+180°-\beta|-360°| \leq 45°$ in step (3) is true may alternatively be first determined. If $\||\alpha+180°-\beta|-360°| \leq 45°$ is true, the tablet may determine that the tablet is the receiver, or if $\||\alpha+180°-\beta|-360°| \leq 45°$ is false, whether $|\alpha+180°-\beta| \leq 45°$ in step (2) is true may continue to be determined. If $|\alpha+180°-\beta| \leq 45°$ is true, the tablet may determine that the tablet is the receiver, or if $|\alpha+180°-\beta| \leq 45°$ is false, the tablet may finally determine that the tablet is not the receiver.

It should be further understood that a may be the third angle (the included angle between the preset geographic direction and the sliding direction of the finger of the user detected on the screen of the mobile phone). For example, as shown in FIGS. 11, $\alpha=\theta_1+\theta_2-360°$. $\beta$ may be the first angle (the included angle between the preset geographic direction and the connection line between the location of the antenna on the tablet and the location of the antenna on the mobile phone). For example, as shown in FIG. 11, $\beta=\theta_3+\theta_4$.

It should be further understood that, when determining whether the tablet is the receiver, the tablet determines whether the tablet falls within an angle range that uses the sliding direction of the finger of the user as a center line and deviates ±45° from the center line. The deviation angles are not limited in this embodiment of this disclosure, and may be ±45°, ±30°, or other deviation angles.

It should be understood that, in this embodiment of this disclosure, the mobile phone may notify the tablet of $\theta_1$ and $\theta_2$ in S909, so that the tablet calculates a based on $\theta_1$ and $\theta^2$.

Alternatively, after obtaining $\theta_1$ and $\theta_2$, the mobile phone may first calculate a, and then use the third information to carry information about a in S909.

It should be further understood that, in this embodiment of this disclosure, $\theta_2$ is an angle detected by the mobile phone that the sliding direction of the finger of the user deviates 0 degrees relative to the mobile phone (clockwise). The angle may be determined by a touch IC of a touchscreen of the mobile phone. The compass function may not be integrated into the touch IC. In this case, the angle determined by the touchscreen may be the angle that the sliding direction of the finger of the user deviates 0 degrees relative to the mobile phone (clockwise). In another embodiment, the compass function may alternatively be integrated into the touch IC. In this case, a touch sensor may determine that the sliding direction of the finger of the user is an angle relative to due north, in other words, the touch sensor may directly determine the absolute geomagnetic orientation a of the sliding direction of the finger of the user.

It should be further understood that, in the foregoing angle determining process, clockwise deflection is used as an example for description, or deflection may be performed in a counterclockwise direction. This is not limited in this embodiment of this disclosure.

In this embodiment of this disclosure, the mobile phone uses the third information to carry the information about the sliding direction of the finger of the user, so that the tablet can determine, based on the information, whether the tablet is the receiver. In addition, if the tablet determines that the tablet is the receiver, when receiving a file sent by the mobile phone, the tablet may receive, according to the sliding direction, the to-be-transmitted information sent by the mobile phone, as shown on the GUI in FIG. 7A to FIG. 7C. An incoming direction of the to-be-transmitted information on the tablet may be consistent with the sliding direction of the finger of the user detected on the mobile phone. This can bring better user experience to the user.

S911: When the tablet determines that the tablet is the receiver, the tablet may send second response information to the mobile phone, and the mobile phone may receive the second response information sent by the tablet, where the second response information is used to indicate that the tablet is the receiver.

S912: The mobile phone sends the to-be-transmitted information to the tablet, and the tablet receives the to-be-transmitted information sent by the mobile phone.

In an embodiment, when completing receiving of the to-be-transmitted information, the tablet may feed back a receiving result of the to-be-transmitted information to the mobile phone.

In an embodiment, if a plurality of devices send response information to the mobile phone in S911, the mobile phone may prompt the user "For security reasons, please keep away from another device, or turn off a screen of another device and try again".

In an embodiment, if a plurality of devices send response information to the mobile phone in S911, the mobile phone may also send the to-be-transmitted information to all the plurality of devices.

In an embodiment, if a plurality of devices send response information to the mobile phone in S911, the mobile phone may send the to-be-transmitted information only to a device that has been paired.

It should be understood that the paired device may be a device that has been securely paired and connected to the mobile phone before this transmission.

In an embodiment, if no device sends response information to the mobile phone in S911, the mobile phone may prompt the user "The receiver is not found, and the connection is terminated".

In an embodiment, in S909, the mobile phone may use the third information to carry only the information used to indicate the included angle of the mobile phone relative to due north, but not the information used to indicate the sliding direction of the finger of the user. In S910, the tablet may determine, based on only the information about the included angle of the mobile phone relative to due north, whether the tablet is the receiver.

For example, the mobile phone may use the third information to carry only information about $\theta_1$. The tablet may use $\theta_1$, $\theta_3$, and $\theta_4$ to determine whether the tablet is the proper receiver.

In an embodiment, when determining whether the tablet is the receiver, the tablet may perform determining according to the following steps (1) to (3):

(1) Determine an absolute orientation of geomagnetic coordinates of $\theta_4$, where the absolute orientation of $\theta_4$ is $\beta$.

$\beta$ may be determined based on the following conditions:

if $\theta_3+\theta_4 \geq 360°$, $\beta=\theta_3+\theta_4-360$; or if $\theta_3+\theta_4 < 360°$, $\beta=\theta_3+\theta_4$.

(2) Determine whether $|\theta_1+180°-\beta| \leq 45°$ is true.

If $|\theta_1+180°-\beta| \leq 45°$ is true, the tablet determines that the tablet is the receiver, otherwise, the tablet determines that the tablet is not the receiver.

It should be understood that the tablet may use $\theta_1$, $\theta_3$, and $\theta_4$ to determine whether the tablet is the proper receiver in another manner. This is not limited in this embodiment of this disclosure.

It should be further understood that a deviation angle is not limited in this embodiment of this disclosure, and may be ±45°, ±30°, or another deviation angle.

It should be further understood that, when determining that the tablet is a proper receiver device, the tablet may send the response information to the mobile phone, and the mobile phone may send the to-be-transmitted information to the tablet after detecting the preset gesture on the touchscreen. In this case, the user may slide or not slide the to-be-transmitted information to the tablet. For example, when detecting that two fingers of the user double-tap the to-be-transmitted information, the mobile phone may send the to-be-transmitted information to the tablet.

In an embodiment, FIG. 12A to FIG. 12D are a schematic diagram of another group of GUIs according to an embodiment of this disclosure.

Figure 12A:
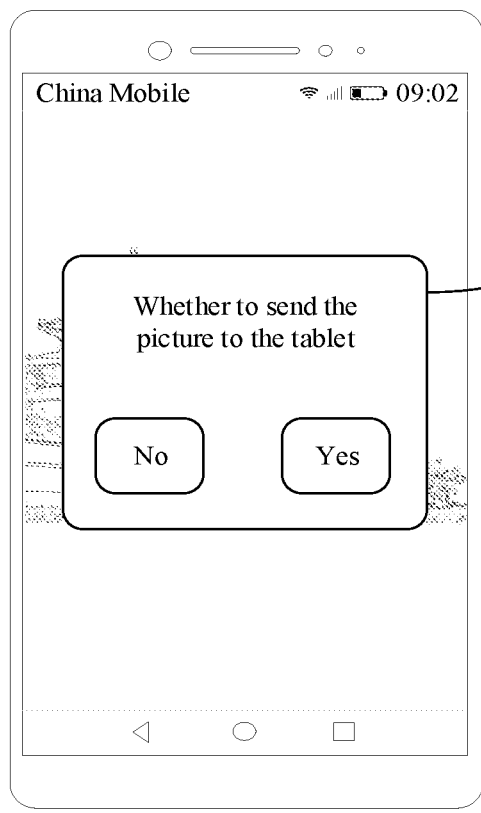
FIG. 12A, FIG. 12B, FIG. 12C, and FIG. 12D show another group of GUIs according to an embodiment of this disclosure.

Refer to FIG. 12A. When the mobile phone receives only the second response information sent by the tablet in S911, the mobile phone may prompt the user "Whether to send the picture to the tablet" in a reminder box 1101.

Figure 12B:
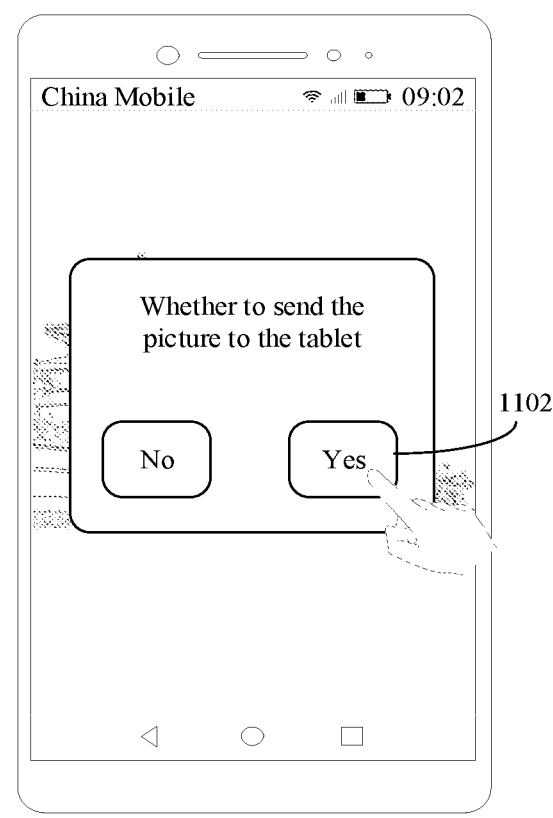

Refer to FIG. 12B. After detecting an operation of tapping a control 1102 by the user, the mobile phone may send the to-be-transmitted information to the tablet.

It should be understood that, after the user taps a control "No", the mobile phone may determine that the user does not want to send the picture to the tablet. In this case, the mobile phone may perform steps S901 to S911 again to re-determine a receiver device.

Figure 12C:
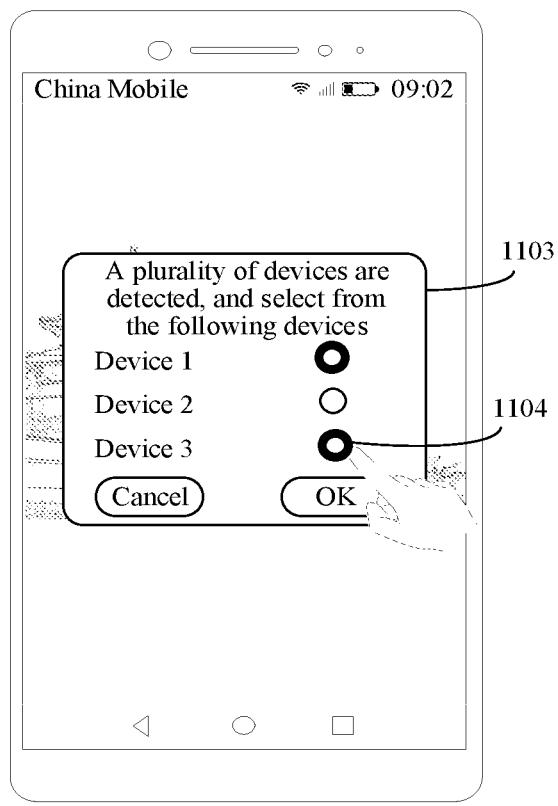

Refer to FIG. 12C. When the mobile phone receives the response information sent by the plurality of devices in S911, the mobile phone may prompt the user "A plurality of receiving devices are detected, and select from the following devices" in a reminder box 1103. The mobile phone may detect that the user taps controls 1104 corresponding to a device 1, a device 2, and a device 3 to select the receiver.

Figure 12D:
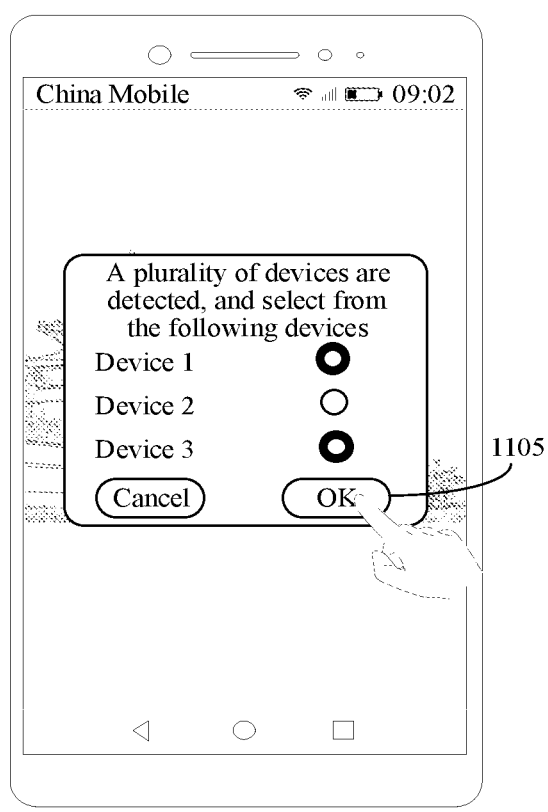

Refer to FIG. 12D. After detecting an operation of tapping a control 1105 by the user, the mobile phone may send the to-be-transmitted information to the device 1 and the device 3 that are selected by the user.

It should be understood that, after the user taps a control "Cancel", the mobile phone may determine that the user does not want to send the picture to the tablet. In this case, the mobile phone may perform steps S901 to S911 again to re-determine the receiver device.

It should be further understood that, if the mobile phone detects that only one device sends the response information in S911, the mobile phone may directly send the to-be-transmitted file to the device. In this way, transmission efficiency can be improved. When the only device is a paired device, the to-be-transmitted file may be directly sent to the device. When the only device is not a paired device, a secure pairing process may be started, and after the process is completed, a ranging process in which an ultrasonic wave or a BLUETOOTH WI-FI antenna array is used may be omitted, so as to shorten a delay of information transmission.

Figure 13A:
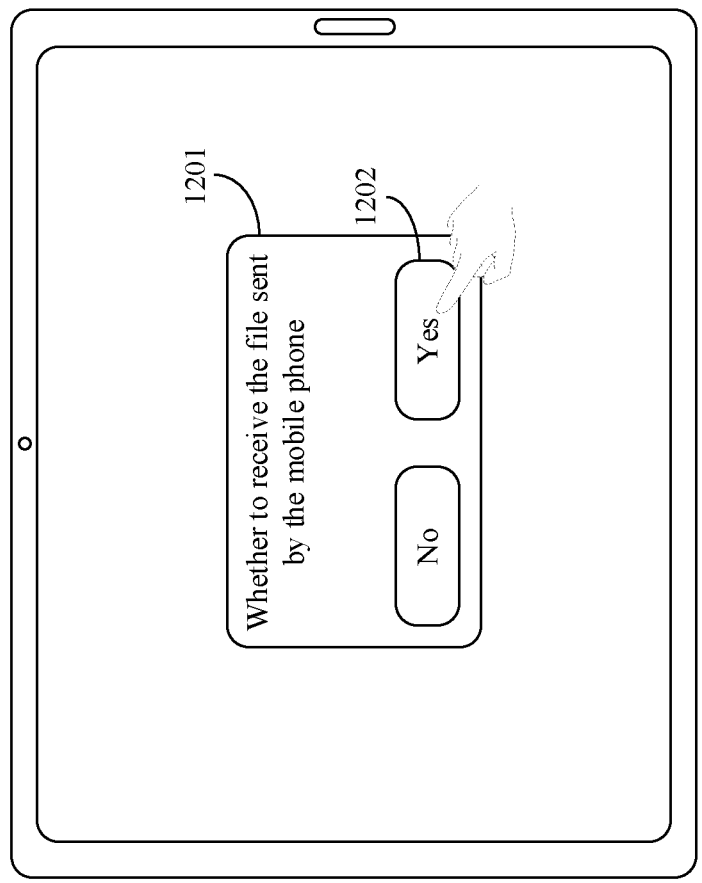
FIG. 13A, FIG. 13B, and FIG. 13C show another group of GUIs according to an embodiment of this disclosure.
Figure 13A:
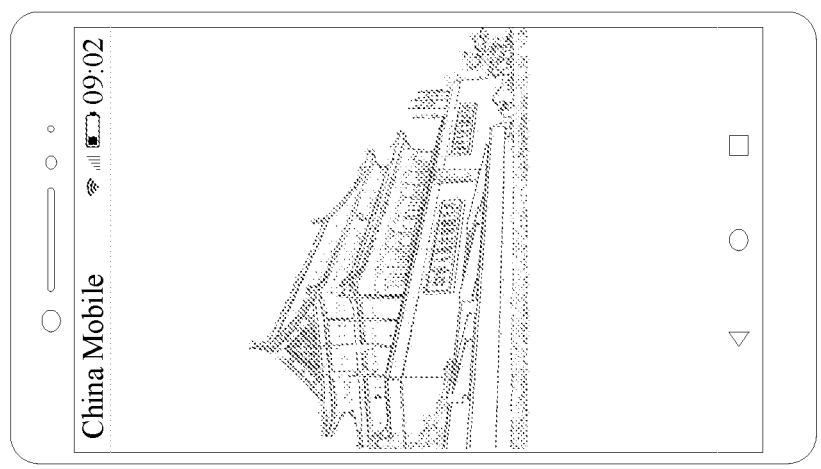
Figure 13B:
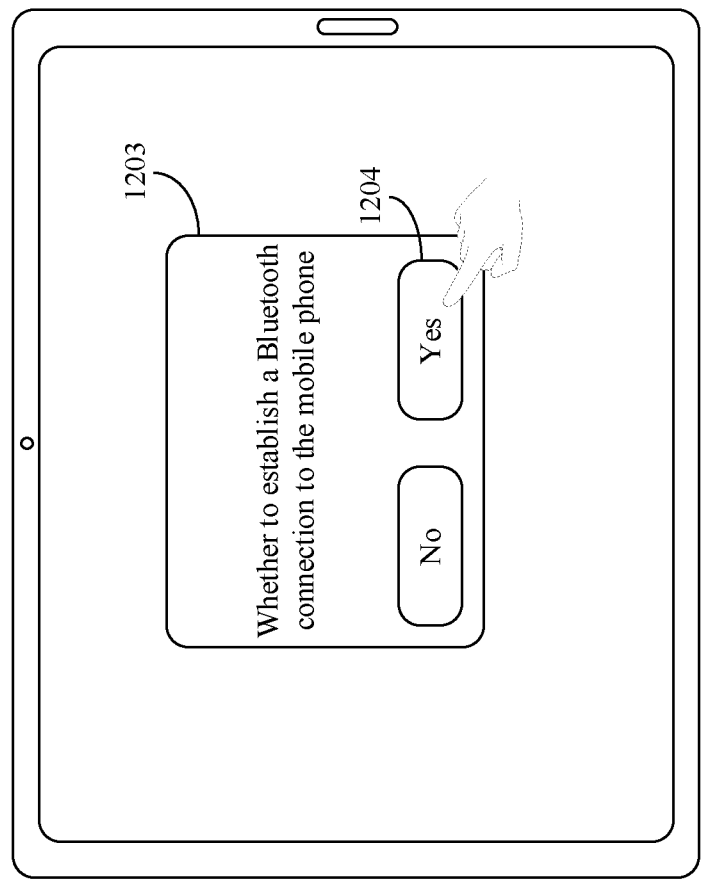
Figure 13B:
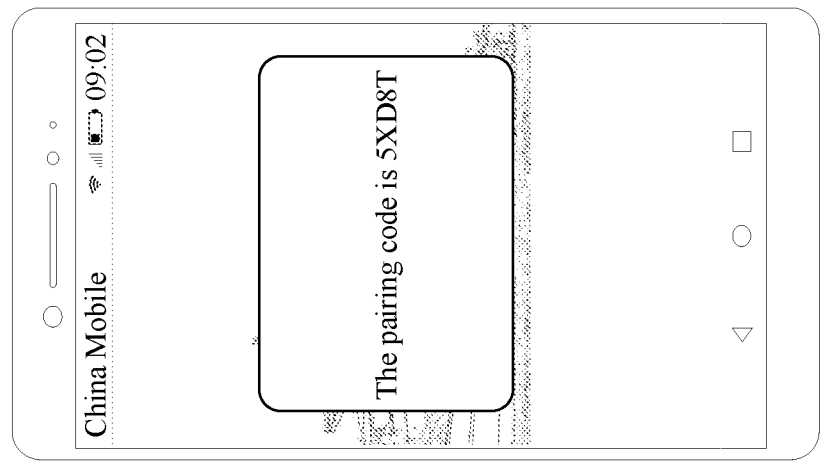
Figure 13C:
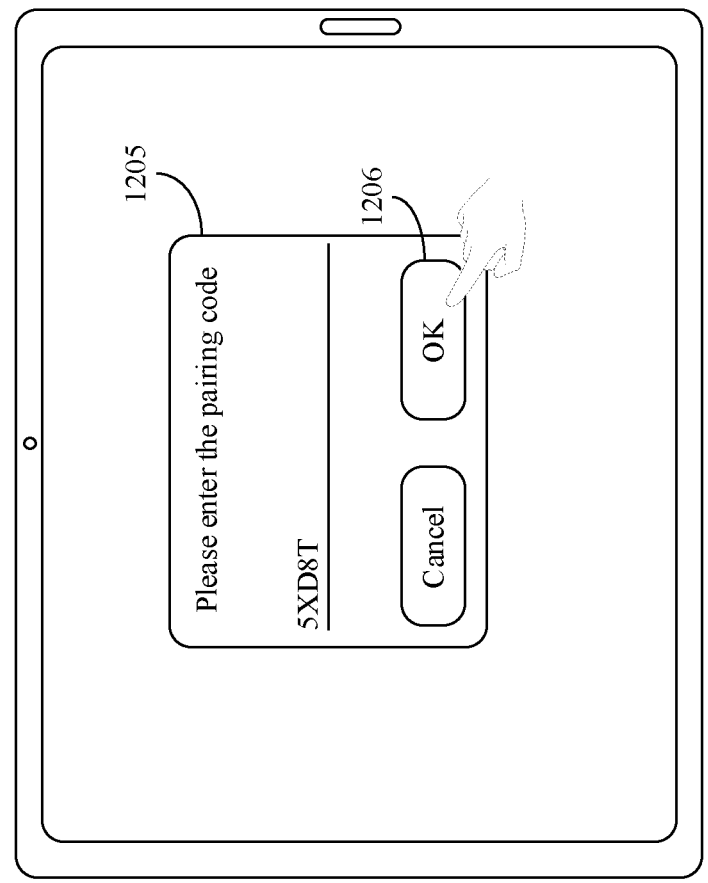
Figure 13C:
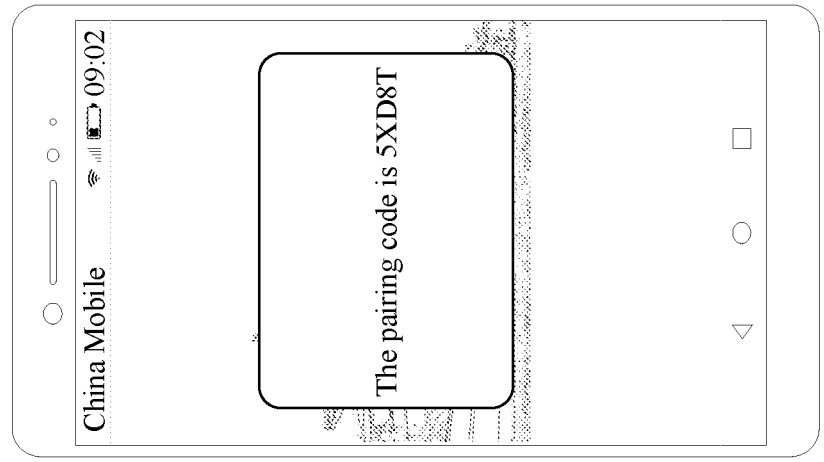

In an embodiment, FIG. 13A to FIG. 13C are a schematic diagram of another group of GUIs according to an embodiment of this disclosure.

When the mobile phone is connected to the tablet for the first time, when receiving the second response information, the mobile phone may send fourth information to the tablet. The fourth information is used to query whether the tablet is connected and receive the to-be-transmitted information.

Refer to FIG. 13A. After receiving the fourth information, the tablet may prompt the user "Whether to receive the file sent by the mobile phone" in a reminder box 1201. After detecting an operation of tapping a control 1202 by the user, the tablet may receive the photo sent by the mobile phone.

Refer to a GUI shown in FIG. 13B. In an embodiment, if a BLUETOOTH connection has not been established between the mobile phone and the tablet, after detecting the preset gesture of the user in the to-be-transmitted information of the mobile phone, the mobile phone may display a pairing code, and the tablet may prompt the user "Whether to establish a BLUETOOTH connection to the mobile phone" in a reminder window 1203.

Refer to a GUI shown in FIG. 13C. After detecting an operation of tapping a control 1204 by the user, the tablet continues to prompt the user to enter "Please enter the pairing code" in a reminder window 1205. After the tablet detects an operation that the user enters the pairing code and taps a control 1206, the mobile phone and the tablet may establish the BLUETOOTH connection. In this case, still refer to FIG. 4D and FIG. 4E. After the mobile phone detects that the user performs an operation of sliding rightwards by using a plurality of fingers (three fingers in the figure) on the photo 404, the mobile phone transfers the photo 404 to the tablet.

Refer to FIG. 13B. The mobile phone may display the pairing code. After the tablet detects that the user enters the pairing code of the mobile phone in an input box 1203, and detects the operation of tapping the control 1204 by the user, the tablet may receive the to-be-transmitted information sent by the mobile phone.

Figure 14:
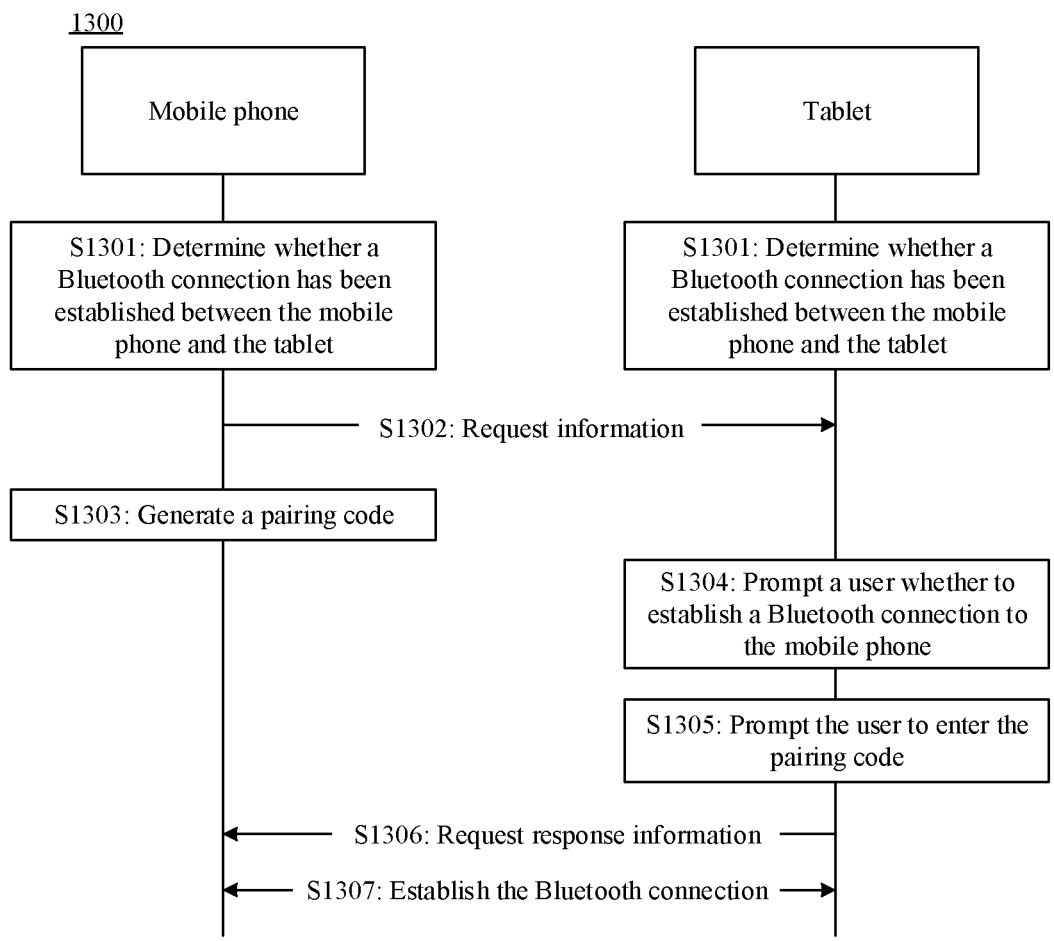
FIG. 14 shows a process of establishing a BLUETOOTH connection when a mobile phone transfers a file to a tablet according to an embodiment of this disclosure.

In an embodiment, FIG. 14 shows a process of establishing a BLUETOOTH connection when a mobile phone transfers a file to a tablet according to an embodiment of this disclosure. As shown in FIG. 14, the process may include the following steps.

S1301: The mobile phone and the tablet detect whether the BLUETOOTH connection has been established between the mobile phone and the tablet.

It should be understood that S1301 may occur between S904 and S911 in the method 900.

It should be further understood that the mobile phone may search for information about the tablet based on devices that have established a BLUETOOTH connection to the mobile phone and that are stored in the mobile phone. Similarly, the tablet may also search for information about the mobile phone based on devices that have established a BLUETOOTH connection to the tablet and that are stored in the tablet.

If the mobile phone does not find the tablet from the devices that have established a BLUETOOTH connection to the mobile phone, the mobile phone may determine that no BLUETOOTH connection has been established to the tablet. If the tablet does not find the mobile phone from the devices that have established a BLUETOOTH connection to the tablet, the tablet may determine that no BLUETOOTH connection has been established to the mobile phone.

S1302: If the mobile phone determines that no BLUETOOTH connection has been established to the tablet, the mobile phone sends request information to the tablet, where the request information is used to request to establish a BLUETOOTH connection to the tablet.

S1303: The mobile phone generates a corresponding pairing code.

It should be understood that there is no actual sequence between S1302 and S1303.

S1304: After receiving the request information, the tablet prompts a user whether to establish the BLUETOOTH connection to the mobile phone.

S1305: After the tablet detects an operation in which the user taps to establish the BLUETOOTH connection to the mobile phone, the tablet prompts the user to enter the pairing code.

For example, as shown in FIG. 13B, the tablet may prompt, by using the reminder window 1203, the user to enter a pairing code.

S1306: After the tablet detects the pairing code entered by the user, the tablet sends request response information to the mobile phone, where the request response information may include pairing code information entered by the user.

S1307: After receiving the request response information, if the mobile phone finds that the pairing code carried in the request response information is the same as the pairing code generated by the mobile phone, the mobile phone establishes the BLUETOOTH connection to the tablet.

In an embodiment, after the mobile phone establishes the BLUETOOTH connection to the tablet, the mobile phone may perform S912 to send the to-be-transmitted information to the tablet.

It should be understood that, in this embodiment of this disclosure, for a process of establishing the BLUETOOTH connection between the mobile phone and the tablet for the first time, refer to an existing BLUETOOTH protocol. For brevity, details are not described herein again.

In this embodiment of this disclosure, if a BLUETOOTH connection has not been established between a transmitter and a receiver, after detecting sliding of a finger of the user, the transmitter may first request to establish the BLUETOOTH connection to the receiver, and then send the to-be-transmitted information to the receiver after the BLUETOOTH connection is established. This helps improve information transmission security.

Figure 15:
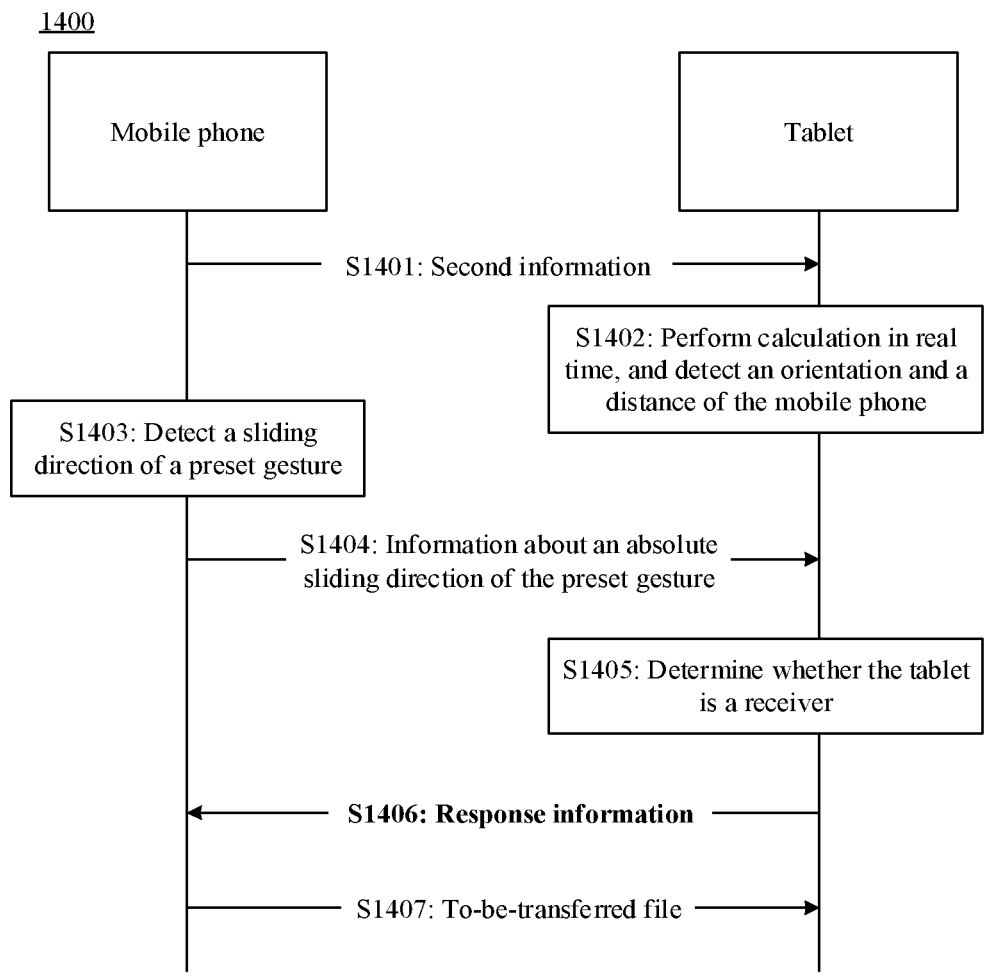
FIG. 15 is another schematic flowchart of a short-distance information transmission method according to an embodiment of this disclosure.

To improve efficiency of a plurality of times of transmission, FIG. 15 is a schematic flowchart of a short-distance information transmission method 1400 according to an embodiment of this disclosure. A receiver may monitor a relative location and a distance of a transmitter device in real time. As shown in FIG. 15, the method 1400 includes the following steps.

S1401: A mobile phone sends second information to a tablet, where the second information is used to indicate the tablet to perform AOA computing.

It should be understood that the method 1400 may be performed when the mobile phone has successfully transferred a file to the tablet once, or may be performed when both the mobile phone and the tablet are in an unlocked state.

S1402: The tablet performs calculation in real time, and monitors an orientation and a distance of the mobile phone.

It should be understood that, in S1401, the mobile phone may periodically send the second information to the tablet. Each time the tablet receives the second information, the tablet performs calculation to update the orientation and the distance of the mobile phone.

It should be further understood that, in a process of performing S1401 and S1402, if one of the mobile phone and the tablet is locked, or a distance between the mobile phone and the tablet is greater than a preset distance, steps after the method 1402 may be stopped.

S1403: The mobile phone detects a sliding direction of a finger of a user on to-be-transmitted information displayed on a screen of the mobile phone.

It should be understood that for a description of S1403, refer to the description of S908. For brevity, details are not described herein again.

S1404: The mobile phone indicates information about the sliding direction of the finger to the tablet.

For example, the mobile phone may notify, in a BLE broadcast manner, a surrounding device that there is information to be transmitted, and use broadcast information to carry the information about the sliding direction of the finger.

S1405: The tablet determines, based on the information about the sliding direction of the finger obtained in S1404 and the latest orientation and distance information of the mobile phone obtained in S1402, whether the tablet is the receiver.

It should be understood that for a description of S1405, refer to the description of S910. For brevity, details are not described herein again.

S1406: If the tablet determines that the tablet is the receiver, the tablet may send response information to the mobile phone, where the response information may be used to indicate that the tablet is the receiver.

S1407: After receiving the response information, the mobile phone may send the to-be-transmitted information to the tablet.

In an embodiment, if the mobile phone receives response information sent by a plurality of devices in S1406, the mobile phone may prompt the user "For security reasons, please keep away from another device, or turn off a screen of another device and try again" in a reminder window.

In an embodiment, if the mobile phone receives response information sent by a plurality of devices in S1406, the mobile phone may send the to-be-transmitted information to the plurality of devices.

In an embodiment, if the mobile phone receives response information sent by a plurality of devices in S1406, the mobile phone may display information about the plurality of devices to the user by using a reminder window, so that the user makes a selection. After detecting information about a receiving device selected by the user, the mobile phone may send the to-be-transmitted information to the receiving device selected by the user.

In an embodiment, if only the tablet sends the response information to the mobile phone in S1406, and the mobile phone has successfully sent a file to the tablet once, the mobile phone may directly send the to-be-transmitted information to the tablet. If only the tablet sends the response information to the mobile phone in S1406, and the mobile phone has not sent a file to the tablet, the mobile phone may prompt the user "Whether to send the picture to the tablet" in a reminder box, as shown in the GUI in FIG. 11.

In an embodiment, if the mobile phone does not receive the response information within preset time, the mobile phone may prompt the user "The receiver is not found, and the connection is terminated" in a reminder window.

According to the short-distance information transmission method in this embodiment of this disclosure, when a transmit end and a receive end have performed information transmission once, or both the transmit end and the receive end are in an unlocked state, the transmit end may continuously perform AOA TX broadcasting to the receive end, so that the receive end calculates an orientation and a distance of the transmit end in real time. After the receive end detects the sliding direction of the finger of the user, the transmit end may send the direction information to the receive end, so that the receive end device determines whether the receive end device is a proper receiver. In this way, it may be avoided that the receive end calculates the orientation and the distance of the transmit end after receiving the direction information, thereby reducing a delay in an information transmission process.

The foregoing describes a process in which a device (a mobile phone is used as an example) without an AOA computing capability transfers a file to a device (a tablet is used as an example) with an AOA computing capability. The following describes a process in which a device with an AOA computing capability transfers a file to a device with or without an AOA computing capability. For example, an example in which the tablet transfers a file to the mobile phone is used for description.

Figure 16:
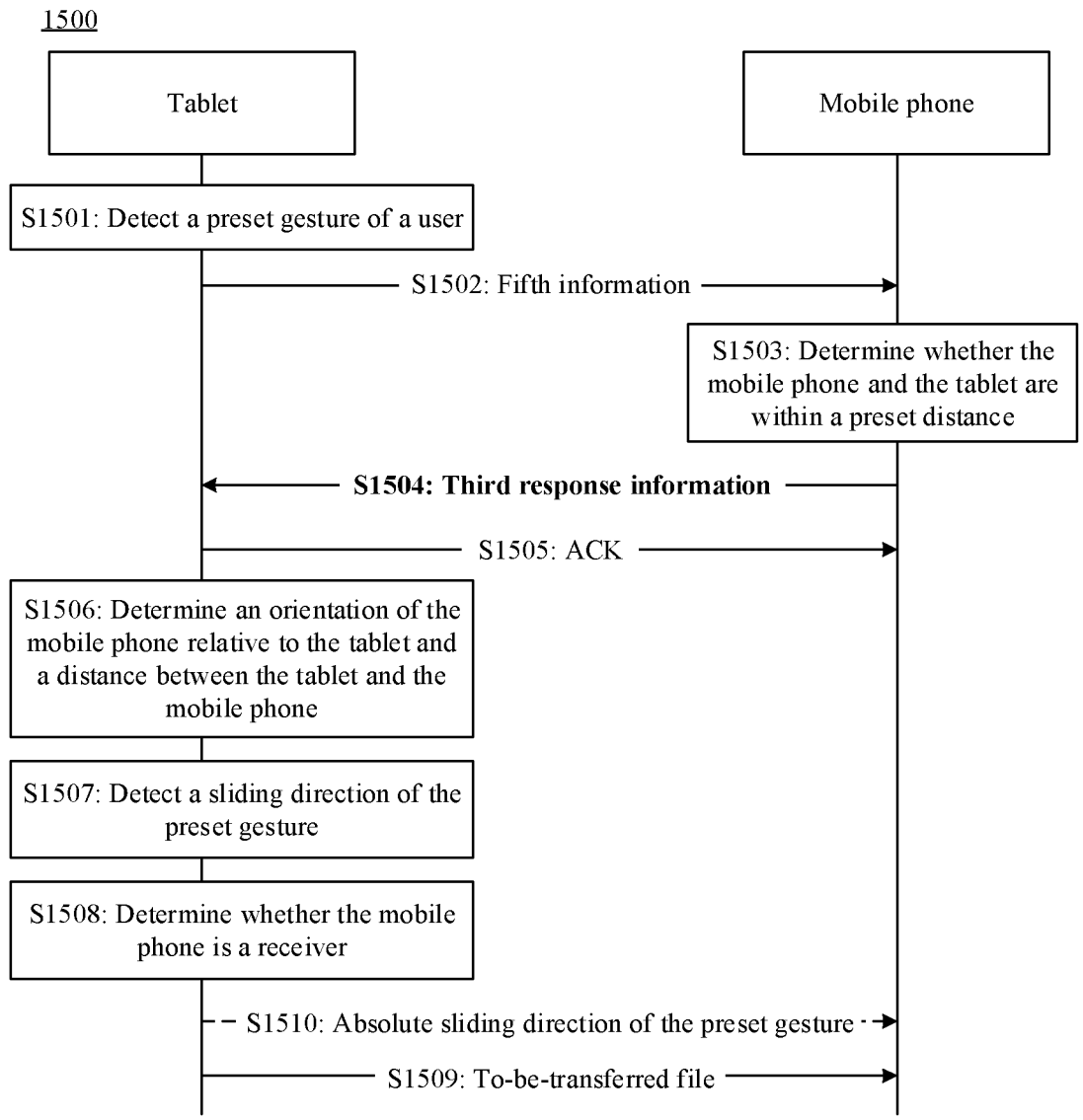
FIG. 16 is another schematic flowchart of a short-distance information transmission method according to an embodiment of this disclosure.

FIG. 16 is a schematic flowchart of a short-distance information transmission method 1500 according to an embodiment of this disclosure. As shown in FIG. 16, the method 1500 includes the following steps.

S1501: A tablet detects a preset gesture of a user.

For example, the preset gesture may be pressing a screen of the tablet by using three fingers of the user.

S1502: The tablet sends fifth information to a device around the tablet, and the device around the tablet receives the fifth information sent by the mobile phone, where the device around the tablet includes a mobile phone, and the fifth information is used to indicate that the tablet has information to be transmitted.

For example, the tablet may broadcast the fifth information to a surrounding device by using BLE.

S1503: The mobile phone (one of the devices around the tablet) determines, based on signal strength or signal quality of the fifth information, whether the tablet and the mobile phone are within a preset distance.

It should be understood that for a process of S1503, refer to the process of S903. For brevity, details are not described herein again.

It should be further understood that, to reduce a delay in distance detection performed by the tablet, the mobile phone may perform distance detection by using an antenna in a BLUETOOTH/WI-FI antenna array, and determine a distance between the mobile phone and the tablet based on the signal strength or signal quality of the fifth information that is sent by the tablet and received by the antenna, to determine whether the distance is less than the preset distance.

S1504: If the mobile phone determines that the mobile phone and the tablet are within the preset distance, the mobile phone sends third response information to the tablet, where the third response information is used to indicate that the distance between the mobile phone and the tablet is less than the preset distance.

S1505: After receiving the third response information, the tablet sends ACK information to the mobile phone, where the acknowledgment information is a response to the third response information.

S1506: The tablet determines an orientation of the mobile phone relative to the tablet and the distance between the tablet and the mobile phone.

Before the tablet determines the orientation of the mobile phone relative to the tablet and the distance between the tablet and the mobile phone, the tablet may further receive an AOA TX data packet sent by the mobile phone.

It should be understood that for a description of S1506, refer to the description of S907. For brevity, details are not described herein again.

It should be further understood that, when the tablet performs AOA angle calculation, a device (for example, the tablet) having an AOA computing capability may calculate an angle by receiving AOA TX data packets sent by a group of peer devices (for example, mobile phones).

It should be further understood that, in the method 1500, if the tablet has the AOA computing capability, the tablet may perform AOA computing after receiving the third response information, to determine an orientation of the device around the tablet. In addition, the tablet may also calculate a distance between the tablet and each surrounding device based on a BLUETOOTH/WI-FI antenna array of the tablet. For a specific process of measuring the distance between the tablet and each surrounding device by using the BLUETOOTH/WI-FI antenna array, refer to the description in the foregoing method 900. For brevity, details are not described herein again.

S1507: The tablet detects a sliding direction of a finger of the user on the to-be-transmitted information displayed on the screen of the tablet.

It should be understood that for a process of S1507, refer to the process in which the mobile phone detects a sliding direction of a finger of the user on the to-be-transmitted information displayed on the screen of the mobile phone in S908. For brevity, details are not described herein again.

S1508: The tablet determines, based on the sliding direction of the finger and the relative orientation of the mobile phone relative to the tablet, whether the mobile phone is the receiver.

It should be understood that for a description of S1508, refer to the description of S910. For brevity, details are not described herein again.

In an embodiment, the tablet may further receive information that is about an angle of the mobile phone relative to due north and that is sent by the mobile phone. The tablet may determine, by using the information about the angle of the mobile phone relative to due north, information that is about an angle of the tablet relative to due north and that is determined by the tablet, and information that is about an angle of the mobile phone relative to the tablet and that is determined by the tablet, whether the mobile phone is a proper receiver. That is, when determining whether the mobile phone is a proper receiver device, the tablet may not use preset sliding direction information of the mobile phone. For a specific process, refer to the process of determining whether the tablet is the proper receiver by using $\theta_1$, $\theta_3$, and $\theta_4$ in the foregoing method 900. For brevity, details are not described herein again.

S1509: If the mobile phone is the receiver, the tablet may send the to-be-transmitted information to the mobile phone.

In an embodiment, when completing receiving of the to-be-transmitted information, the mobile phone may feed back a receiving result of the to-be-transmitted information to the tablet.

In an embodiment, before the tablet sends the to-be-transmitted information to the mobile phone, the method 1500 further includes the following.

S1510: The tablet sends information about the sliding direction of the finger to the mobile phone.

Before the tablet transmits the to-be-transmitted information to the mobile phone, the tablet first sends the information about the sliding direction of the finger to the mobile phone. In this way, the mobile phone can receive the to-be-transmitted information according to the sliding direction of the finger detected by the tablet. This can bring better user experience to the user.

In an embodiment, if the tablet detects a plurality of receivers in S1508, the tablet may prompt the user "For security reasons, please keep away from another device, or turn off a screen of another device and try again" in a reminder window.

In an embodiment, if the tablet detects a plurality of receivers in S1508, the tablet may send the to-be-transmitted information to the plurality of receivers.

In an embodiment, if the tablet detects a plurality of receivers in S1508, the tablet may prompt, by using a reminder window, the user to select a receiver device. After determining the receiver device (which may be one or more) selected by the user, the tablet may transmit the to-be-transmitted information to the receiver device selected by the user.

In an embodiment, if the tablet detects that the mobile phone is a unique receiver in S1508, and information has been transmitted between the mobile phone and the tablet, the tablet may directly send the to-be-transmitted information to the mobile phone.

In an embodiment, if the tablet detects that the mobile phone is a unique receiver in S1508, and information has not been transmitted between the mobile phone and the tablet, the mobile phone may prompt the user "Whether to establish a connection to the tablet". After detecting an operation that the user determines to establish a connection to the tablet, the mobile phone may continue to prompt the user to enter a pairing code displayed on the tablet. After the mobile phone detects that the user enters the pairing code, the mobile phone and the tablet establish a connection. In this case, the mobile phone may receive the transmission file sent by the tablet.

It should be understood that, after the mobile phone and the tablet establish a secure pairing connection once, a process in which a pairing code needs to be entered may be omitted in subsequent transmission.

In an embodiment, if the tablet does not detect the receiver in S1508, the tablet may prompt the user "The receiver is not found, and the connection is terminated" in a reminder window.

Compared with an information transmission method in the conventional technology, the short-distance information transmission method in this embodiment of this disclosure can shorten information transmission steps and improve user experience. An existing "HUAWEI Share" picture transmission is used as an example. A user needs to first open a gallery on a transmit end device and select a picture that needs to be transmitted, and then needs to share the picture. In this case, the transmit end device needs to scan a receive end device. After the receive end device is scanned, the user needs to perform selection. After the user selects the receive end device, the transmit end may send the picture that needs to be transmitted to the receive end. According to the operations provided in this embodiment of this disclosure, steps of transmitting a single picture can be reduced to three steps without blocking, and the user can continuously send, in a picture browsing process, a picture that the user wants to send. This improves user experience.

Figure 17:
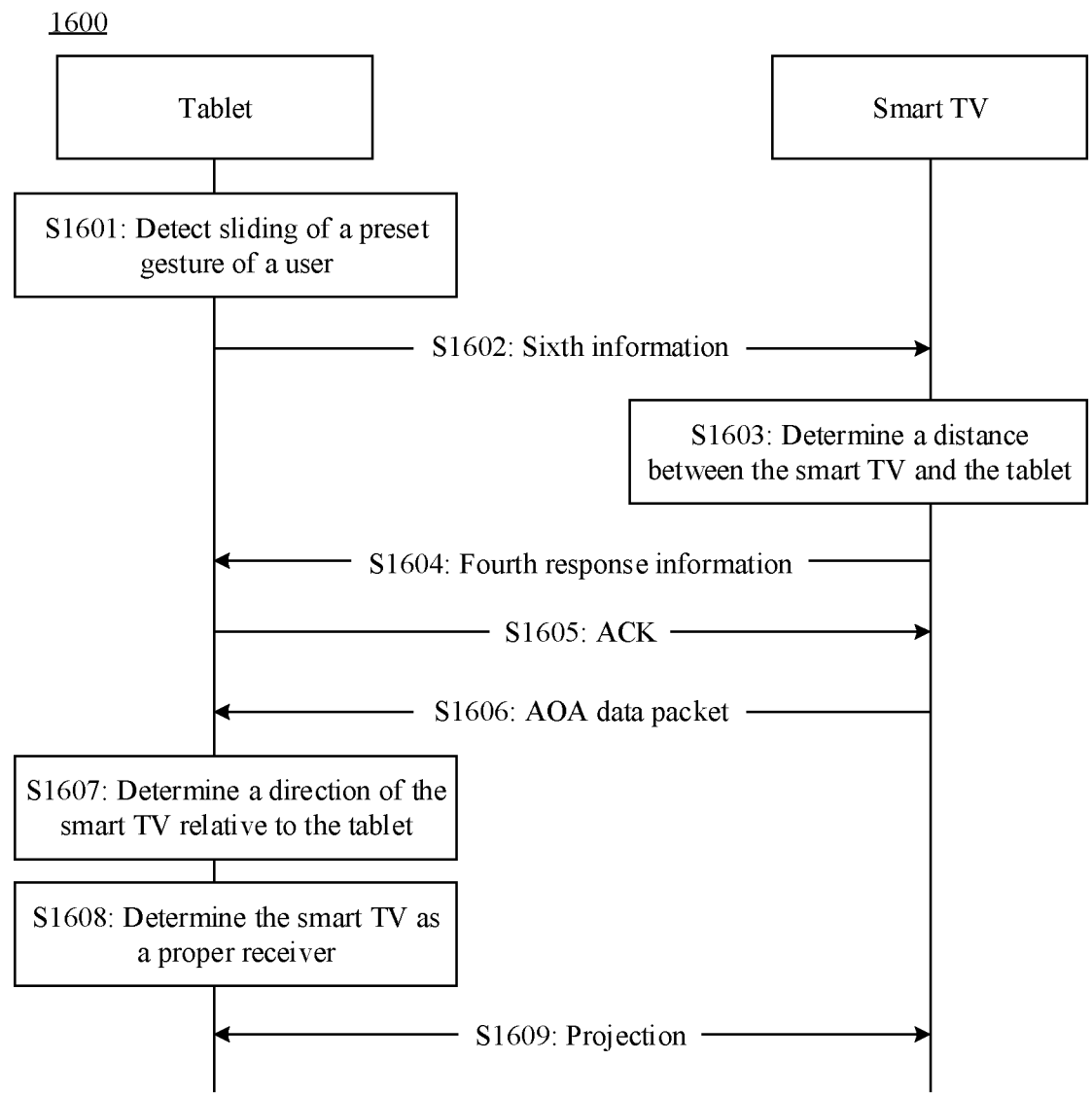
FIG. 17 is a schematic diagram of a process in which a tablet projects a screen to a television according to an embodiment of this disclosure.

The following describes a short-distance information transmission method 1600 in an embodiment of this disclosure. The method 1600 is described by using a process in which a tablet projects a screen to a television. As shown in FIG. 17, the method 1600 includes the following steps.

S1601: The tablet detects a preset gesture of a user on a video playback interface.

S1602: In response to the preset gesture, the tablet scans a surrounding device to send sixth information, where the sixth information is used by a receive end to determine whether the device is a Miracast device.

For example, the tablet may send the sixth information to the surrounding device in a BLE broadcast manner.

For example, the preset gesture may be pressing the video playback interface of the tablet by using three fingers of the user.

When the user is watching a video by using a video application on the tablet, the tablet detects the preset gesture of the user on a screen. In this case, the tablet may be triggered to scan a surrounding Miracast device. Further, the tablet may also be triggered to scan whether a surrounding Miracast device is used as the receive (sink) end.

S1603: After receiving the sixth information, a smart TV determines that the smart TV may be used as the Miracast device, and the smart TV may determine a distance between the smart TV and the tablet based on signal strength or signal quality of the received sixth information.

It should be understood that the smart TV may also have a BLUETOOTH/WI-FI antenna array. For a process in which the smart TV determines the distance between the smart TV and the tablet based on the signal strength or signal quality of the sixth information, refer to the process in which the tablet determines the distance between the tablet and the mobile phone in the foregoing method 900. For brevity, details are not described herein again.

S1604: If the smart TV determines that a distance between the smart TV and a mobile phone is less than or equal to a preset distance, the smart TV may send fourth response information to the tablet.

S1605: After receiving the fourth response information, the tablet sends ACK information to the smart TV.

S1606: The smart TV may send an AOA TX data packet to the tablet.

S1607: The tablet determines a direction of the smart TV relative to the tablet based on the received AOA data packet.

It should be understood that, for a process in which the tablet determines the direction of the smart TV relative to the tablet, refer to the process in which the tablet determines the direction of the mobile phone relative to the tablet in the foregoing method 900. For brevity, details are not described herein again.

S1608: The tablet may determine, based on a sliding direction of a finger and the direction of the smart TV relative to the tablet, whether the smart TV is a proper receiver.

It should be understood that, for a process in which the tablet determines whether the smart TV is the proper receiver, refer to the process in which the tablet determines whether the tablet is the proper receiver in the foregoing method 900. For brevity, details are not described herein again.

S1609: If the tablet determines that the smart TV is the proper receiver, the mobile phone may project a video that is being played to the smart TV, and the smart TV may play the video that is being played on the tablet.

In the method 1600, a process in which the tablet (with an AOA computing capability) projects the screen to the smart TV is described. If the mobile phone (without an AOA computing capability) projects a screen to the smart TV, the smart TV may determine whether the smart TV is the proper receiver. If the smart TV determines that the smart TV is the proper receiver, the smart TV may notify the mobile phone that the smart TV is the proper receiver, and the mobile phone may project the screen to the smart TV.

It should be understood that, when the mobile phone projects the screen to the smart TV, if the mobile phone does not have the AOA computing capability, the smart TV needs to have the AOA computing capability, that is, the smart TV needs to have the BLUETOOTH/WI-FI antenna array.

In this embodiment of this disclosure, cumbersome foreground steps of staying on an interface to scan the Miracast device and then waiting for the user to tap and select the device for connection and projection may be omitted, and a home screen of the tablet is directly dragged to the Miracast device by sliding with a plurality of fingers. This helps improve user experience in a projection process.

In an embodiment, the mobile phone may further stipulate the sliding direction of the finger of the user when the user transmits the to-be-transmitted information. When the mobile phone detects that the user slides in the stipulated sliding direction, the tablet may also receive the to-be-transmitted information in the stipulated sliding direction.

For example, the mobile phone may stipulate that the user slides along a direction of 0 degrees of the mobile phone when sending the to-be-transmitted information to the tablet. For example, when it is stipulated that the sliding direction of the finger of the user is sliding from the middle of the screen of the mobile phone to the top of the screen, the mobile phone may transmit the to-be-transmitted information to the tablet.

Figure 18A:
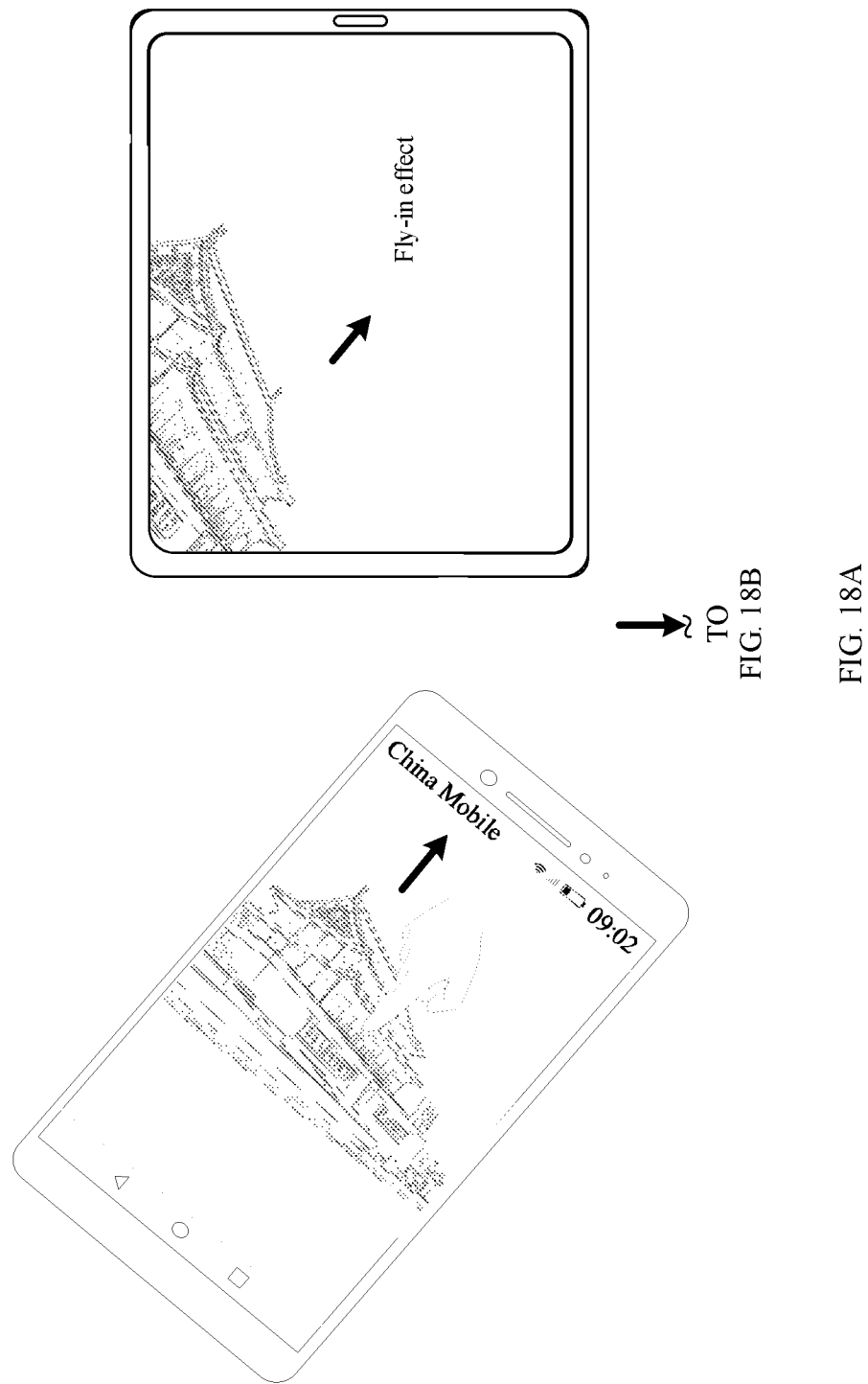
FIG. 18A, FIG. 18B, and FIG. 18C show another group of GUIs according to an embodiment of this disclosure.
Figure 18B:
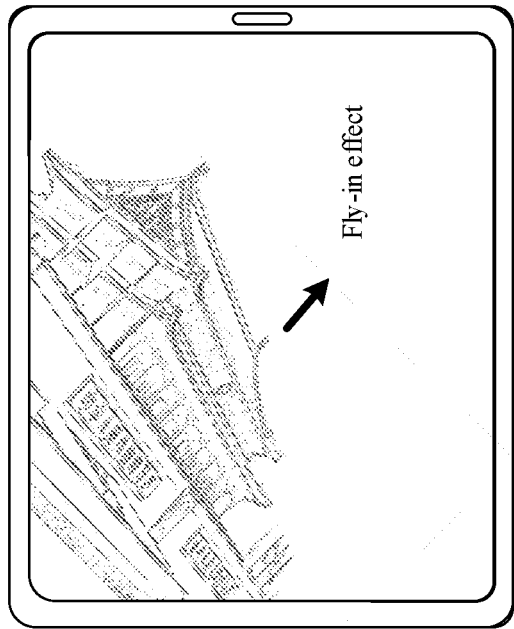
Figure 18B:
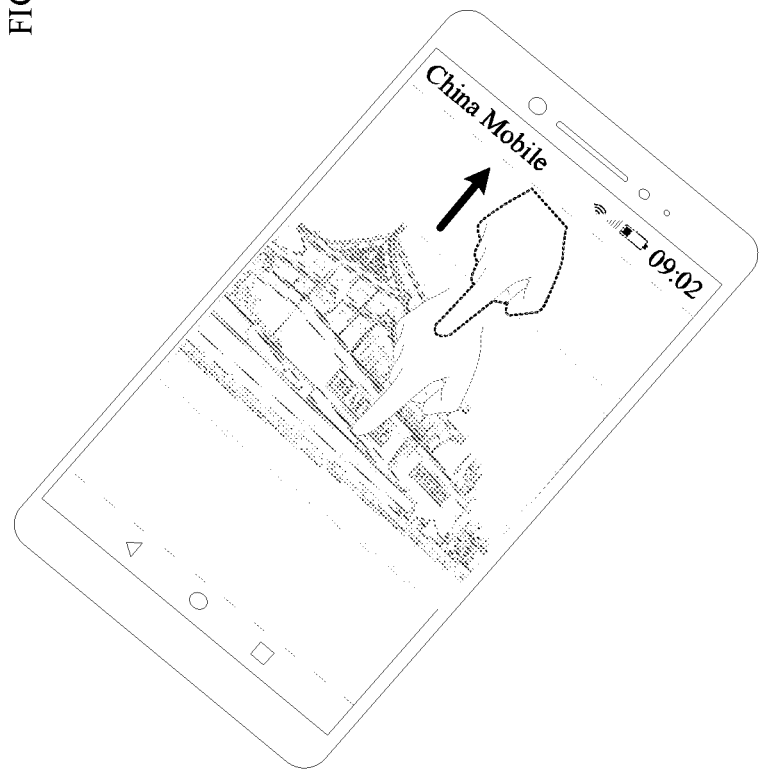
Figure 18C:
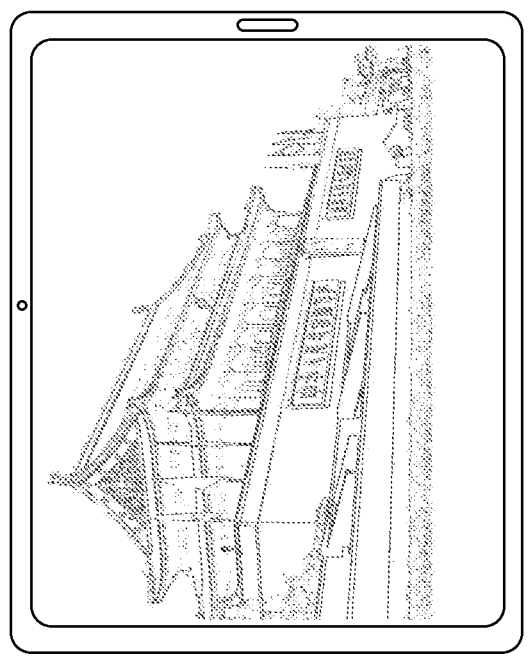
Figure 18C:
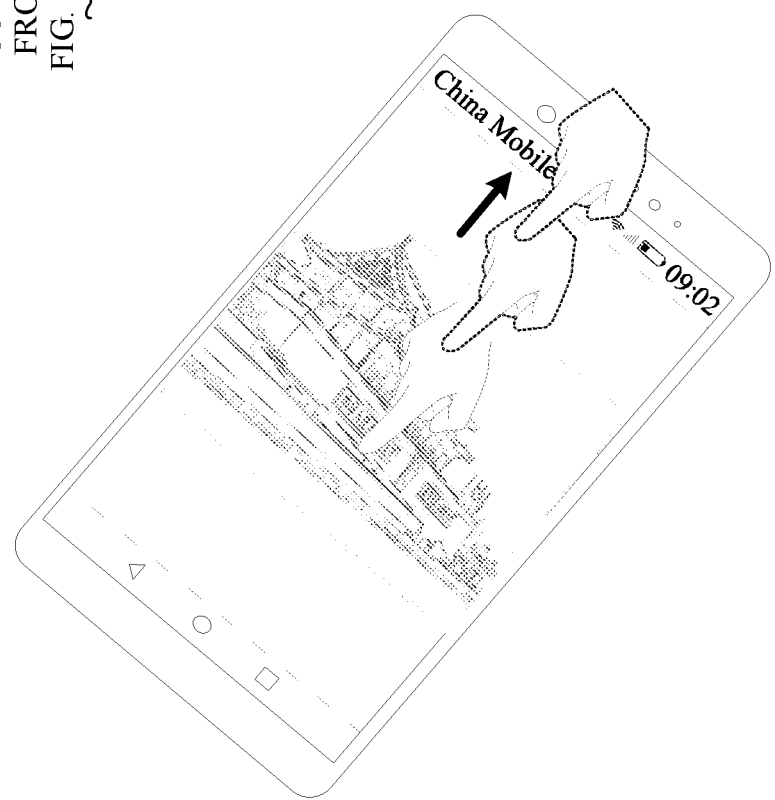

In an embodiment, FIG. 18A to FIG. 18C are a schematic diagram of another group of GUIs according to an embodiment of this disclosure. FIG. 18A to FIG. 18C show that when the mobile phone detects that the finger of the user slides from the center of the screen of the mobile phone to the top of the screen, the tablet may also receive a photo in the sliding direction.

Figure 19:
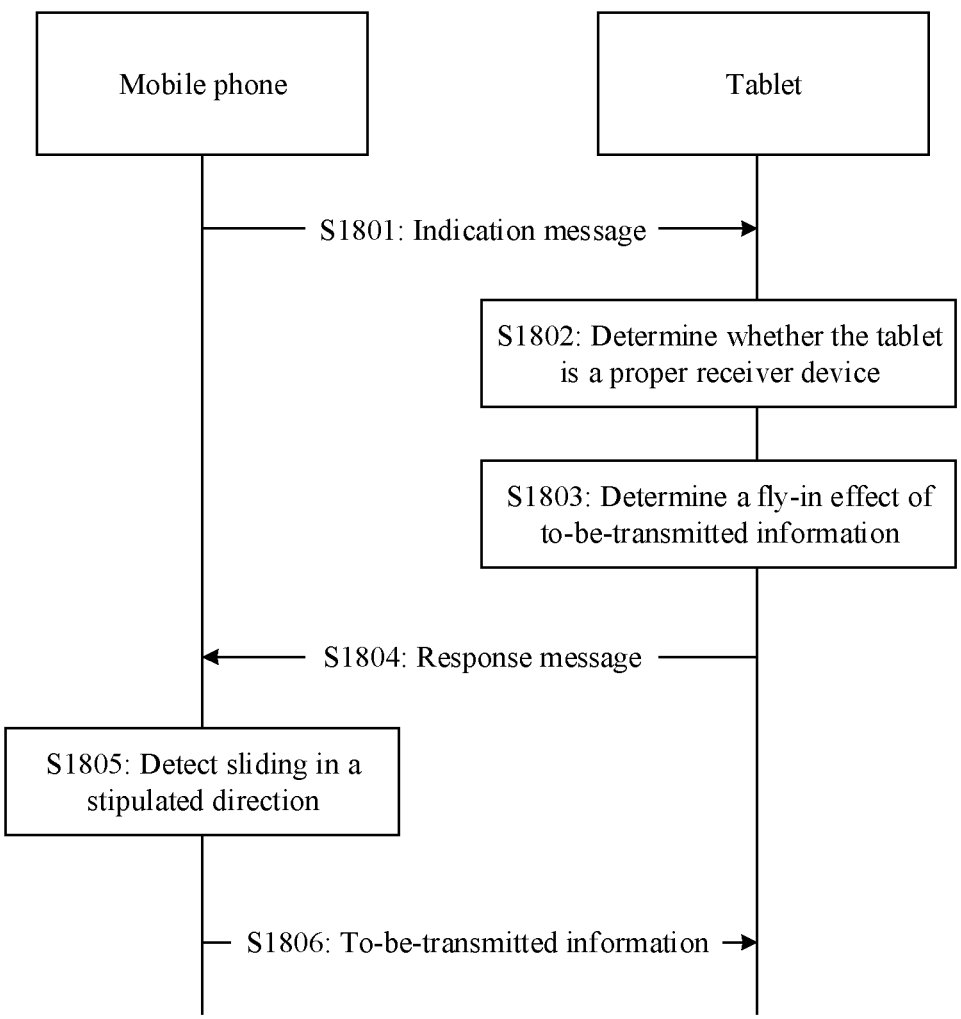
FIG. 19 is another schematic flowchart of a short-distance information transmission method according to an embodiment of this disclosure.

FIG. 19 is a schematic flowchart of a short-distance information transmission method 1800 according to an embodiment of this disclosure. The method 1800 is described by using an example in which a mobile phone transmits information to a tablet. The mobile phone may not have an AOA computing capability, and the tablet has an AOA computing capability. As shown in FIG. 19, the method 1800 includes the following steps.

S1801: The mobile phone sends an indication message to the tablet, where the indication message is used to indicate a fourth angle, and the fourth angle is an included angle between a preset geographic direction and a connection line between a location of a first preset part and a location of a second preset part on the mobile phone.

For example, as shown in FIG. 11, the mobile phone may use the indication message to carry information about $\theta_1$.

S1802: The tablet determines, based on the indication message, whether the tablet is a proper receiver device.

It should be understood that, for a process in which the tablet determines, based on $\theta_1$, whether the tablet is the proper receiver device, refer to the description in the foregoing method 900. For brevity, details are not described herein again.

S1803: The tablet determines a fly-in effect of to-be-transmitted information based on the indication message.

It should be understood that, because the mobile phone stipulates a sliding direction of a finger of a user, after receiving the indication message, the tablet may determine that the sliding direction of the finger of the user is a direction obtained after rotating $\theta_1$ clockwise from due north. The tablet may determine the fly-in effect of the to-be-transmitted information of the mobile phone based on the direction.

It should be further understood that, if the tablet determines that the tablet is the proper receiver device in S1802, the tablet may continue to perform S1803, or the tablet may simultaneously perform S1802 or S1803.

S1804: After the tablet determines that the tablet is the proper receiver device, the tablet sends a response message to the mobile phone, where the response message is used to indicate that the mobile phone can transmit the to-be-transmitted information.

In an embodiment, the tablet may further determine a distance between the mobile phone and the tablet, and after the distance between the mobile phone and the tablet meets a preset gesture, the tablet may send the to-be-transmitted information to the mobile phone. It should be understood that, for a process in which the tablet determines the distance between the mobile phone and the tablet, refer to the description in the foregoing method 900. For brevity, details are not described herein again.

S1805: When the mobile phone detects that the finger of the user slides in a stipulated direction, the mobile phone may send the to-be-transmitted information to the tablet.

In an embodiment, the sliding direction of the finger may be a direction in which a single finger (or two fingers, three fingers, or the like) of the user slides from the center of a screen of the mobile phone to an upper part of the screen of the mobile phone.

In this embodiment of this disclosure, the sliding direction of the finger of the user when the user uses a current electronic device to send the to-be-transmitted information to another device may be stipulated. In this way, the current electronic device may notify the other device only of an angle detected by a compass of the other device, so that the other device can determine whether the other device is a proper receiver device and determine the fly-in effect of the to-be-transmitted information.

In the foregoing embodiment, before information transmission is performed between electronic devices, an electronic device needs to perform AOA angle calculation to determine whether the electronic device is a proper receiver, or determine whether another device is a proper receiver. An embodiment of this disclosure further provides an information transmission method, so that to-be-transmitted information can be transmitted without calculating an angle.

Figure 20:
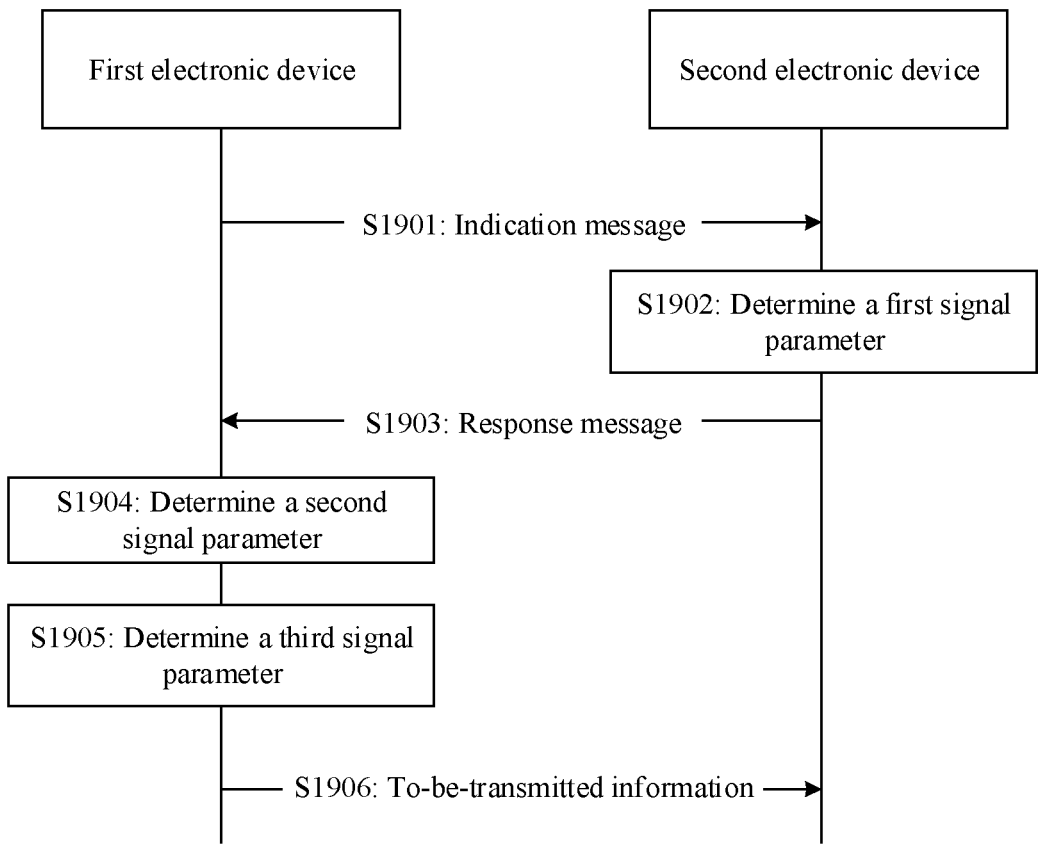
FIG. 20 is another schematic flowchart of a short-distance information transmission method according to an embodiment of this disclosure.

FIG. 20 is a schematic flowchart of a short-distance information transmission method 1900 according to an embodiment of this disclosure. The method 1900 is described by using an example in which a first electronic device transmits information to a second electronic device. As shown in FIG. 20, the method 1900 includes the following steps.

S1901: The first electronic device sends an indication message to the second electronic device, and the second electronic device receives the indication message sent by the first electronic device, where the indication message is used to indicate that the first electronic device has to-be-transmitted information.

In an embodiment, when the mobile phone detects a preset gesture of a user, the first electronic device may be triggered to send the indication message to the second electronic device.

For example, the preset gesture may be touching a screen by using three fingers of the user.

S1902: The second electronic device determines a first signal parameter, where the first signal parameter is signal quality or signal strength of the indication message.

In an embodiment, the second electronic device may have a BLUETOOTH/WI-FI antenna array. For example, the antenna array includes three antennas, and the second electronic device may determine an average value as the first signal parameter based on the signal strength or signal quality of the indication message detected by each antenna.

Alternatively, the second electronic device may perform measurement by using an antenna in the antenna array, to obtain the first signal parameter.

In an embodiment, the second electronic device may alternatively not have a BLUETOOTH/WI-FI antenna array, and may use a BLUETOOTH/WI-FI antenna when receiving the indication message, so as to determine the first signal parameter.

S1903: The second electronic device sends a response message to the first electronic device, and the first electronic device receives the response message sent by the second electronic device, where the response message is used to indicate the first electronic device to transmit the to-be-transmitted information, and the response message includes the first signal parameter.

In an embodiment, before that the second electronic device sends a response message to the first electronic device, the method further includes the following.

The second electronic device determines that the first signal parameter is greater than or equal to a first preset threshold.

For example, the signal strength or signal quality of the indication message is an RSSI. The first signal parameter may be −65 dB, and the first preset threshold is −68 dB.

S1904: The first electronic device determines a second signal parameter, where the second signal parameter is signal quality or signal strength of the response message.

It should be understood that the first electronic device may have a BLUETOOTH/WI-FI antenna array, or may not have a BLUETOOTH/WI-FI antenna array. For a specific measurement manner, refer to the description in S1902. For brevity, details are not described herein again.

S1905: The first electronic device determines a third signal parameter based on the first signal parameter and the second signal parameter.

For example, the signal strength or signal quality of the response message is an RSSI. The second signal parameter may be −55 dB.

In an embodiment, that the first electronic device determines a third signal parameter based on the first signal parameter and the second signal parameter includes the following.

The first electronic device determines a larger value of the first signal parameter and the second signal parameter as the third signal parameter.

For example, if the first signal parameter is −65 dB, and the second signal parameter is −55 dB, the first electronic device may determine that the third signal parameter is −55 dB.

In this embodiment of this disclosure, the first electronic device may use a larger value of the first signal parameter and the second signal parameter as the third signal parameter. This can avoid a case in which the first electronic device cannot send the to-be-transmitted information because the first electronic device incorrectly measures the second signal parameter or the second electronic device incorrectly measures the first signal parameter.

In an embodiment, that the first electronic device determines a third signal parameter based on the first signal parameter and the second signal parameter includes The first electronic device determines an average value of the first signal parameter and the second signal parameter as the third signal parameter.

For example, if the first signal parameter is −65 dB, and the second signal parameter is −55 dB, the first electronic device may determine that the third signal parameter is −60 dB.

It should be understood that the first electronic device may alternatively use a smaller value of the first signal parameter and the second signal parameter as the third signal parameter, or may determine the third signal parameter in another calculation manner. This is not limited in this embodiment of this disclosure.

S1906: When the third signal parameter is greater than or equal to a second preset threshold, the first electronic device sends the to-be-transmitted information to the second electronic device.

In an embodiment, the second preset threshold is greater than the first preset threshold.

For example, the second preset threshold may be −60 dB.

For example, if the first signal parameter is −65 dB, and the second signal parameter is −55 dB, the first electronic device may determine that the third signal parameter is −55 dB. When the third signal parameter is greater than the second preset threshold, the first electronic device may send the to-be-transmitted information to the second electronic device.

In this embodiment of this disclosure, the first preset threshold of the second electronic device may be loosened. This can avoid a case in which the second electronic device does not send the response message to the first electronic device because of incorrect measurement, and consequently the first electronic device cannot send the to-be-transmitted information to the second electronic device. If the first preset threshold of the second electronic device is properly loosened, it can be ensured that the second electronic device can send the response message to the first electronic device within a specific measurement error range, that is, it can be ensured that the to-be-transmitted information is sent.

It should be understood that the incorrect measurement may refer to incorrect measurement generated by the first electronic device and the second electronic device under impact of an accidental or directional factor that occurs during signal measurement.

It should be further understood that the foregoing method 1900 may be combined with any one of the foregoing methods.

In this embodiment of this disclosure, the first electronic device and the second electronic device may not calculate relative position information of each other, but determine, based on a detected signal parameter, whether to send the to-be-transmitted information. In this way, information can be transmitted when the first electronic device is relatively close to the second electronic device. In addition, calculation performed when the first electronic device and the second electronic device perform information transmission may also be reduced, thereby helping reduce a transmission delay, and helping improve information transmission efficiency.

Figure 21:
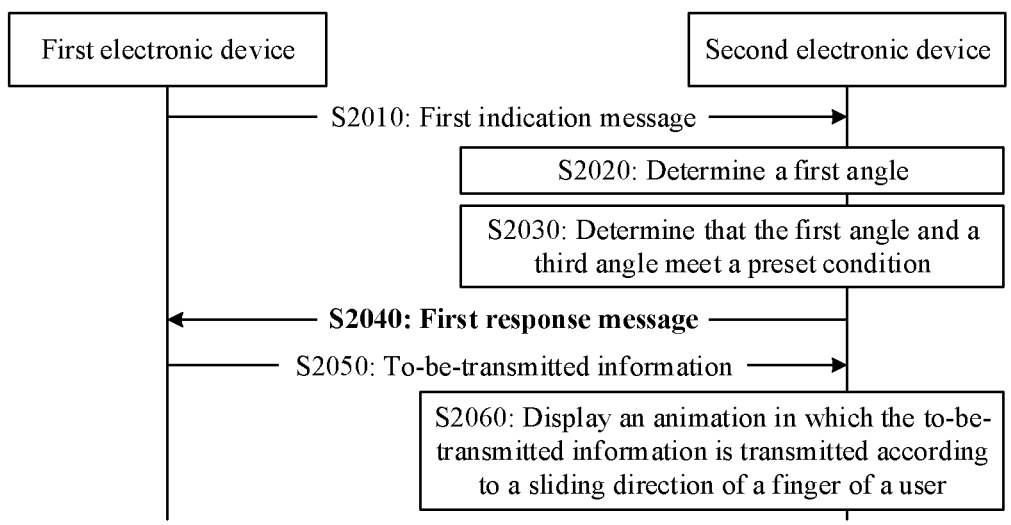
FIG. 21 is another schematic flowchart of a short-distance information transmission method according to an embodiment of this disclosure.

With reference to the foregoing embodiments and related accompanying drawings, an embodiment of this disclosure provides a short-distance information transmission method. The method may be implemented in a system including a first electronic device and a second electronic device. As shown in FIG. 21, the method 2000 may include the following steps.

S2010: The first electronic device sends a first indication message to the second electronic device, and the second electronic device receives the first indication message sent by the first electronic device, where the first indication message is used to determine a third angle, and the third angle is an included angle between a sliding direction of a finger of a user detected on a screen of the second electronic device and a preset geographic direction.

For example, refer to FIG. 11. The third angle may be $\alpha=\theta_1+\theta_2-360°$.

S2020: The second electronic device determines a first angle, where the first angle is an included angle between the preset geographic direction and a connection line between an antenna location of the first electronic device and an antenna location of the second electronic device.

For example, refer to FIG. 11. The second electronic device may determine β based on $\theta_3$ and $\theta_4$, and the first angle may be $\beta=\theta_3+\theta_4$.

S2030: The second electronic device determines that the first angle and the third angle meet a preset condition.

For example, that the second electronic device determines that the first angle and the third angle meet a preset condition may also be understood as that the second electronic device determines that the second electronic device is a proper receiver device. For example, whether $|\theta_1+180°-\beta|\leq 45°$ is true may be determined. If $|\theta_1+180°-\beta|\leq 45°$ is true, the second electronic device may determine that the second electronic device is the proper receiver device, or if $|\theta_1+180°-\beta|\leq 45°$ is false, the second electronic device determines that the second electronic device is not the proper receiver device.

S2040: The second electronic device sends a first response message to the first electronic device, and the first electronic device receives the first response message sent by the second electronic device, where the first response message is used to indicate that the second electronic device is a device that receives the to-be-transmitted information.

For example, if the second electronic device determines that the second electronic device is the proper receiver device, the second electronic device may send the first response message to the first electronic device.

S2050: The first electronic device sends the to-be-transmitted information to the second electronic device based on the first response message.

S2060: The second electronic device displays, on a screen of the first electronic device, an animation in which the to-be-transmitted information is transmitted according to the sliding direction of the finger of the user.

For example, as shown in FIG. 7A to FIG. 7C or FIG. 8A to FIG. 8C, the tablet may display, on the screen of the tablet, an animation in which the picture is transferred according to the sliding direction of the finger of the user detected on the mobile phone.

For example, refer to FIG. 7A to FIG. 7C. The tablet may determine a fly-in effect of a photo based on fr When receiving a photo, the tablet may receive the photo according to the fly-in effect.

Optionally, the second electronic device includes a BLUETOOTH/WI-FI antenna array, and before the determining that the second electronic device is a device for receiving the to-be-transmitted information, the method further includes that the second electronic device determines the first angle based on a radio signal that is sent by the first electronic device and received by the BLUETOOTH/WI-FI antenna array.

Optionally, before that the second electronic device sends the first response message to the first electronic device, the method further includes that the second electronic device determines that a distance between the first electronic device and the second electronic device is less than or equal to a preset distance.

Figure 22:
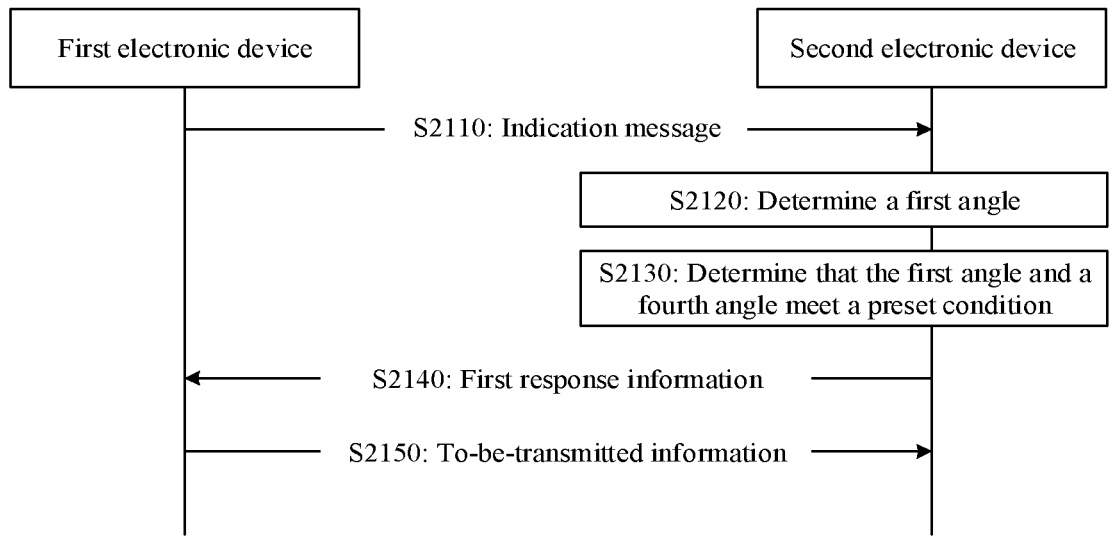
FIG. 22 is another schematic flowchart of a short-distance information transmission method according to an embodiment of this disclosure.

FIG. 22 is another schematic flowchart of a short-distance information transmission method 2100 according to an embodiment of this disclosure. The method may be applied to a system including a first electronic device and a second electronic device. Refer to FIG. 22. The method 2100 includes the following steps.

S2110: The first electronic device receives an indication message sent by the second electronic device, where the indication message is used to determine a fourth angle, and the fourth angle is an included angle between a preset geographic direction and a connection line between a location of a first preset part and a location of a second preset part on the mobile phone.

For example, refer to FIG. 11. The fourth angle may be $\theta_1$ in FIG. 11.

S2120: The first electronic device determines a first angle, where the first angle is an included angle between the preset geographic direction and a connection line between an antenna location of the first electronic device and an antenna location of the second electronic device.

For example, refer to FIG. 11. The second electronic device may determine β based on $\theta_3$ and $\theta_4$, and the first angle may be $\beta=\theta_3+\theta_4$.

S2130: The first electronic device determines that the first angle and the fourth angle meet a preset condition.

For a description of S2130, refer to the description in the foregoing method 900. For brevity, details are not described herein again.

S2140: The first electronic device sends a first response message to the second electronic device, where the first response message is used to indicate the second electronic device to send to-be-transmitted information to the first electronic device.

S2150: The first electronic device displays the to-be-transmitted information.

In an embodiment, the first electronic device may determine a fly-in effect of the to-be-transmitted information based on α.

Refer to the GUI shown in FIG. 18A to FIG. 18C, the tablet may receive a photo according to the sliding direction of the finger of the user detected on the mobile phone.

In this embodiment of this disclosure, when the first electronic device uses a sliding direction of a finger as a preset direction, the second electronic device may determine, according to the preset direction, whether the second electronic device is a proper receiver device. If the second electronic device is the proper receiver device, the second electronic device may further determine that the preset direction is an incoming direction of the to-be-transmitted information displayed on a screen of the second electronic device. In this way, when the to-be-transmitted information is received, it can be ensured that the sliding direction on the second electronic device is consistent with a direction of receiving the to-be-transmitted information on the first electronic device. This improves visual experience of a user, and provides the user with vivid effects.

Optionally, before the receiving the to-be-transmitted information sent by the second electronic device, the method further includes that the first electronic device determines that a distance between the first electronic device and the second electronic device is less than or equal to a preset distance.

In this embodiment of this disclosure, the first electronic device may determine the distance between the first electronic device and the second electronic device, and may indicate the second electronic device to transmit the to-be-transmitted information when the distance meets a preset condition. This helps ensure information transmission security.

Figure 23:
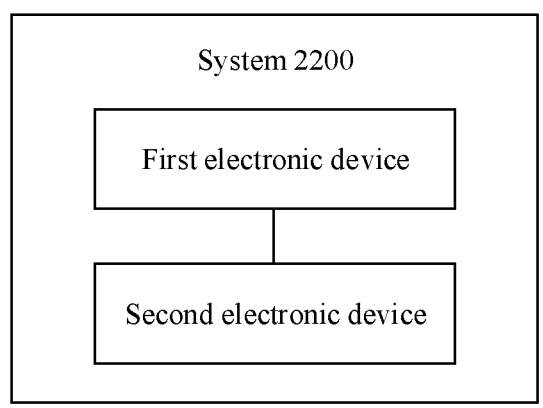
FIG. 23 is a schematic block diagram of a system according to an embodiment of this disclosure.

An embodiment of this disclosure further provides a system 2200. As shown in FIG. 23, the system may include a first electronic device and a second electronic device. The first electronic device may be the first electronic device in the foregoing embodiment, and the second electronic device may be the second electronic device in the foregoing embodiment.

An embodiment further provides a computer-readable storage medium. The computer storage medium stores computer instructions. When the computer instructions are run on an electronic device, the electronic device is enabled to perform the related method steps, to implement the short-distance information transmission method in the foregoing embodiments.

The electronic device, the computer-readable storage medium, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different function modules and implemented based on a requirement, that is, an inner structure of an apparatus is divided into different function modules to implement all or some of the functions described above.

In the several embodiments provided in this disclosure, it should be understood that the disclosed apparatus and method may be implemented in other manners. For example, the described apparatus embodiment is merely an example. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located at one place, or may be distributed on different places. Some or all of the units may be selected based on actual requirements to achieve the objectives of the solutions of the embodiments.

In addition, function units in the embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this disclosure essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this disclosure. The foregoing storage medium includes any medium that can store program code, such as a USB flash drive, a removable hard disk, a read-only memory (ROM), a RAM, a magnetic disk, or an optical disc.

The foregoing content is merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method implemented by a first electronic device, wherein the method comprises:
    receiving, from a second electronic device, a radio signal comprising a first indication message indicating a first angle, wherein the first angle is a first included angle between a sliding direction of a finger of a user detected on a second screen of the second electronic device and a preset geographic direction;

calculating, based on the radio signal, a second angle that is a second included angle between the preset geographic direction and a first connection line, wherein the first connection line is between a first antenna location of the first electronic device and a second antenna location of the second electronic device according to a relationship of a distance between an antenna of the first device and an antenna of the second device, a phase difference between the antenna of the first device and the antenna of the second device, and a wavelength of the first indication message, wherein the second angle is an angle of arrival (AOA) calculated from the radio signal; and displaying, on a first screen of the first electronic device, an animation in which to-be-transmitted information is transmitted according to the sliding direction when the first angle and the AOA meet a preset condition.

2. The method of claim 1, wherein the first indication message comprises information about a third angle and a fourth angle, wherein the third angle is a third included angle between the preset geographic direction and a second connection line, wherein the second connection line is between a first location of a first preset part and a second location of a second preset part on the second electronic device, wherein the fourth angle is a fourth included angle between the sliding direction and the second connection line, and wherein the first angle is based on the third angle and the fourth angle.

3. The method of claim 1, wherein the antenna of the first electronic device comprises an antenna of a BLUETOOTH/WI-FI antenna array.

4. The method of claim 1, wherein a distance between the first electronic device and the second electronic device is less than or equal to a preset distance.

5. A method implemented by a first electronic device, wherein the method comprises:
receiving, from a second electronic device, a radio signal comprising a first indication message indicating a first angle, wherein the first angle is a first included angle between a preset geographic direction and a first connection line, wherein the first connection line is between a first location of a first preset part on the second electronic device and a second location of a second preset part on the second electronic device;

calculating, based on the radio signal, a second angle that is a second included angle between the preset geographic direction and a second connection line, wherein the second connection line is between a first antenna location of the first electronic device and a second antenna location of the second electronic device according to a relationship of a distance between an antenna of the first device and an antenna of the second device, a phase difference between the antenna of the first device and the antenna of the second device, and a wavelength of the first indication message, wherein the calculated second angle is an angle of arrival (AOA) of the radio signal;

receiving to-be-transmitted information from the second electronic device; and displaying the to-be-transmitted information when the first angle and the AOA meet a preset condition.

6. The method of claim 5, wherein the antenna of first electronic device comprises an antenna of a BLUETOOTH/WI-FI antenna array.

7. The method of claim 5, wherein a distance between the first electronic device and the second electronic device is less than or equal to a preset distance.

8. A method implemented by a first electronic device, wherein the method comprises:
receiving, from a second electronic device, a radio signal comprising a first indication message indicating a first angle, wherein the first angle is a first included angle between a sliding direction of a finger of a user detected on a screen of the second electronic device and a preset geographic direction;

calculating, based on the radio signal, a second angle that is a second included angle between the preset geographic direction and a first connection line, wherein the first connection line is between a first antenna location of the first electronic device and a second antenna location of the second electronic device according to a relationship of a distance between an antenna of the first device and an antenna of the second device, a phase difference between the antenna of the first device and the antenna of the second device, and a wavelength of the first indication message, wherein the calculated second angle is an angle of arrival (AOA) of the radio signal;

receiving to-be-transmitted information from the second electronic device; and displaying the to-be-transmitted information when the first angle and the AOA meet a preset condition.

9. The method of claim 8, wherein the first indication message comprises information about a third angle and a fourth angle, wherein the third angle is a third included angle between the preset geographic direction and a second connection line, wherein the second connection line is between a first location of a first preset part and a second location of a second preset part on the second electronic device, wherein the fourth angle is a fourth included angle between the sliding direction and the second connection line, and wherein the first angle is based on the third angle and the fourth angle.

10. The method of claim 8, wherein the antenna of the first electronic device comprises an antenna of a BLUETOOTH/WI-FI antenna array.

11. The method of claim 8, wherein a distance between the first electronic device and the second electronic device is less than or equal to a preset distance.

12. A system comprising:
a first electronic device, wherein the first electronic device is configured to send a radio signal comprising a first indication message indicating a first angle, and wherein the first angle is a first included angle between a sliding direction of a finger of a user detected on a screen of the first electronic device and a preset geographic direction; and a second electronic device configured to:
receive the first indication message from the first electronic device;

calculate, based on the radio signal, a second angle that is a second included angle between the preset geographic direction and a first connection line, wherein the first connection line is between a first antenna location of the first electronic device and a second antenna location of the second electronic device according to a relationship of a distance between an antenna of the first device and an antenna of the second device, a phase difference between the antenna of the first device and the antenna of the second device, and a wavelength of the first indication message, wherein the calculated second angle is an angle of arrival (AOA) of the radio signal; and display, on a screen of the second electronic device, an animation in which to-be-transmitted information is transmitted according to the sliding direction when the first angle and the AOA meet a preset condition.

13. A first electronic device comprising:
a first screen; and
one or more processors coupled to the first screen and configured to:
  receive, from a second electronic device, a radio signal comprising a first indication message indicating a first angle, wherein the first angle is a first included angle between a sliding direction of a finger of a user detected on a second screen of the second electronic device and a preset geographic direction;
  calculate, based on the radio signal, a second angle that is a second included angle between the preset geographic direction and a first connection line, wherein the first connection line is between a first antenna location of the first electronic device and a second antenna location of the second electronic device according to a relationship of a distance between an antenna of the first device and an antenna of the second device, a phase difference between the antenna of the first device and the antenna of the second device, and a wavelength of the first indication message, wherein the calculated second angle is an angle of arrival (AOA) of the radio signal; and
  display, on the first screen, an animation in which to-be-transmitted information is transmitted according to the sliding direction when the first angle and the AOA meet a preset condition.

14. The first electronic device of claim 13, wherein the first indication message comprises information about a third angle and a fourth angle, wherein the third angle is a third included angle between the preset geographic direction and a second connection line, wherein the second connection line is between a first location of a first preset part and a second location of a second preset part on the second electronic device, wherein the fourth angle is a fourth included angle between the sliding direction and the second connection line, and wherein the first angle is based on the third angle and the fourth angle.

15. The first electronic device of claim 13, further comprising a BLUETOOTH/WI-FI antenna array coupled to the one or more processors, and wherein the one or more processors is further configured to receive, from the second electronic device and using the BLUETOOTH/WI-FI antenna array, the radio signal.

16. The first electronic device of claim 13, wherein a distance between the first electronic device and the second electronic device is less than or equal to a preset distance.

17. The first electronic device of claim 13, wherein the to-be-transmitted information comprises a photo, a video, a text, a document, or a web page link.

18. The method of claim 1, wherein the to-be-transmitted information comprises a photo, a video, a text, a document, or a web page link.

19. The method of claim 5, wherein the to-be-transmitted information comprises a photo, a video, a text, a document, or a web page link.

20. The method of claim 8, wherein the to-be-transmitted information comprises a photo, a video, a text, a document, or a web page link.

* * * * *